US012661919B2

(12) United States Patent
Hirata et al.

(10) Patent No.: US 12,661,919 B2
(45) Date of Patent: Jun. 23, 2026

(54) LIQUID EJECTING METHOD

(71) Applicant: SEIKO EPSON CORPORATION, Tokyo (JP)

(72) Inventors: Koki Hirata, Nagano (JP); Shun Katsuie, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 18/425,630

(22) Filed: Jan. 29, 2024

(65) Prior Publication Data

US 2024/0270008 A1 Aug. 15, 2024

(30) Foreign Application Priority Data

Feb. 1, 2023 (JP) ................................ 2023-014249

(51) Int. Cl.
*B41M 3/00* (2006.01)
*B41J 2/15* (2006.01)

(52) U.S. Cl.
CPC ................ *B41M 3/006* (2013.01); *B41J 2/15* (2013.01)

(58) Field of Classification Search
CPC ............... B41M 3/006; B41J 2/15; B41J 2/21
USPC ............................................................ 347/37
See application file for complete search history.

(56) References Cited

U.S. PATENT DOCUMENTS 6,293,648 B1 9/2001 Anderson
2005/0093902 A1* 5/2005 Kato ...................... H01J 9/205 347/9
2008/0030536 A1 2/2008 Furukawa
2010/0123909 A1* 5/2010 Kida ..................... B41J 2/2128 358/1.8
2014/0268241 A1 9/2014 Kakutani

FOREIGN PATENT DOCUMENTS

JP 2014-176968 A 9/2014
JP 2022-085914 A 6/2022

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A liquid ejecting method is a liquid ejecting method of ejecting a liquid from a liquid ejecting head including a nozzle array constituted by arranging nozzles, in which the liquid ejecting head is configured to move relative to a first medium, the liquid ejecting method including ejecting, in a state in which the relative movement is stopped, a liquid from first nozzles constituting a part of the nozzle array to form a first liquid droplet on the first medium.

10 Claims, 32 Drawing Sheets

CNT=3,S4

CNT=7,S8

LIQUID EJECTING METHOD

The present application is based on, and claims priority from JP Application Serial Number 2023-014249, filed Feb. 1, 2023, the disclosure of which is hereby incorporated by reference herein in its entirety.

BACKGROUND

1. Technical Field

The present disclosure relates to a liquid ejecting method.

2. Related Art

In the related art, a liquid ejecting apparatus that ejects a liquid, such as an adhesive, from a nozzle to form liquid droplets formed by the liquid on a medium is disclosed. For example, JP-A-2022-85914 discloses a dispenser that ejects an adhesive onto a mounting substrate when adhering an electronic component to the mounting substrate. In addition, JP-A-2014-176968 discloses an ink jet liquid ejecting apparatus including a plurality of liquid ejecting heads constituted by arranging a plurality of nozzles.

There is a demand for performing a contact liquid inspection for checking liquid resistance of various types of adhesives to various types of liquids by bringing sample created by arranging the various types of adhesives on one medium into contact with the various types of liquids. Therefore, it is required to prepare a large number of the samples. As a method of creating the sample, arranging the various types of adhesives as the liquid droplets on the medium by the above-described dispenser in the related art is conceivable.

However, in the above-described dispenser in the related art, since there is a restriction that one type of adhesive can be ejected from only one nozzle, when a large number of media having liquid droplets formed by each of the various types of adhesives are prepared, there is a problem that the dispenser is not suitable.

Therefore, instead of the dispenser disclosed in JP-A-2022-85914, it is conceivable to adopt the ink jet liquid ejecting head disclosed in JP-A-2014-176968. However, since a diameter of the nozzle of the ink jet liquid ejecting head is relatively smaller than a diameter of the nozzle of the dispenser, it is difficult to form a liquid droplet as large as a liquid droplet formed from the dispenser on the medium by the ink jet liquid ejecting head, and there is a problem that the number of times of ejection is also increased, and the period required to form the liquid droplet is increased.

SUMMARY

According to an aspect of the present disclosure, a liquid ejecting method is a liquid ejecting method of ejecting a liquid from a liquid ejecting head including a nozzle array constituted by arranging a plurality of nozzles, in which the liquid ejecting head is configured to move relative to a first medium, the liquid ejecting method including ejecting, in a state in which the relative movement is stopped, a liquid from a plurality of first nozzles constituting a part of the nozzle array to form a first liquid droplet on the first medium.

DESCRIPTION OF EMBODIMENTS

Hereinafter, embodiments for carrying out the present disclosure will be described with reference to the drawings.

However, in each of the drawings, the dimensions and scales of each section are appropriately different from the actual dimensions and scales. In addition, since the embodiments described below are preferred specific examples of the present disclosure, various technically preferable limitations are given, but the scope of the present disclosure is not limited to the embodiments unless otherwise stated to specifically limit the present disclosure in the following description.

1. First Embodiment

1-1. Outline of Liquid Ejecting Apparatus 100

Figure 1:
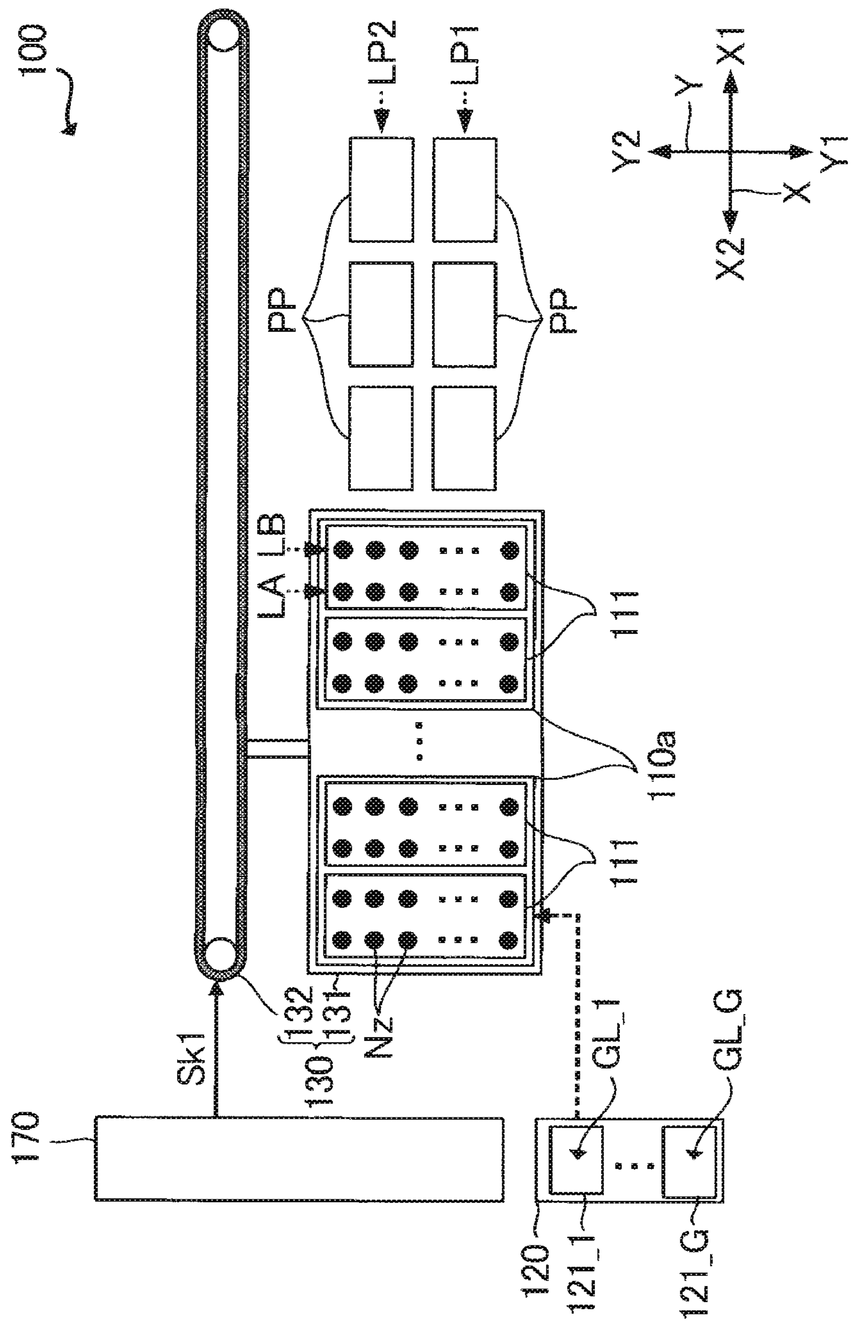
FIG. 1 is a schematic diagram illustrating a configuration of a liquid ejecting apparatus.
Figure 2:
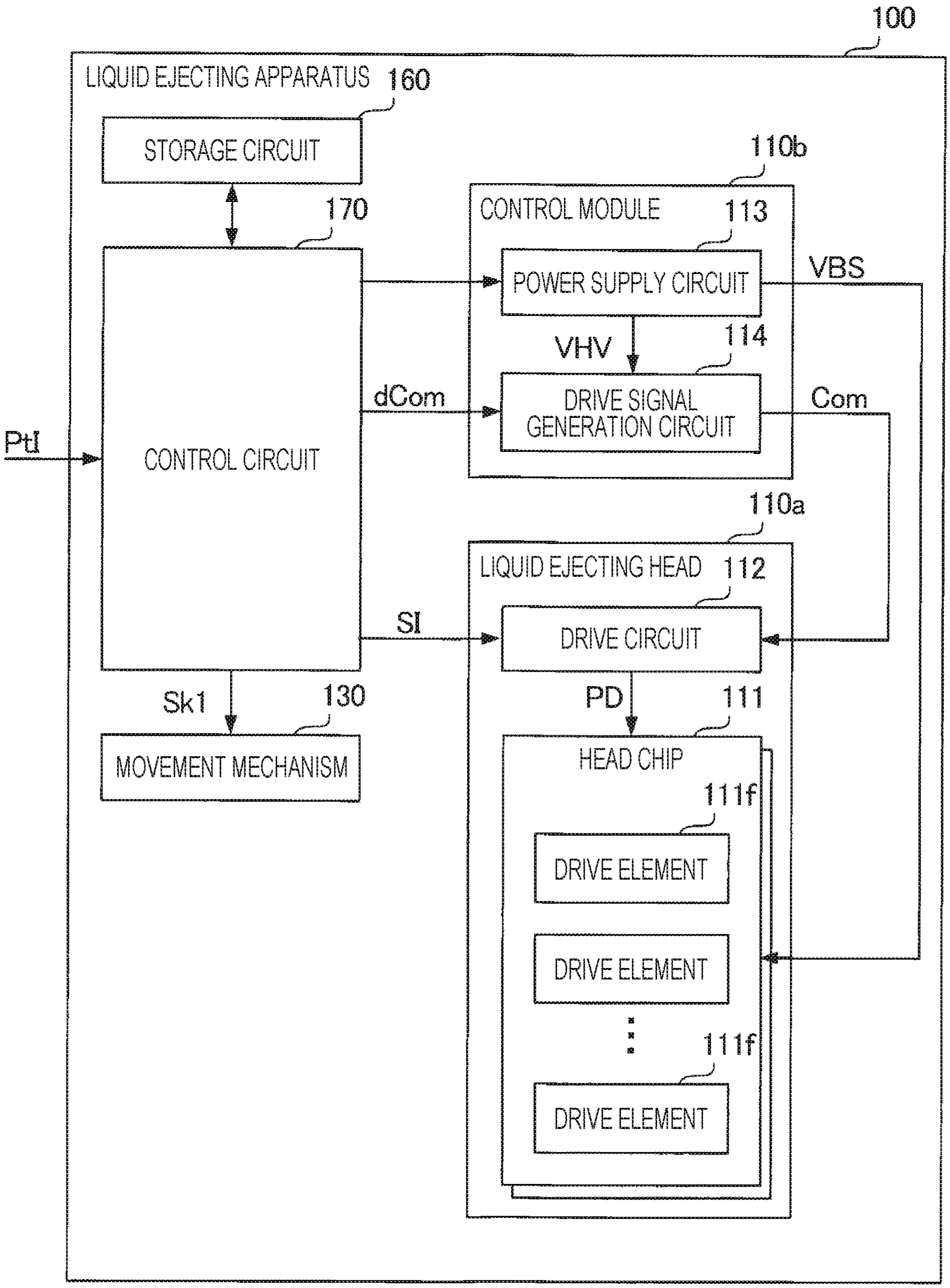
FIG. 2 is a block diagram illustrating a configuration example of the liquid ejecting apparatus.

FIG. 1 is a schematic diagram illustrating a configuration of a liquid ejecting apparatus 100. FIG. 2 is a block diagram illustrating a configuration example of the liquid ejecting apparatus 100. In the following description, an X-axis, a Y-axis, and a Z-axis, which are orthogonal to each other, are assumed. One direction along the X-axis when viewed from any point will be referred to as an X1 direction, and a direction opposite to the X1 direction will be referred to as an X2 direction. Similarly, directions opposite to each other along the Y-axis from any point will be referred to as a Y1 direction and a Y2 direction, and directions opposite to each other along the Z-axis from any point will be referred to as a Z1 direction and a Z2 direction. An X-Y plane including the X-axis and the Y-axis corresponds to a horizontal plane. The Z-axis is an axis along a vertical direction, and the Z2 direction corresponds to a lower direction in the vertical direction.

The liquid ejecting apparatus 100 according to the first embodiment ejects an adhesive, which is an example of a liquid, onto a medium PP by using an ink jet head.

Examples of the apparatus that ejects the liquid onto the medium PP include a dispenser, in addition to the ink jet head. The dispenser can eject a large ejection amount of the liquid from the nozzle, as compared with an ejection amount of the liquid generally ejected by the ink jet head. In addition, various types of liquids are ejected to use a medium on which a plurality of types of liquid droplets are formed as a sample, and some inspection, for example, a contact liquid inspection, is performed on the sample sometimes. In the contact liquid inspection, a state of each of a plurality of liquid droplets on the medium is inspected after the sample is caused to exist in a specific environment for a predetermined period. As the inspection of the state of each of the plurality of liquid droplets, for example, a degree of adhesion of each of the plurality of liquid droplets to the medium may be inspected, a degree of change in color of each of a plurality of adhesives may be inspected, and a degree of deformation of the adhesive may be inspected. As the aspect of the inspection, for example, the inspection is performed by imaging each of the plurality of liquid droplets and analyzing information indicating the image obtained by the imaging. The specific environment means, for example, immersing the sample in a predetermined solution. The predetermined solution is not limited to one type, and a plurality of types of solutions exists sometimes. In addition, the specific environment is not limited to immersing the sample in the predetermined solution, and includes an environment in which the sample exists under any one or a plurality of environments of a high temperature, a low temperature, a high pressure, a low pressure, high humidity, and low humidity. In addition, the predetermined period is not limited to one type of period, and a plurality of periods exists sometimes. Since one or more samples are used for one environment, when the contact liquid inspection is executed, a large number of the samples are required.

It is conceivable that such a sample is created by the dispenser. However, the dispenser has a restriction that one type of the adhesive can be ejected from only one nozzle. Accordingly, there is a problem that the dispenser is not suitable for creating a large number of the samples. The reason why the dispenser is not suitable is that when many types of adhesives are ejected onto one medium, the dispensers are prepared as many as the types of the adhesives, and there are problems that a cost of creating the sample increases and a size of a system that creates the sample increases. The problem that the dispenser is not suitable for creating a large number of the samples also occurs in aspects other than the aspect in which the liquid ejected onto the sample is the adhesive. For example, the problem described above also occurs in an aspect in which the liquid ejected onto the sample is UV ink containing resin. UV is an abbreviation for ultra violet. The UV ink is used, for example, in a 3D printer for three-dimensional molding that forms a three-dimensional object.

Therefore, in the present embodiment, a large number of the samples are efficiently created by using the ink jet head capable of ejecting a plurality of types of liquids.

When the sample is created by using the ink jet head, since the diameter of the nozzle of the liquid ejecting head is relatively smaller than the diameter of the nozzle of the dispenser, it is difficult to eject the liquid droplet as large as the liquid droplet ejected from the dispenser onto the medium by the liquid ejecting head because the number of shots is increased and time is taken.

In the present embodiment, the time required to create the sample is reduced by forming one liquid droplet by ejecting the adhesive GL from the plurality of nozzles Nz.

As illustrated in FIG. 1, the liquid ejecting apparatus 100 ejects a liquid adhesive GL, which is an example of a "liquid", from a plurality of nozzles Nz onto a medium PP while moving a liquid ejecting head 110*a*, which is an ink jet head, in the X1 direction, to execute a sample creation operation of creating the sample. FIG. 1 representatively illustrates nozzles Nz which are a part of the plurality of nozzles Nz included in the liquid ejecting head 110*a*. In the following description, the movement of the liquid ejecting head 110*a* from an end portion in the X2 direction to an end portion in the X1 direction within a range in which the liquid ejecting head 110*a* can move in the X-axis direction will be referred to as scanning in a main scanning direction sometimes. When one scanning in the main scanning direction ends, that is, one the sample creation operation ends, for example, a disposition mechanism or the like that disposes the medium PP recovers the medium PP finished being created as the sample, and disposes a new medium PP.

As illustrated in FIG. 1, the liquid ejecting apparatus 100 ejects the adhesive GL onto a plurality of media PP. In the example of FIG. 1, the plurality of media PP are classified into a medium array LP1 and a medium array LP2 which are arranged at intervals in the direction along the Y-axis. The medium array LP1 and the medium array LP2 extend along the X-axis. In an example of FIG. 1, the plurality of media PP are classified into two medium arrays LP1 and LP2, but the present disclosure is not limited to this, and the plurality of media PP may form one medium array, and may be classified into three or more medium arrays. In addition, the liquid ejecting apparatus 100 may eject the adhesive GL onto one medium PP while being not limited to the plurality of media PP. In addition, in the example of FIG. 1, the plurality of media PP are disposed at intervals in the direction along the Y-axis, but the medium PP classified into the medium array LP1 and the medium PP classified into the medium array LP2 may be in contact with each other without the interval.

The plurality of media PP are, for example, plates, films, or sheets made of any one of metal, ceramics, resin, or the like. In the present embodiment, the plurality of media PP will be described as the plates made of metal.

As illustrated in FIGS. 1 and 2, the liquid ejecting apparatus 100 includes the liquid ejecting head 110*a*, a control module 110*b*, a liquid container 120, a movement mechanism 130, a storage circuit 160, and a control circuit 170.

It should be noted that, although FIG. 1 illustrates that the liquid ejecting apparatus 100 includes a plurality of liquid ejecting heads 110*a*, the liquid ejecting apparatus 100 may include one liquid ejecting head 110*a*. Hereinafter, an example in which the liquid ejecting apparatus 100 includes the plurality of liquid ejecting heads 110*a* will be described. As illustrated in FIG. 1, the plurality of liquid ejecting heads 110*a* are disposed along the X-axis. Each of the plurality of liquid ejecting heads 110*a* includes a plurality of nozzle arrays LN.

The liquid ejecting head 110*a* is an assembly provided with a head chip 111 and a drive circuit 112. The control module 110*b* is an assembly provided with a power supply circuit 113 and a drive signal generation circuit 114. The liquid ejecting head 110*a* and the control module 110*b* are not limited to the aspect illustrated in FIG. 2, and for example, a part or all of the control modules 110*b* may be incorporated in the liquid ejecting head 110*a*. In FIG. 2, a plurality of drive elements 111*f* among the components of the head chip 111 are representatively illustrated. It should be noted that a detailed example of the head chip 111 will be described later based on FIG. 3.

In the examples illustrated in FIGS. 1 and 2, the number of the head chips 111 included in the liquid ejecting head 110*a* is two, but the number may be one or three or more. One or more head chips 111 are disposed such that the plurality of nozzles Nz are distributed over a part of the medium PP in a width direction.

In addition, in the present embodiment, one head chip 111 includes the plurality of nozzles Nz arranged in the direction along the Y-axis. As illustrated in FIG. 1, the plurality of nozzles Nz are classified into a nozzle array LA and a nozzle array LB which are arranged at intervals in the direction along the X-axis. Hereinafter, when the nozzle array LA and the nozzle array LB are not particularly distinguished, the nozzle array LA and the nozzle array LB will be referred to as the nozzle array LN sometimes. Each of the nozzle array LA and the nozzle array LB is a set of Mn nozzles Nz linearly arranged in the direction along the Y-axis. Accordingly, one head chip 111 includes 2×Mn nozzles Nz. It should be noted that the head chip 111 according to the present embodiment includes two nozzle arrays LN, but may have one nozzle array LN, or may have three or more nozzle arrays LN.

As illustrated in FIG. 1, the two nozzle arrays LN included in one head chip 111 are arranged along the X-axis. Further, the two head chips 111 included in one liquid ejecting head 110*a* are also arranged along the X-axis. Since the plurality of liquid ejecting heads 110*a* included in the liquid ejecting apparatus 100 are also arranged along the X-axis, all of the nozzle arrays LN included in the liquid ejecting apparatus 100 are arranged along the X-axis.

In the present embodiment, different types of the adhesives GL are ejected from each of the plurality of nozzle arrays LN. A plurality of types of the adhesives GL may be any adhesive, and are, for example, a urethane-based adhesive, a silicon-based adhesive, an epoxy-based adhesive, and the like.

The drive circuit 112 switches whether or not to supply a drive signal Com output from the drive signal generation circuit 114 to each of the plurality of drive elements 111*f* of the head chip 111 under the control of the control circuit 170. The drive circuit 112 includes, for example, a group of switches, such as a transmission gate for the switching.

The power supply circuit 113 receives electric power from a commercial power supply (not illustrated) to generate various predetermined potentials. The generated various potentials are appropriately supplied to each section of the liquid ejecting apparatus 100. In the example illustrated in FIG. 2, the power supply circuit 113 generates a power supply potential VHV and an offset potential VBS. The offset potential VBS is supplied to the head chip 111 or the like. In addition, the power supply potential VHV is supplied to the drive signal generation circuit 114 or the like.

The drive signal generation circuit 114 is a circuit that generates the drive signal Com for driving each drive element 111*f* of the head chip 111. Specifically, the drive signal generation circuit 114 includes, for example, a DA conversion circuit and an amplifier circuit. The drive signal generation circuit 114 generates the drive signal Com by the DA conversion circuit converting a waveform designation signal dCom, which will be described later, from the control circuit 170 from a digital signal to an analog signal, and the amplifier circuit amplifying the analog signal using the power supply potential VHV from the power supply circuit 113. Here, a signal of the waveform, among the waveforms included in the drive signal Com, which is actually supplied to the drive element 111*f* is a drive pulse PD.

As illustrated in FIG. 1, the liquid ejecting apparatus 100 is installed with the liquid container 120 that stores the liquid adhesive GL. For example, a bag-like pack made of a flexible film is used as the liquid container 120. The liquid container 120 includes a liquid container 121_1 to a liquid container 121_G that store the plurality of types of the adhesives GL, respectively. G of the present embodiment matches the number of the plurality of nozzle arrays LN included in the liquid ejecting apparatus 100. It should be noted that, since the value of G fluctuates depending on what kind of sample is created, the nozzle array LN that is not used in the sample creation operation, in other words, the head chip 111 or the liquid ejecting head 110*a* that is not used in the sample creation operation is generated sometimes. In the following description, the adhesive GL stored in the liquid container 121_*g* with respect to any integer g from 1 to G will be referred to as an adhesive GL_g. In the following, the adhesive GL_1 to the adhesive GL_G will be referred to as the adhesive GL without distinguishing from the adhesive GL_1 to the adhesive GL_G sometimes.

The movement mechanism 130 is moved a relative position of the plurality of media PP and the plurality of liquid ejecting heads 110*a* under the control of the control circuit 170. Hereinafter, the movement of the relative position between the plurality of media PP and the plurality of liquid ejecting heads 110*a* will be referred to as "relative movement" sometimes. As the relative movement, the plurality of liquid ejecting heads 110*a* may be moved in a state in which the positions of the plurality of media PP are fixed, or the plurality of media PP may be moved in a state in which the positions of the plurality of liquid ejecting heads 110*a* are fixed. In the present embodiment, the plurality of liquid ejecting heads 110*a* are moved in a state in which the positions of the plurality of media PP are fixed. When the liquid ejecting head 110*a* moves, the nozzle array LN included in the liquid ejecting head 110*a* also moves.

The movement mechanism 130 causes the liquid ejecting head 110*a* to reciprocate along the X-axis under the control of the control circuit 170. As illustrated in FIG. 1, the movement mechanism 130 includes a substantially box-like carriage 131 that accommodates the liquid ejecting head 110*a*, and an endless belt 132 to which the liquid ejecting head 110*a* is fixed. It should be noted that a configuration in which the liquid container 120 is mounted on the carriage 131 together with the liquid ejecting head 110*a* can also be adopted.

The storage circuit 160 stores various programs executed by the control circuit 170, and various data processed by the control circuit 170. The storage circuit 160 includes, for example, one or both semiconductor memories of one or a plurality of volatile memories, such as a RAM, and one or a plurality of non-volatile memories, such as a ROM, an EEPROM, or a PROM. It should be noted that the storage circuit 160 may be constituted as a part of the control circuit 170.

The control circuit 170 has a function of controlling the operation of each section of the liquid ejecting apparatus 100 and a function of processing various data. The control circuit 170 includes, for example, one or more processors, such as a CPU. It should be noted that the control circuit 170 may include a programmable logic device, such as an FPGA, instead of the CPU or in addition to the CPU.

The control circuit 170 controls the operation of each section of the liquid ejecting apparatus 100 by executing the program stored in the storage circuit 160. Here, the control circuit 170 generates signals, such as a control signal Sk1, a control signal SI, and the waveform designation signal dCom, as signals for controlling the operation of each section of the liquid ejecting apparatus 100.

The control signal Sk1 is a signal for controlling the driving of the movement mechanism 130. The control signal SI is a signal for controlling the driving of the drive circuit 112. Specifically, the control signal SI designates whether or not the drive circuit 112 supplies the drive signal Com from the drive signal generation circuit 114 to the drive element 111*f*, for each predetermined unit period. By this designation, an amount of the adhesive GL ejected from the head chip 111 and the like are designated. The waveform designation signal dCom is a digital signal for defining the waveforms of the drive signal Com generated by the drive signal generation circuit 114.

When the sample creation operation is executed, first, the control circuit 170 receives pattern information PtI indicating a disposition pattern of liquid droplets formed by the plurality of adhesives GL ejected onto the medium PP from a host computer, such as a personal computer. The control circuit 170 stores the received pattern information PtI in the storage circuit 160. Next, the control circuit 170 generates various control signals, such as the control signal SI, the waveform designation signal dCom, and the control signal Sk1, based on various data, such as the pattern information PtI stored in the storage circuit 160. Then, the control circuit 170 controls the liquid ejecting head 110*a* such that the drive element 111*f* is driven, while controlling the movement mechanism 130 such that the liquid ejecting head 110*a* moves relative to the plurality of media PP based on the various control signals and various data stored in the storage circuit 160. In the present embodiment, the control circuit 170 drives the drive element 111*f* in a state in which the relative movement is stopped, to eject the adhesive GL onto the medium PP in a state in which the relative movement is stopped to form the liquid droplet on the medium PP.

1-2. Configuration of Head Chip 111

Figure 3:
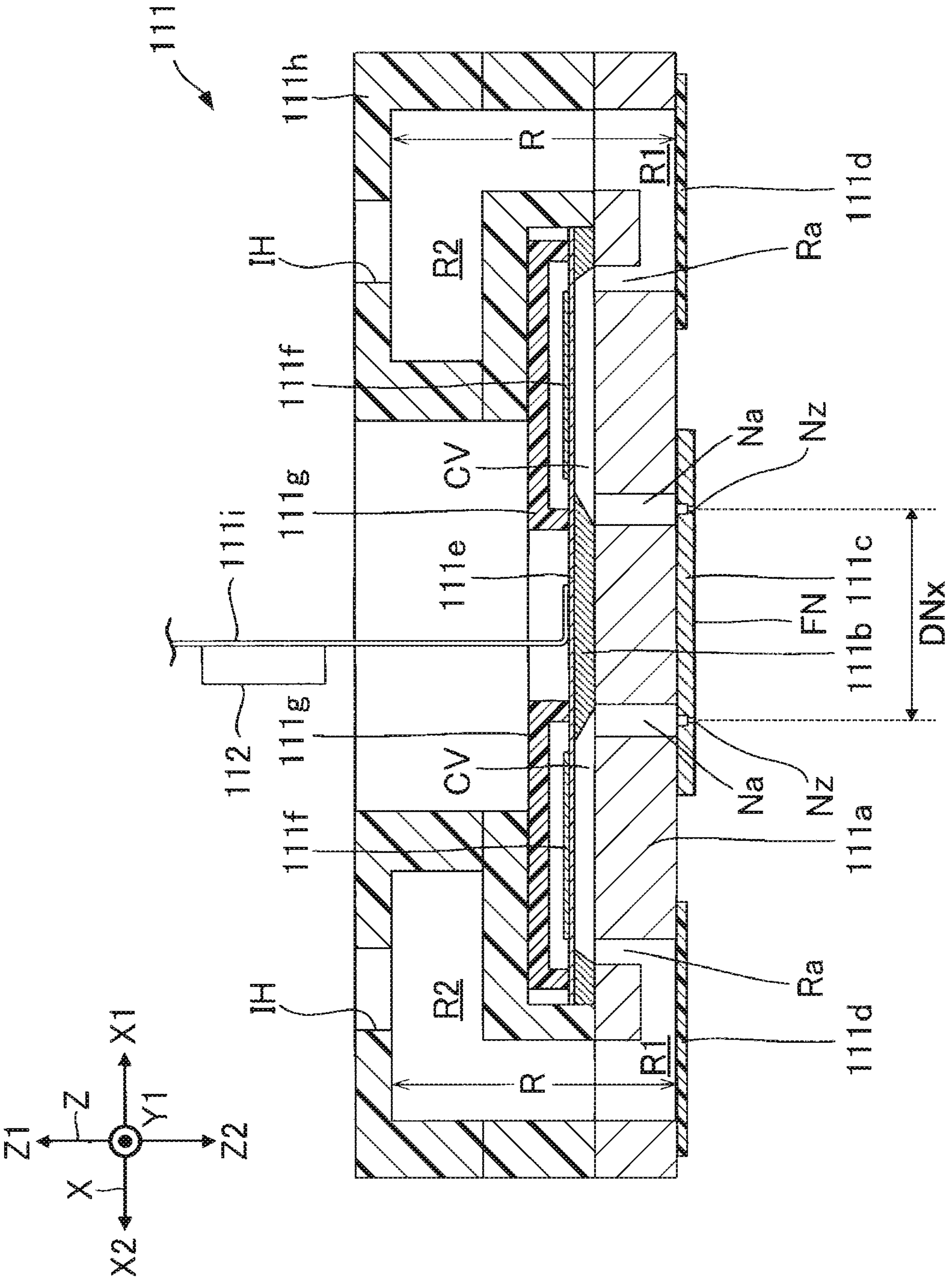
FIG. 3 is a cross-sectional view illustrating a configuration example of a head chip.

FIG. 3 is a cross-sectional view illustrating a configuration example of a head chip 111. As illustrated in FIG. 3, the head chip 111 has a substantially symmetrical configuration in the direction along the X-axis. However, the positions of the Mn nozzles Nz of the nozzle array LA and the Mn nozzles Nz of the nozzle array LB in the direction along the Y-axis may match or may be different from each other. As an example, FIG. 3 illustrates a configuration in which the positions of the Mn nozzles Nz of the nozzle array LA and the Mn nozzles Nz of the nozzle array LB match in the direction along the Y-axis. FIG. 3 illustrates a nozzle array disposition interval DNx that is a disposition interval in the direction along the X-axis between the nozzle array LA and the nozzle array LB. In other words, the nozzle array disposition interval DNx is a disposition interval in the direction along the X-axis between the adjacent nozzle arrays LN formed in one nozzle plate 110*c*. The direction along the X-axis is an example of a "second direction". In the present specification, the disposition interval between two elements refers to a distance from the center of gravity of one element to the center of gravity of the other element. The center of gravity is a point at which the sum of the first-order moments of the cross section is zero in a target shape. For example, when the target shape is a circle, the center of gravity is the center of the circle, and when the target shape is a parallelogram, the center of gravity is an intersection point of two diagonal lines of the parallelogram. In addition, the disposition interval between two elements can be referred to as, with respect to an arrangement direction in which the two elements are arranged, a distance between the center position in the arrangement direction of one element and the center position in the arrangement direction of the other element. In addition, the disposition interval between two elements can also be referred to as a distance between an end portion of one element that is close to the other element in the arrangement direction and an end portion of the other element that is close to the one element in the arrangement direction.

As illustrated in FIG. 3, the head chip 111 includes a flow path substrate 111*a*, a pressure chamber substrate 111*b*, a nozzle plate 111*c*, a vibration absorber 111*d*, a vibration plate 111*e*, the plurality of drive elements 111*f*, a protective plate 111*g*, a case 111*h*, and a wiring substrate 111*i*.

The flow path substrate 111*a* and the pressure chamber substrate 111*b* are laminated in this order in the Z1 direction, to form a flow path for supplying the adhesive GL to the 2×Mn nozzles Nz. The vibration plate 111*e*, the plurality of drive elements 111*f*, the protective plate 111*g*, the case 111*h*, and the wiring substrate 111*i* are installed in an area located in the Z1 direction with respect to a laminated body including the flow path substrate 111*a* and the pressure chamber substrate 111*b*. On the other hand, the nozzle plate 111*c* and the vibration absorber 111*d* are installed in an area located in the Z2 direction with respect to the laminated body. The elements of the head chip 111 are approximately plate-like members elongated in the direction along the Y-axis, and are bonded to each other. Hereinafter, each of the elements of the head chip 111 will be described in order.

The nozzle plate 111*c* is a plate-like member provided with 2×Mn nozzles Nz in a total of each of the nozzle array LA and the nozzle array LB. Each of the 2×Mn nozzles Nz is a through-hole through which the adhesive GL passes.

Here, a surface of the nozzle plate 111*c* facing the Z2 direction is a nozzle surface FN. A cross-sectional shape of the nozzle is typically a circle, but is not limited to this, and may be a non-circular shape such as polygonal and elliptical shapes.

The flow path substrate 111*a* is provided with a space R1, Mn supply flow paths Ra, and Mn communication flow paths Na for each of the nozzle array LA and the nozzle array LB. The space R1 is an elongated opening extending in the direction along the Y-axis in plan view in the direction along the Z-axis. Each of the supply flow path Ra and the communication flow path Na is a through-hole formed for each nozzle Nz. Each of the supply flow paths Ra communicates with the space R1.

The pressure chamber substrate 111*b* is a plate-like member provided with Mn pressure chambers CV for each of the nozzle array LA and the nozzle array LB. A plurality of pressure chambers CV are arranged in the direction along the Y-axis. Each of the pressure chambers CV is an elongated space formed for each nozzle Nz and extending in the direction along the X-axis in plan view.

The pressure chamber CV is a space located between the flow path substrate 111*a* and the vibration plate 111*e*. For each of the nozzle array LA and the nozzle array LB, Mn pressure chambers CV are arranged in the direction along the Y-axis. Further, the pressure chamber CV communicates with each of the communication flow path Na and the supply flow path Ra. Accordingly, the pressure chamber CV communicates with the nozzle Nz through the communication flow path Na, and communicates with the space R1 through the supply flow path Ra.

The vibration plate 111*e* is disposed on a surface of the pressure chamber substrate 111*b* facing the Z1 direction. The vibration plate 111*e* is a plate-like member that can elastically vibrate. On the surface of the vibration plate 111*e* facing the Z1 direction, Mn drive elements 111*f* corresponding to the nozzles Nz are disposed for each of the nozzle array LA and the nozzle array LB. Each of the drive elements 111*f* is a passive element that is deformed by the supply of the drive signal Com. Each of the drive elements 111*f* has an elongated shape extending in the direction along the X-axis in plan view. The Mn drive elements 111*f* are arranged in the direction along the Y-axis to correspond to the plurality of pressure chambers CV. The drive element 111*f* overlaps the pressure chamber CV in plan view.

Each of the drive elements 111*f* is a piezoelectric element, and although not illustrated, each of the drive elements 111*f* includes a first electrode, a piezoelectric layer, and a second electrode, which are laminated in the Z1 direction in this order. One electrode of the first electrode and the second electrode is an individual electrode disposed apart from each other for each drive element 111*f*, and the drive pulse PD is supplied to the one electrode. The other electrode of the first electrode and the second electrode is a band-like common electrode extending in the direction along the Y-axis to be continuous over the plurality of drive elements 111*f*, and the offset potential VBS is supplied to the other electrode. The piezoelectric layer is made of a piezoelectric material, such as lead zirconate titanate ($Pb(Zr, Ti)O_3$), and for example, forms a band shape extending in the direction along the Y-axis to be continuous over the plurality of drive elements 111*f*. However, the piezoelectric layer may be integrated over the plurality of drive elements 111*f*. In this case, in the piezoelectric layer, a through-hole penetrating the piezoelectric layer is provided to extend in the direction along the X-axis in an area corresponding to the gap between the pressure chambers CV adjacent to each other in plan view.

When the vibration plate 111*e* vibrates in conjunction with the deformation of the drive element 111*f*, the pressure in the pressure chamber CV fluctuates, to eject the adhesive GL from the nozzle Nz. The head chip 111 may include a heat generating element instead of the piezoelectric element.

The protective plate 111*g* is a plate-like member installed on the surface of the vibration plate 111*e* facing the Z1 direction, protects the 2×Mn drive elements 111*f*, and reinforces a mechanical strength of the vibration plate 111*e*. Here, the 2×Mn drive elements 111*f* are accommodated between the protective plate 111*g* and the vibration plate 111*e*. The protective plate 111*g* is made of, for example, a resin material.

The case 111*h* is a member that stores the adhesive GL supplied to the 2×Mn pressure chambers CV. The case 111*h* is made of, for example, a resin material. The case 111*h* is provided with a space R2 for each of the nozzle array LA and the nozzle array LB. One space R2 is a space communicating with the space R1, and functions as a reservoir R that stores the adhesive GL supplied to the Mn pressure chambers CV together with the space R1. In the case 111*h*, an introduction port IH for supplying the adhesive GL to each reservoir R is provided. The adhesive GL inside each reservoir R is supplied to the pressure chamber CV through each supply flow path Ra.

The vibration absorber 111*d* is a flexible resin film forming a wall surface of the reservoir R, and absorbs the pressure fluctuation of the adhesive GL in the reservoir R. The vibration absorber 111*d* is bonded to the flow path substrate 111*a*.

The wiring substrate 111*i* is mounted on the surface of the vibration plate 111*e* facing the Z1 direction, and is the mounting component for electrically coupling the head chip 111, the drive circuit 112, and the control module 110*b*. The wiring substrate 111*i* is, for example, a flexible wiring substrate, such as a COF. The drive circuit 112 is mounted on the wiring substrate 111*i* of the present embodiment. COF is an abbreviation for chip on film.

1-3. Example of Sample

Figure 4:
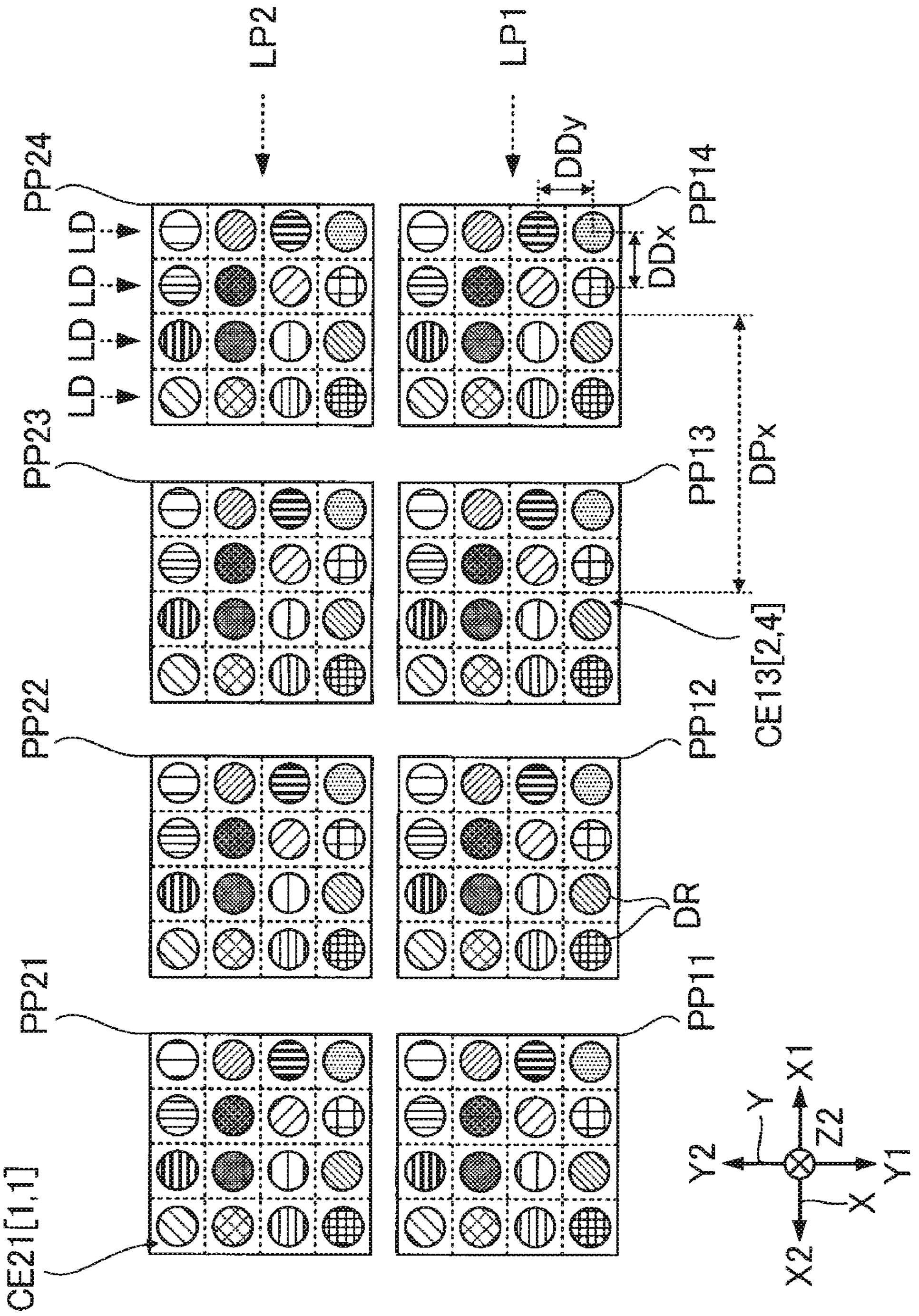
FIG. 4 is a diagram illustrating an example of a sample created by a sample creation operation according to a first embodiment.

FIG. 4 is a diagram illustrating an example of the sample created by the sample creation operation according to the first embodiment. FIG. 4 illustrates the sample created by dividing one medium PP into 16 areas CE divided into four parts in each of the directions along the X-axis and the Y-axis, and ejecting each of different types of the adhesives GL onto each of the areas CE to form liquid droplet DR on the medium PP. It can be said that the area CE is an area in which one liquid droplet DR is formed. The aspect of the division of the medium PP is not limited to the example in FIG. 4. For example, in an example of FIG. 4, the shape of the medium PP is a substantially square when viewed in the Z2 direction, but may be a long rectangle along the Y-axis or the X-axis. In addition, in the example of FIG. 4, one medium PP is divided into equal parts in the direction along the X-axis and the Y-axis, but the number of divisions in the direction along the X-axis and the number of divisions in the direction along the Y-axis may be different from each other. In addition, in the example of FIG. 4, the area CE is a substantially square shape, but may be a long rectangular shape along the Y-axis or the X-axis.

In FIG. 4, the fact that each of the liquid droplets DR to be formed is formed by different types of the adhesives GL is expressed by applying different types of shading. In order to prevent the drawing from being complicated, only a part of all of the liquid droplets DR illustrated in FIG. 4 is added with reference numerals. As can be understood from FIG. 4, the types of the liquid droplets DR formed in the 16 areas CE obtained by dividing one medium PP are all different from each other. Further, as can be understood from FIG. 4, the patterns of the liquid droplets DR formed on the plurality of media PP are all the same as each other. In the first embodiment, the pattern information PtI indicates the pattern of the liquid droplet DR illustrated in FIG. 4.

In the following description, as illustrated in FIG. 4, the four media PP disposed along the medium array LP1 will be referred to as a medium PP11, a medium PP12, a medium PP13, and a medium PP14 in order in the X1 direction sometimes. Similarly, the four media PP disposed along the medium array LP2 will be referred to as a medium PP21, a medium PP22, a medium PP23, and a medium PP24 in order in the X1 direction sometimes. In the following description, when the medium PP11 to the medium PP14 and the medium PP21 to the medium PP24 are not particularly distinguished, the medium PP11 to the medium PP14 and the medium PP21 to the medium PP24 will be simply referred to as the medium PP.

In addition, each area CE obtained by dividing one medium PP into 16 parts will be referred to as the area CE [x, y] sometimes. x indicates a value of a column counted from an end in the X2 direction among columns obtained by dividing one medium PP into four parts in the direction along the Y-axis. y indicates a value of a column counted from an end in the Y2 direction among columns obtained by dividing one medium PP into four parts in the direction along the X-axis.

Further, as illustrated in FIG. 4, each area CE obtained by dividing the medium PP11 into 16 parts will be referred to as an area CE11 [x, y] sometimes. As in the area CE11 [x, y], the area CE obtained by dividing the medium PP other than the medium PP11 into 16 parts will be expressed by adding the suffix XY as the area CEXY [x, y] sometimes. The suffix XY is any one of 11, 12, 13, 14, 21, 22, 23, and 24. The example of FIG. 4 illustrates that the area CE included in the medium PP21, located first from the end in the X2 direction, and located first from the end in the Y2 direction is the area CE21 [1, 1]. In addition, it is illustrated that the area CE included in the medium PP13, located second from the end in the X2 direction and located fourth from the end in the Y2 direction is the area CE13 [2,4].

In FIG. 4, the shape of the liquid droplet DR is a perfect circle when viewed in the Z2 direction, but the shape of the liquid droplet DR is not limited to the perfect circle, and may be, for example, an elliptical shape. It is desirable that the shape of the liquid droplet DR is a shape approximating the perfect circle when viewed in the Z2 direction. As the shape of the liquid droplet DR approximates to the perfect circle, it is possible to improve the accuracy of detecting each of the plurality of liquid droplets DR from the image obtained by imaging each of the plurality of liquid droplets DR on the medium PP.

As illustrated in FIG. 4, the 16 liquid droplets DR formed on one medium PP are classified into four liquid droplet columns LD which are arranged at intervals in the direction along the X-axis. The four liquid droplet columns LD extend along the Y-axis. FIG. 4 illustrates a liquid droplet column disposition interval DDx that is the disposition interval in the direction along the X-axis between two adjacent liquid droplet column LD among the plurality of liquid droplet columns LD formed on one medium PP.

Hereinafter, for the sake of simplification of the description, it will be described that the center of gravity of the liquid droplet DR and the center of gravity of the area CE match. Accordingly, the liquid droplet column disposition interval DDx is the same as the disposition interval in the direction along the X-axis between the adjacent areas CE.

In addition, FIG. 4 illustrates a disposition interval DDy in the direction along the Y-axis between adjacent liquid droplets DR among the plurality of liquid droplets DR formed on one medium PP. In the first embodiment, the disposition interval DDy is substantially the same as the liquid droplet column disposition interval DDx.

In addition, FIG. 4 illustrates a medium disposition interval DPx that is the disposition interval in the direction along the X-axis between the adjacent media PP among the plurality of media PP.

1-4. Formation Example of Liquid Droplet DR

As described above, the adhesive GL is ejected from the plurality of nozzles Nz into the area CE to form one liquid droplet DR. A specific formation example of the liquid droplet DR will be described with reference to FIG. 5.

Figure 5:
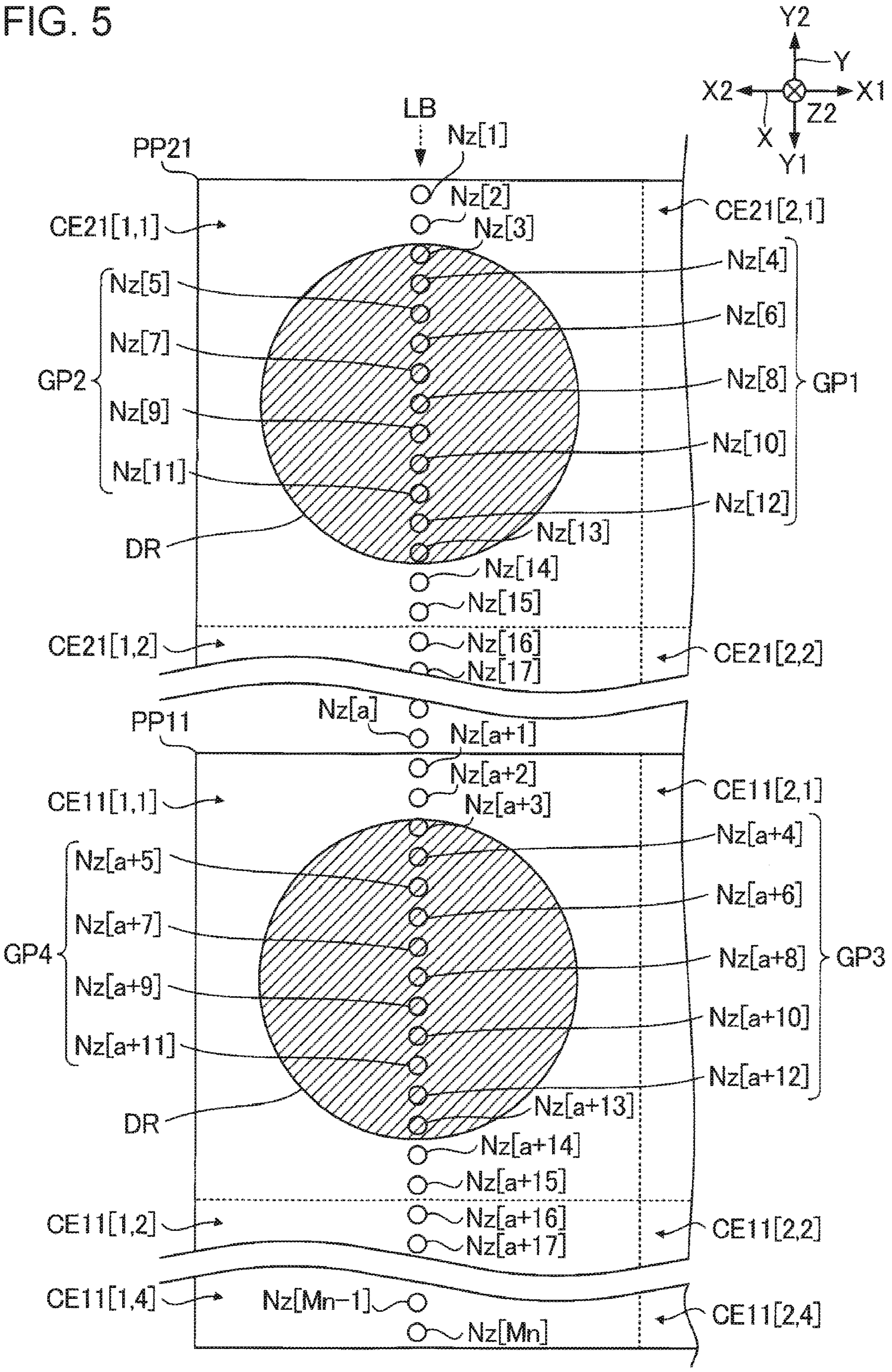
FIG. 5 is a diagram for describing a formation example of a liquid droplet.

FIG. 5 is a diagram for describing the formation example of the liquid droplet DR. FIG. 5 illustrates a positional relationship between the nozzle arrays LB when the liquid droplets DR are formed on the area CE21 [1, 1] of the medium PP21 and the area CE11 [1, 1] of the medium PP11.

The liquid ejecting apparatus 100 ejects the adhesive GL from the plurality of nozzles Nz constituting a part of the nozzle arrays LN in a state in which the relative movement is stopped, to form one liquid droplet DR in one area CE. Forming one liquid droplet DR from the plurality of nozzles Nz includes that the adhesives GL ejected from the plurality of nozzles Nz are combined before landing on the medium PP, and the adhesives GL ejected from the plurality of nozzles Nz land on the medium PP, and then are combined on the medium PP. In the first embodiment, the plurality of nozzles Nz constituting a part of the nozzle arrays LN are a part of the nozzles Nz included in one area CE when viewed in the Z2 direction. In the following description, in order to distinguish the Mn nozzles Nz included in one nozzle array LN, the nozzles Nz will be referred to as the first, second, . . . , and Mn-th in order from the end in the Y2 direction sometimes. In addition, the m-th nozzle Nz will be referred to as the nozzle Nz[m] sometimes. A variable m is an integer satisfying 1 or more and Mn or less.

In the example of FIG. 5, when viewed in the Z2 direction, the number of the nozzles Nz included in one area CE in one nozzle array LN is 15, but the number is not limited to 15, and the number of the nozzles Nz included in one area CE included in one area CE need only be one or more.

In the example of FIG. 5, the nozzles Nz included in the area CE21 [1, 1] are 15 nozzles Nz from the nozzle Nz[1] to the nozzle Nz[15]. In addition, the nozzles Nz included in the area CE11 [1, 1] are 15 nozzles Nz from the nozzle Nz[a+1] to the nozzle Nz[a+15]. a is an integer satisfying 1 or more and Mn or less, and in the first embodiment, is the number of the nozzles Nz included from the end of the 15×4+ medium PP21 in the Y1 direction to the end of the medium PP21 in the Y2 direction. In addition, as in the nozzle Nz[a], the nozzle Nz that is not included in any of the areas CE when viewed in the Z2 direction may exist. The nozzle Nz that is not included in any of the areas CE may exist between the medium PP21 and the medium PP11 as in the example of FIG. 5, or may exist between the adjacent areas CE in one medium PP. In addition, the nozzle Nz[1] does not have to be included in the area CE by locating the nozzle Nz[1] located at the end portion in the Y2 direction in the Y2 direction with respect to the medium PP21, and the nozzle Nz[Mn] does not have to be included in the area CE by locating the nozzle Nz[Mn] located at the end portion in the Y1 direction in the Y1 direction with respect to the medium PP11.

Regarding which of the plurality of nozzles Nz that form one liquid droplet DR in one area CE is one of the plurality of nozzles Nz that are included in one area CE when viewed in the Z2 direction, the following three aspects will be described.

In the first aspect of the nozzle Nz that forms the liquid droplets DR, the nozzle Nz that forms one liquid droplet DR in one area CE is one nozzle Nz among the one or plurality of nozzles Nz included in one area CE when viewed in the Z2 direction. The adhesive GL is ejected a plurality of times from the one nozzle Nz to form the liquid droplets DR. As a result, the liquid droplet DR can be made to approximate the perfect circle when viewed in the Z2 direction.

The first aspect of the nozzle Nz that forms the liquid droplet DR is a comparative example with respect to the second aspect and the third aspect of the nozzle Nz that forms the liquid droplet DR.

It should be noted that, in the example of FIG. 5, it is preferable that the plurality of nozzles Nz that form one liquid droplet DR in the area CE21 [1, 1] are the nozzles Nz[8] closest to the center of the area CE21 [1, 1] in the direction along the Y-axis among the plurality of nozzles Nz[1] to Nz included in one area CE21 [1, 1]. As a result, it is possible to prevent the liquid droplet DR formed in the area CE21 [1, 1] from going beyond the area CE21 [1,1].

In the second aspect of the nozzle Nz that forms the liquid droplets DR, the plurality of nozzles Nz that form one liquid droplet DR in one area CE is a plurality of continuously disposed nozzles Nz among the plurality of nozzles Nz included in one area CE when viewed in the Z2 direction. The adhesive GL is ejected a plurality of times from each of the plurality of continuously disposed nozzles Nz, to form the liquid droplets DR. As a result, the time required to form the liquid droplet DR can be reduced as compared with the first aspect of the nozzle Nz that forms the liquid droplet DR. In the example of FIG. 5, the plurality of nozzles Nz that form one liquid droplet DR in the area CE21 [1, 1] may be nine nozzles Nz from the nozzle Nz[4] to the nozzle Nz.

Here, when the number of the plurality of nozzles Nz that form one liquid droplet DR in one area CE is three or more, it is preferable that the number of times of ejection from the nozzle Nz that is not disposed at the end in the direction along the Y-axis among the plurality of nozzles Nz that form one liquid droplet DR is larger than the number of times of ejection from the nozzle Nz that is disposed at the end in the direction along the Y-axis. More specifically, regarding the number of times of ejection from the nozzle Nz that forms the liquid droplet DR, the number of times of ejection from the nozzle Nz that is disposed at the center in the direction along the Y-axis is largest, the number of times of ejection from the nozzle Nz that is disposed farther from the center in the direction along the Y-axis is smaller, and it is preferable that the number of times of ejection from the nozzle Nz that is disposed at the end in the direction along the Y-axis is smallest. The nozzles Nz that are disposed at the center in the direction along the Y-axis are one or two nozzles Nz located closest to the center of the width of one area CE in the direction along the Y-axis. In the example in which the liquid droplet DR is formed by nine nozzles Nz from the nozzle Nz[4] to the nozzle Nz[12], it is preferable that the number of times of ejection from the nozzle Nz[8] closest to the center in the direction along the Y-axis of the area CE21 [1,1] is larger than the number of times of ejection from each of the nozzle Nz[4] and the nozzle Nz that are disposed at the end portion in the direction along the Y-axis. As a result, the liquid droplet DR can be made to approximate the perfect circle when viewed in the Z2 direction.

It should be noted that the plurality of nozzles Nz that form one liquid droplet DR in one area CE may only be one or two nozzles Nz closest to the center of the area CE in the direction along the Y-axis and the nozzles Nz adjacent to that nozzle Nz. In the example of FIG. 5, by forming the liquid droplet DR by three nozzles Nz of the nozzle Nz[8] closest to the center of the area CE21 [1,1] in the direction along the Y-axis, the nozzles Nz[7] and nozzles Nz[9] adjacent to the nozzle Nz[8], as compared with when the liquid droplet DR is formed by nine nozzles Nz from the nozzle Nz[4] to the nozzle Nz[12], the liquid droplet DR can be made to approximate the perfect circle when viewed in the Z2 direction. Of course, even in this case, in order to making the liquid droplet DR approximate the perfect circle, it is more preferable that the number of times of ejection from the nozzle Nz[8] is larger than the number of times of ejection from each of the nozzle Nz[7] and the nozzle Nz[9].

Further, when the center of the area CE in the direction along the Y-axis is between the adjacent nozzles Nz, in other words, when there are two nozzles Nz closest to the center of the area CE in the direction along the Y-axis, the two nozzles Nz may be the plurality of continuously disposed nozzles for forming the liquid droplet DR, and even in this case, the liquid droplet DR can be made to approximate the perfect circle when viewed in the Z2 direction.

In the third aspect of the nozzle Nz that forms the liquid droplet DR, the plurality of nozzles Nz that form one liquid droplet DR in one area CE are the plurality of nozzles Nz that are not adjacent to each other.

The third aspect of the nozzle Nz that forms the liquid droplet DR will be described in more detail. In the example of FIG. 5, the plurality of nozzles Nz that form one liquid droplet DR in the area CE21 [1, 1] are a nozzle group GP1 or a nozzle group GP2. The nozzle group GP1 is constituted by the nozzle Nz[4], the nozzle Nz[6], the nozzle Nz[8], the nozzle Nz[10], and the nozzle Nz. The nozzle group GP2 is constituted by the nozzle Nz[5], the nozzle Nz[7], the nozzle Nz[9], and the nozzle Nz. Similarly, the plurality of nozzles Nz that form one liquid droplet DR in the area CE11 [1, 1] are a nozzle group GP3 or a nozzle group GP4. The nozzle group GP3 is constituted by the nozzle Nz[a+4], the nozzle Nz[a+6], the nozzle Nz[a+8], the nozzle Nz[a+10], and the nozzle Nz[a+12]. The nozzle group GP4 is constituted by the nozzle Nz[a+5], the nozzle Nz[a+7], the nozzle Nz[a+9], and the nozzle Nz[a+11].

As can be understood from FIG. 5, the five nozzles Nz constituting the nozzle group GP1 and the four nozzles Nz constituting the nozzle group GP2 are arranged alternately. Similarly, the five nozzles Nz constituting the nozzle group GP3 and the four nozzles Nz constituting the nozzle group GP4 are arranged alternately.

In an example of FIG. 5, the adhesive GL is ejected a plurality of times from each of the plurality of nozzles Nz constituting the nozzle group GP1 or the nozzle group GP2 that forms one liquid droplet DR in one area CE21 [1, 1] to form the liquid droplets DR on the medium PP21. When one liquid droplet DR is formed in one area CE21 [1, 1] by the nozzle group GP1, the adhesive GL is ejected a plurality of times from each of the nozzle Nz[4], the nozzle Nz[6], the nozzle Nz[8], the nozzle Nz[10], and the nozzle Nz to form the liquid droplets DR. When one liquid droplet DR is formed in one area CE21 [1, 1] by the nozzle group GP2, the adhesive GL is ejected a plurality of times from each of the nozzle Nz[5], the nozzle Nz[7], the nozzle Nz[9], and the nozzle Nz to form the liquid droplets DR.

Here, when the number of the plurality of nozzles Nz that form one liquid droplet DR in one area CE is three or more, it is preferable that the number of times of ejection from the nozzle Nz that is not disposed at the end in the direction along the Y-axis among the plurality of nozzles Nz that form one liquid droplet DR in one area CE is larger than the number of times of ejection from the nozzle Nz that is disposed at the end in the direction along the Y-axis. More specifically, regarding the number of times of ejection from the nozzle Nz that forms the liquid droplet DR, the number of times of ejection from the nozzle Nz that is disposed at the center in the direction along the Y-axis is largest, the number of times of ejection from the nozzle Nz that is disposed farther from the center in the direction along the Y-axis is smaller, and it is preferable that the number of times of ejection from the nozzle Nz that is disposed at the end in the direction along the Y-axis is smallest. The nozzles Nz that are disposed at the center in the direction along the Y-axis are one or two nozzles Nz located closest to the center of the width of one area CE in the direction along the Y-axis.

For example, when the liquid droplet DR is formed on the area CE21 [1, 1] by the nozzle group GP1 in FIG. 5, the nozzle Nz disposed at the center in the direction along the Y-axis in the nozzle group GP1 is the nozzle Nz[8]. Then, out of the number of times of ejection from each of the nozzles Nz constituting the nozzle group GP1, the number of times of ejection from the nozzle Nz[8] is largest, the number of times of ejection from the nozzle Nz[6] and the number of times of ejection from the nozzle Nz are larger, and the number of times of ejection from the nozzle Nz[4] and the number of times of ejection from the nozzle Nz are smallest. As a result, the liquid droplet DR can be made to approximate the perfect circle when viewed in the Z2 direction.

In addition, for example, when the liquid droplet DR is formed on the area CE21 [1, 1] by the nozzle group GP2 in FIG. 5, the nozzles Nz disposed at the center in the direction along the Y-axis in the nozzle group GP2 are the nozzle Nz[7] and the nozzle Nz[9]. Then, when the nozzle Nz constituting the nozzle group GP2 forms one liquid droplet DR, out of the number of times of ejection from each of the nozzles Nz constituting the nozzle group GP2, the number of times of ejection from the nozzle Nz[7] and the number of times of ejection from the nozzle Nz[9] are largest, and the number of times of ejection from the nozzle Nz[5] and the number of times of ejection from the nozzle Nz are smallest. As a result, the liquid droplet DR can be made to approximate the perfect circle when viewed in the Z2 direction.

When the liquid droplet DR is generated in the area CE21 [1,1], the liquid ejecting head 110*a* may eject the adhesive GL from the nozzle Nz belonging to any one of the nozzle group GP1 and the nozzle group GP2, but in which it is preferable to change the nozzle for each medium PP. For example, the liquid ejecting head 110*a* may eject the adhesive GL from the nozzle Nz constituting the nozzle group GP1 into the area CE21 [1, 1], and may eject the adhesive GL from the nozzle Nz constituting the nozzle group GP2 into the area CE22 [1, 1]. Alternatively, the liquid ejecting head 110*a* may change the plurality of nozzles Nz that form one liquid droplet DR in one area CE each time the liquid ejecting head 110*a* performs scanning in the main scanning direction, specifically, may switch between the nozzle group GP1 and the nozzle group GP2 that form one liquid droplet DR in one area CE.

1-5. Sample Creation Operation

The sample creation operation will be described with reference to FIGS. 6 to 14. In FIGS. 6 to 14, the liquid ejecting apparatus 100 will be described as including four liquid ejecting heads 110*a*, and the four liquid ejecting heads 110*a* will be described as including two head chips 111. Stated another way, the liquid ejecting apparatus 100 includes 16 nozzle arrays LN. In order to distinguish the four liquid ejecting heads 110*a*, in order from the liquid ejecting head 110*a* disposed at the end in the X1 direction toward the X2 direction, the four liquid ejecting heads 110*a* will be referred to as a liquid ejecting head 110*a*1, a liquid ejecting head 110*a*2, a liquid ejecting head 110*a*3, and a liquid ejecting head 110*a*4 sometimes. Further, in order to distinguish the 16 nozzle arrays LN, with i as an integer from 1 to 4, the nozzle array LA included in the head chip 111 disposed in the X1 direction of the liquid ejecting head 110*ai* will be referred to as a nozzle array LAi1, and the nozzle array LB will be referred to as a nozzle array LBi1, sometimes. Similarly, the nozzle array LA included in the head chip 111 disposed in the X2 direction of the liquid ejecting head 110*ai* will be referred to as a nozzle array LAi2, and the nozzle array LB will be referred to as a nozzle array LBi2, sometimes.

Further, in FIGS. 7 to 14, in order to prevent the drawings from being complicated, the formation of the liquid droplet DR in the area CE is illustrated by applying shading to the area CE. In addition, for the sake of simplification of the description, with i as an integer from 1 to 4, the adhesive GL ejected from each nozzle Nz of the nozzle array LBi2 is an adhesive GL_i×4−3, the adhesive GL ejected from each nozzle Nz of the nozzle array LBi1 is an adhesive GL_i×4−2, the adhesive GL ejected from each nozzle Nz of the nozzle array LAi2 is an adhesive GL_i×4−1, and the adhesive GL ejected from each nozzle Nz of the nozzle array LAi1 is an adhesive GL_i×4. For example, when i is 1, the adhesive GL ejected from each nozzle Nz of the nozzle array LB12 is adhesive GL_1×4−3=adhesive GL_1.

In addition, in FIGS. 7 to 14, in order to prevent the drawings from being complicated, as the display for convenience, when one nozzle array LN overlaps the medium PP in plan view, the plurality of nozzles Nz overlapping a certain area CE among the plurality of areas CE included in the medium PP are displayed as one nozzle group Ng. In the present embodiment, the adhesive GL is ejected from the plurality of nozzles Nz belonging to one nozzle group Ng among the plurality of nozzles Ng included in one nozzle array LN onto one medium PP, to form the liquid droplet DR in the area CE overlapping the one nozzle group Ng in plan view. That is, the following description of the sample creation operation in the present embodiment will be made as the second aspect or the third aspect of the nozzle Nz that forms the liquid droplet DR. The following description of the sample creation operation in the present embodiment may be made as the first aspect of the nozzle Nz that forms the liquid droplet DR, and in that case, one nozzle group Ng that forms one liquid droplet DR in the area CE can be read as one nozzle Nz.

In the present embodiment, as illustrated in FIG. 4, two media PP are disposed in the direction along the Y-axis, and four rows of the areas CE are disposed in one medium PP. Accordingly, 2×4=eight areas CE are disposed in the direction along the Y-axis. Therefore, in the present embodiment, one nozzle array LN includes eight nozzle groups Ng. In order to distinguish these eight nozzle groups Ng, the eight nozzle groups Ng will be referred to as the first, second, . . . , and eighth in order in the Y1 direction sometimes. In addition, the n-th nozzle group Ng will be referred to as a nozzle group Ng[n] sometimes. A variable n is an integer satisfying 1 or more and 8 or less. In FIGS. 7 to 14, in order to prevent the drawings from being complicated, the nozzle groups Ng[1] to Ng[8] are applied only to the nozzle array LB11, and the reference numerals of other nozzle arrays LN are omitted. When the example of FIG. 5 is used, the nozzle group Ng[1] is 15 nozzles Nz from the nozzle Nz[1] to the nozzle Nz[15], and the nozzle group Ng[5] is 15 nozzles Nz from the nozzle Nz[a+1] to the nozzle Nz[a+15]. In the present embodiment, since two media PP simultaneously overlap one nozzle array LN in plan view, the adhesive GL is ejected from the nozzles Nz belonging to two nozzle groups Ng among the eight nozzle groups Ng included in one nozzle column LN. For the nozzles Nz belonging to the two nozzle groups Ng, the adhesive GL is ejected from the plurality of nozzles Nz of one nozzle group Ng of the two nozzle groups Ng onto one medium PP of the two media PP, the adhesive GL is ejected from the plurality of nozzles Nz of the other nozzle group Ng onto the other medium PP. In the second aspect or the third aspect of the nozzle Nz that forms the liquid droplet DR, the adhesive GL is ejected from a part or all of the nozzles Nz among all of the nozzles Nz constituting one nozzle group Ng. For the sake of simplification of the description, in the following description, sometimes, the description will be made that the adhesive GL is ejected from the nozzle group Ng.

Further, in FIGS. 7 to 14, a line segment coupling any of the eight nozzle groups Ng of each nozzle array LN to the area CE means that the adhesive GL is ejected from the nozzle group Ng indicated by one end of the line segment into the area CE indicated by the other end of the line segment. In addition, originally, the liquid ejecting head 110*a* and a part or all of the media PP overlap each other when viewed in the Z2 direction, but in order to easily understand whether or not the liquid droplet DR is formed in each area CE in the medium PP, in FIGS. 7 to 14, as the display for convenience, the medium PP is displayed by being shifted in the Y2 direction.

Figure 6:
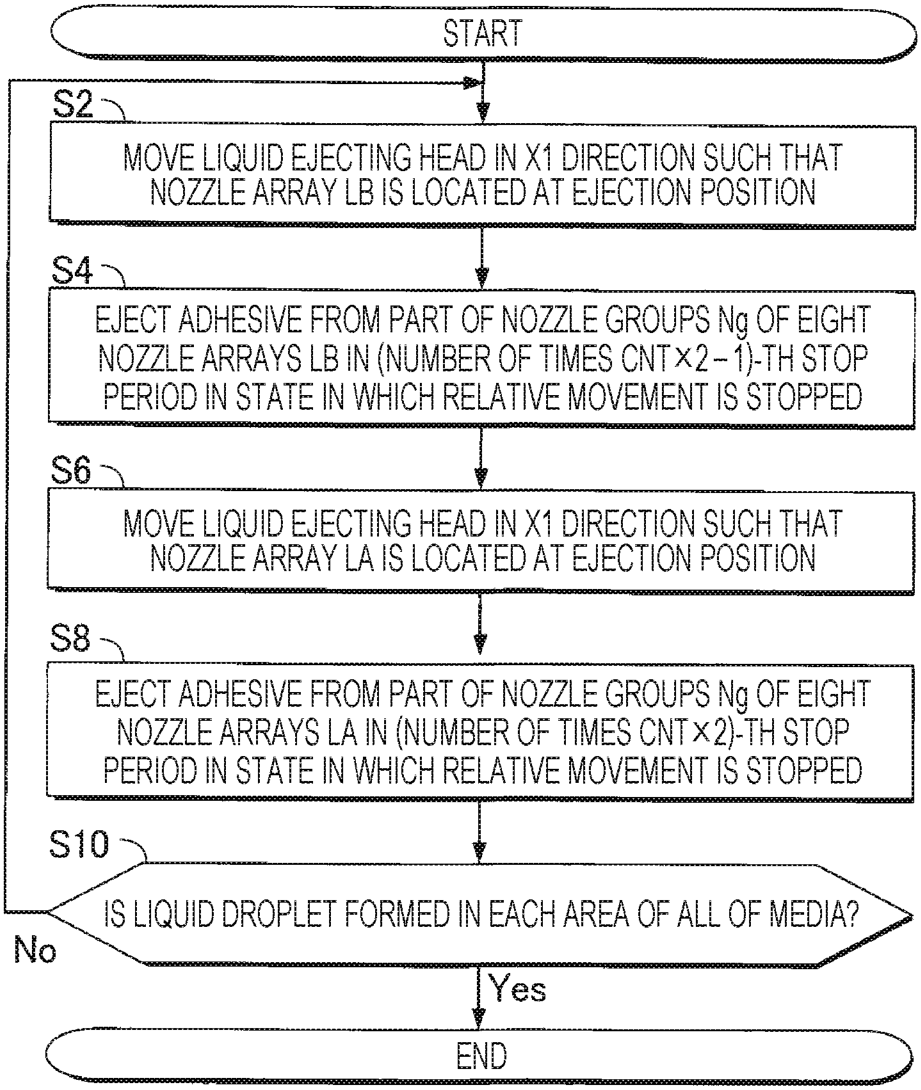
FIG. 6 is a diagram illustrating a flowchart illustrating the sample creation operation.

FIG. 6 is a flowchart illustrating the sample creation operation. As illustrated in FIG. 6, in the sample creation operation, the series of processes from step S2 to step S8 are repeatedly executed a plurality of times. Hereinafter, for easy description, the number of times of execution of the series of processes from step S2 to step S8 will be referred to as the number of times CNT sometimes.

In the sample creation operation illustrated in FIG. 6, the adhesive GL is ejected from the nozzle group Ng of the nozzle array LB to form the liquid droplet DR in the area CE of the liquid droplet column LD that is an odd number counted from the end of each medium PP in the X2 direction, and the adhesive GL is ejected from the nozzle group Ng of the nozzle array LA to form the liquid droplet DR in the area CE of the liquid droplet column LD that is an even number counted from the end of each medium PP in the X2 direction.

Figure 7:
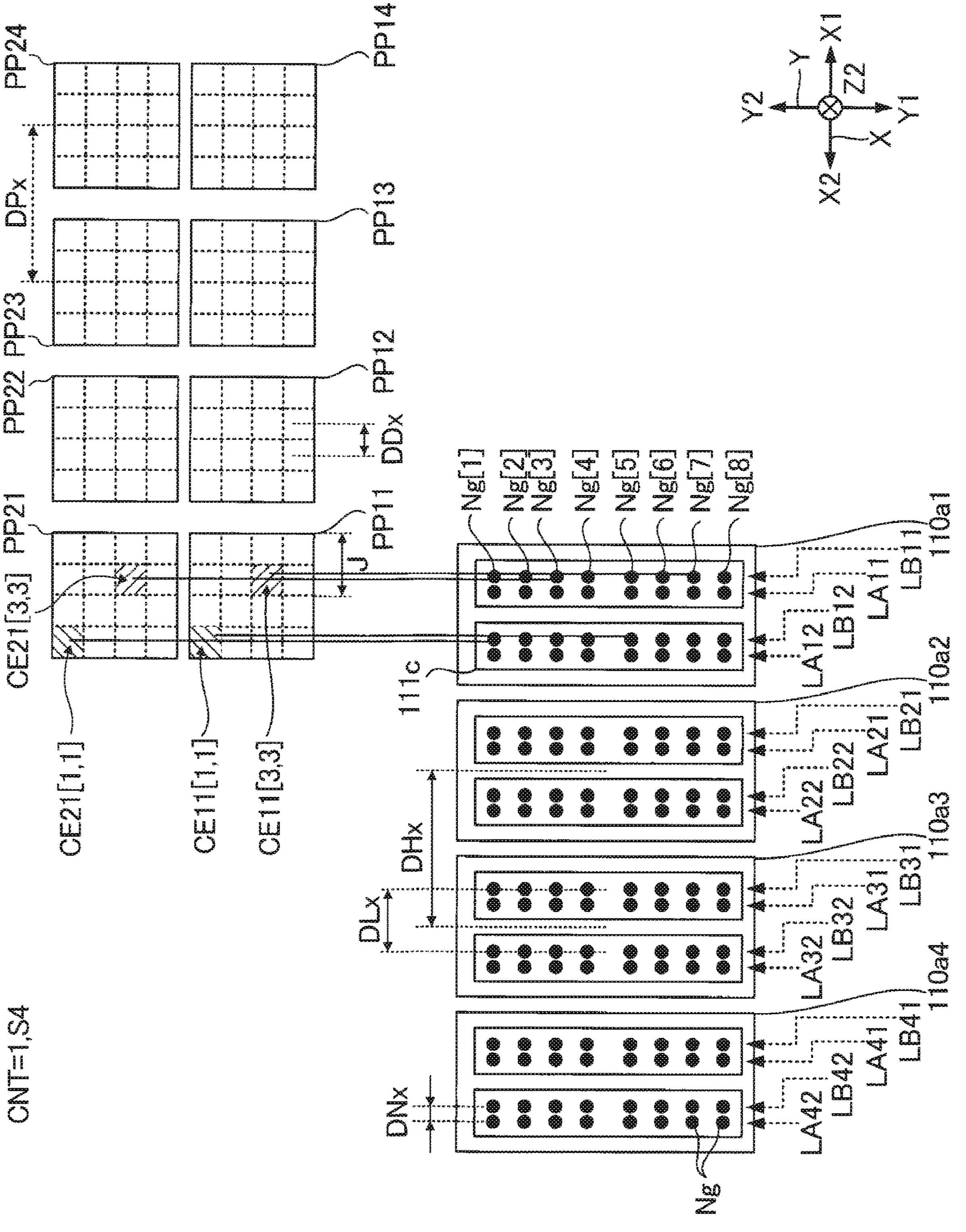
FIG. 7 is a diagram illustrating a state of a medium after step S4 is executed when the number of times is 1.

In step S2, the control circuit 170 moves the liquid ejecting head 110*a* in the X1 direction such that a part of the nozzle arrays LB or all of the nozzle arrays LB among the eight nozzle arrays LB included in the liquid ejecting apparatus 100 are located at ejection positions. The position at which the nozzle array LB performs the ejection is a position at which a part of the nozzles Nz of the nozzle array LB is included in any of the areas CE when viewed in the Z2 direction. After the process in step S2 ends, in step S4, in a state in which the relative movement between the medium PP and the liquid ejecting head 110*a* is stopped, the control circuit 170 ejects the adhesive GL from a part of the nozzle groups Ng constituting a part of the nozzle arrays LB or all of the nozzle arrays LB among the eight nozzle arrays LB included in the liquid ejecting apparatus 100 in the same period. The same period is a period in which the relative movement is stopped in step S4 and step S8. That is, the same period means the same period among one or a plurality of periods in which the relative movement is stopped while the liquid droplet DR is formed on one medium PP. Hereinafter, the same period will be referred to as the "same stop period" sometimes. A specific length of one stop period is set by a manufacturer of the liquid ejecting apparatus 100 and the like. As illustrated in FIG. 6, the stop period of step S4 is the (number of times CNT×2−1)-th stop period. Among the eight nozzle arrays LB included in the liquid ejecting apparatus 100, the adhesive GL is not ejected from the nozzle Nz that does not overlap the medium PP when viewed in the Z2 direction. Accordingly, in step S4, when there is the nozzle Nz that does not overlap the medium PP when viewed in the Z2 direction among the eight nozzle arrays LB included in the liquid ejecting apparatus 100, the adhesive GL is ejected from the nozzle Nz constituting a part of the nozzle arrays LB among the eight nozzle arrays LB included in the liquid ejecting apparatus 100 in the (number of times CNT×2−1)-th stop period. Further, in the present embodiment, as described above, even in the nozzles Nz that overlap the medium PP when viewed in the Z2 direction, the adhesive GL is not ejected from all of the nozzles Nz, and the adhesive GL is ejected from two nozzle groups Ng among the eight nozzle groups Ng included in one nozzle array LN. With reference to FIG. 7, a state of the medium PP after step S4 is executed when the number of times CNT is 1 will be described.

FIG. 7 is a diagram illustrating a state of the medium PP after step S4 is executed when the number of times CNT is 1. When the number of times CNT is 1, in step S4, the liquid ejecting head 110*al* ejects the adhesive GL_1 from the nozzle group Ng[1] of the nozzle array LB12 to form the liquid droplet DR in the area CE21 [1, 1], and ejects the adhesive GL_1 from the nozzle group Ng[5] of the nozzle array LB12 to form the liquid droplet DR in the area CE11 [1,1]. Further, the liquid ejecting head 110*al* ejects the adhesive GL_2 from the nozzle group Ng[3] of the nozzle array LB11 to form the liquid droplet DR in the area CE21 [3, 3], and ejects the adhesive GL_2 from the nozzle group Ng[7] of the nozzle array LB11 to form the liquid droplet DR in the area CE11 [3, 3]. In the third aspect of the nozzle Nz that forms the liquid droplet DR, the liquid ejecting head 110*al* ejects the adhesive GL_1 from the nozzle group GP1 or the nozzle group GP2 among the nozzle groups Ng[1], and ejects the adhesive GL_1 from the nozzle group GP3 or the nozzle group GP4 among the nozzle groups Ng[5].

It should be noted that, regardless of the value of the number of times CNT except when the nozzle array LB12 and the nozzle array LB11 do not face the medium PP, in step S4, the liquid ejecting head 110*al* ejects the adhesive GL_1 from the nozzle group Ng[1] and the nozzle group Ng[5] of the nozzle array LB12 to form the liquid droplet DR in each area CE [1, 1] of the media PP arranged in the direction along the Y-axis, and ejects the adhesive GL_2 from the nozzle group Ng[3] and the nozzle group Ng[7] of the nozzle array LB11 to form the liquid droplet DR in each area CE [3,3] of the media PP arranged in the direction along the Y-axis. As can be understood from the shading applied to each area CE, two liquid droplets DR formed from one nozzle array LN are the same type as each other. Specifically, the liquid droplet DR formed in the area CE21 [1, 1] and the liquid droplet DR formed in the area CE11 [1, 1] are the same type as each other. In addition, the liquid droplet DR formed in the area CE21 [3, 3] and the liquid droplet DR formed in the area CE11 [3, 3] are the same type as each other.

In the medium PP21 which is one medium PP, the liquid droplet DR formed in the area CE21 [1, 1] and the liquid droplet DR formed in the area CE21 [3, 3] are different types from each other. In addition, since the area CE21 [1,1] and the area CE21 [3, 3] are different areas from each other, the liquid droplets DR formed in each of the area CE21 [1, 1] and the area CE21 [3, 3] do not overlap each other. Accordingly, the liquid ejecting apparatus 100 ejects the different types of the adhesives GL onto the medium PP21 which is one medium PP to two-dimensionally form the liquid droplets DR of the different types of the adhesives GL on the medium PP21 one by one such that the liquid droplets DR do not overlap each other.

As illustrated in FIG. 7, the nozzle array disposition interval DNx is shorter than the liquid droplet column disposition interval DDx. Stated another way, since the nozzle array disposition interval DNx is smaller than one time the liquid droplet column disposition interval DDx, the nozzle array disposition interval DNx is not an integral multiple of the liquid droplet column disposition interval DDx. Accordingly, it is not possible to simultaneously form the liquid droplet DR in each area CE corresponding to both the nozzle array LB and the nozzle array LA by ejecting the adhesive GL from the nozzle array LB and the nozzle array LA in the same stop period.

In addition, as illustrated in FIG. 7, the plurality of liquid ejecting heads 110*a* are disposed at substantially equal intervals. FIG. 7 illustrates a head disposition interval DHx, which is the disposition interval in the direction along the X-axis between the adjacent liquid ejecting heads 110*a*. In the first embodiment, the head disposition interval DHx is an integral multiple of the medium disposition interval DPx. In the present embodiment, the head disposition interval DHx is substantially the same as the medium disposition interval DPx.

In addition, when the following expression (1) is satisfied, the number of the nozzle arrays LN ejected from one liquid ejecting head 110*a* in the same stop period can be increased, and the period required to create the sample can be reduced.

$$J=\mathrm{ROUND}(DLx/DDx) \quad (1)$$

J indicates the number from the liquid droplet column LD located at the end in the X1 direction, among the plurality of liquid droplet columns LD including the liquid droplet DR formed in the same stop period as the stop period in which the liquid droplet DR included in the liquid droplet column LD located at the end in the X2 direction of one medium PP is formed, to the liquid droplet column LD located at the end in the X1 direction of one medium PP. In the first embodiment, since the liquid droplet column LD, which is located at the end in the X1 direction among the plurality of liquid droplet columns LD including the liquid droplet DR formed in the same stop period as the stop period in which the liquid droplet DR included in the liquid droplet column LD located at the end in the X2 direction of one medium PP is formed, is the second liquid droplet column LD from the end in the X1 direction of the medium PP, J=2. DLx is a disposition interval in the direction along the X-axis between the nozzle arrays LN that perform the ejection in the same stop period in the adjacent head chips 111. ROUND (α) is a function that outputs an integer obtained by rounding off to the first decimal place of α, which is a real number. For the sake of simplification of the description, hereinafter, ROUND (DLx/DDx) will be referred to as L. In the first embodiment, L is 2.

J is represented by the following expression (2).

$$J = CntY - L \times (E - 1) \quad (2)$$

CntY is the number of the liquid droplet columns LD formed on one medium PP. CntY can also be said to be the number of columns in which the liquid droplets DR formed on one medium PP are arranged in the direction along the Y-axis. E is the number of the plurality of nozzle arrays LN that perform the ejection onto one medium PP in the same stop period. In the first embodiment, CntY is 4, and E is 2. In the first embodiment, when each value is substituted into the expression (2), the expression (3) is obtained.

$$2 = 4 - 2 \times (2 - 1) \quad (3)$$

When the expression (2) is substituted into the expression (1) and rearranged, the following expression (4) is obtained.

$$CntY = L \times E \quad (4)$$

CntY is represented by the following expression (5).

$$CntY - Cnt/CntX \quad (5)$$

Cnt is the number of the liquid droplets DR formed on one medium PP. CntX is the number of rows of the liquid droplets DR formed on one medium PP. CntX can also be said to be the number of rows in which the liquid droplets DR formed on one medium PP are arranged in the direction along the X-axis. In the first embodiment, Cnt is 16, and CntX is 4.

When the expression (5) is substituted into the expression (4), the following expression (6) is obtained.

$$Cnt/CntX = L \times E \quad (6)$$

In addition, the expression (6) can be modified into the following expression (7).

$$Cnt/CntX = \mathrm{ROUND}(DLx/DDx) \times E \quad (7)$$

Figure 8:
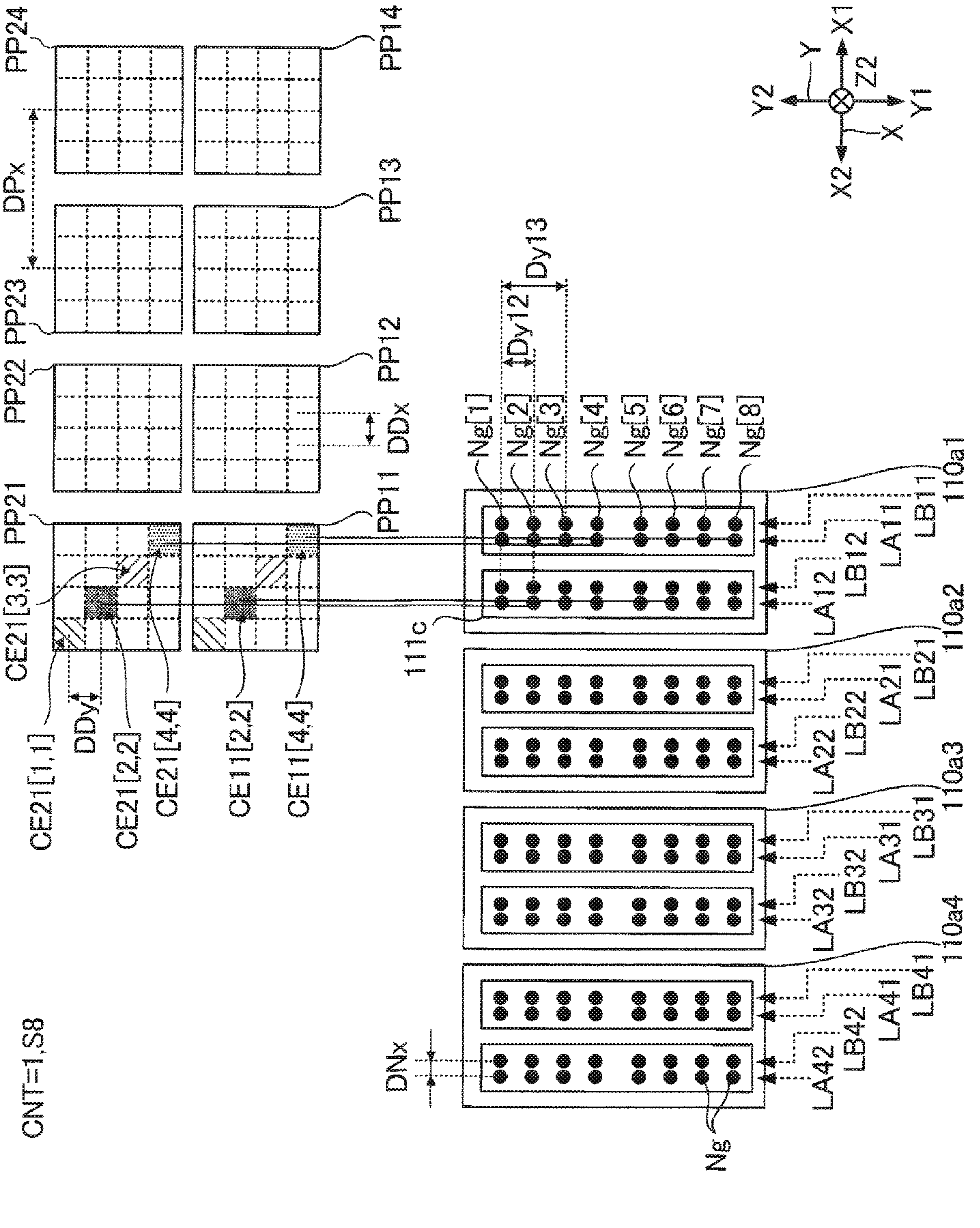
FIG. 8 is a diagram illustrating a state of the medium after step S8 is executed when the number of times is 1.

The description returns to FIG. 6. After the process in step S4 ends, in step S6, the control circuit 170 moves the liquid ejecting head 110*a* in the X1 direction such that a part of the nozzle arrays LA or all of the nozzle arrays LA among the eight nozzle arrays LA included in the liquid ejecting apparatus 100 are located at ejection positions. The position at which the nozzle array LA performs the ejection is a position at which a part of the nozzles Nz of the nozzle array LA is included in any of the areas CE when viewed in the Z2 direction. After the process in step S6 ends, in step S8, in a state in which the relative movement between the medium PP and the liquid ejecting head 110*a* is stopped, the control circuit 170 ejects the adhesive GL from the nozzles Nz constituting a part of the nozzle arrays LA or all of the nozzle arrays LA among the eight nozzle arrays LA included in the liquid ejecting apparatus 100 in the same stop period. As illustrated in FIG. 6, the stop period of step S8 is the (number of times CNT×2)-th stop period. Among the eight nozzle arrays LA, the adhesive GL is not ejected from the nozzle Nz that does not overlap the medium PP when viewed in the Z2 direction. Accordingly, in step S8, when there is the nozzle Nz that does not overlap the medium PP when viewed in the Z2 direction among the eight nozzle arrays LA included in the liquid ejecting apparatus 100, the adhesive GL is ejected from the nozzle Nz constituting a part of the nozzle arrays LA among the eight nozzle arrays LA included in the liquid ejecting apparatus 100 in the (number of times CNT×2)-th stop period. With reference to FIG. 8, a state of the medium PP after step S8 is executed when the number of times CNT is 1 will be described.

FIG. 8 is a diagram illustrating a state of the medium PP after step S8 is executed when the number of times CNT is 1. During a period from the state of FIG. 7 to the state of FIG. 8, the liquid ejecting head 110*a* moves in the X1 direction by a total amount of the liquid droplet column disposition interval DDx and the nozzle array disposition interval DNx. It should be noted that, regardless of the value of the number of times CNT, an amount of movement of the liquid ejecting head 110*a* from step S4 to step S8 is the total amount of the liquid droplet column disposition interval DDx and the nozzle array disposition interval DNx, and thus the description of the amount of movement of the liquid ejecting head 110*a* from step S4 to step S8 will be omitted.

When the number of times CNT is 1, in step S8, the liquid ejecting head 110*al* ejects the adhesive GL_3 from the nozzle group Ng[2] of the nozzle array LA12 to form the liquid droplet DR in the area CE21 [2, 2], and ejects the adhesive GL_3 from the nozzle group Ng[6] of the nozzle array LA12 to form the liquid droplet DR in the area CE11 [2,2]. Further, the liquid ejecting head 110*al* ejects the adhesive GL_4 from the nozzle group Ng[4] of the nozzle array LA11 to form the liquid droplet DR in the area CE21 [4, 4], and ejects the adhesive GL_4 from the nozzle group Ng[8] of the nozzle array LA11 to form the liquid droplet DR in the area CE11 [4, 4].

It should be noted that, regardless of the value of the number of times CNT except when the nozzle array LA12 and the nozzle array LA11 do not face the medium PP, in step S8, the liquid ejecting head 110*al* ejects the adhesive GL_3 from the nozzle group Ng[2] and the nozzle group Ng[6] of the nozzle array LA12 to form the liquid droplet DR in each area CE [2,2] of the media PP arranged in the direction along the Y-axis, and ejects the adhesive GL_4 from the nozzle group Ng[4] and the nozzle group Ng[8] of the nozzle array LA11 to form the liquid droplet DR in each area CE [4,4] of the media PP arranged in the direction along the Y-axis. Accordingly, the description of the operations of the nozzle array LA12 and the nozzle array LA11 in step S8 will be omitted below.

FIG. 8 illustrates an interval Dy13 in the direction along the Y-axis between the nozzle group Ng[1] in which the liquid droplets DR are formed in the area CE21 [1,1] in step S4, and the nozzle group Ng[3] in which the liquid droplets DR are formed in the area CE21 [3, 3] in step S4. The interval between the two nozzle groups Ng is a distance from the central position of one nozzle group Ng to the central position of the other nozzle group Ng. The central position of the nozzle group Ng is a position of the center of the line segment from the nozzle Nz located at the end in the Y1 direction to the nozzle Nz located at the end in the Y2 direction in the nozzle group Ng. As can be understood from FIG. 8, the interval Dy13 is longer than the disposition interval DDy between the liquid droplets DR adjacent to each other in the direction along the Y-axis. In other words, the nozzle group Ng[1] and the nozzle group Ng[3] are separated from each other by an interval larger than the disposition interval DDy.

In addition, FIG. 8 illustrates an interval Dy12 in the direction along the Y-axis between the nozzle group Ng[1] in which the liquid droplets DR are formed in the area CE21 [1,1] in step S4, and the nozzle group Ng[2] in which the liquid droplets DR are formed in the area CE21 [2, 2] in step S8. The interval Dy12 is equal to or larger than the disposition interval DDy. In the first embodiment, the interval Dy12 is substantially the same as the disposition interval DDy, but it is preferable that the interval Dy12 is longer than the disposition interval DDy.

The description returns to FIG. 6. After the process in step S8 ends, the control circuit 170 determines whether or not the liquid droplet DR is formed in each area CE of all of the media PP in step S10. When a determination result in step S10 is negative, the control circuit 170 returns the process to step S2. When the determination result in step S10 is affirmative, the control circuit 170 ends the series of processes illustrated in FIG. 6. Thereafter, when the number of times CNT is 2, 3, and 4, respectively, a state of the medium PP after step S4 is executed and a state of the medium PP after step S4 is executed are described with reference to FIGS. 9 to 14.

Figure 9:
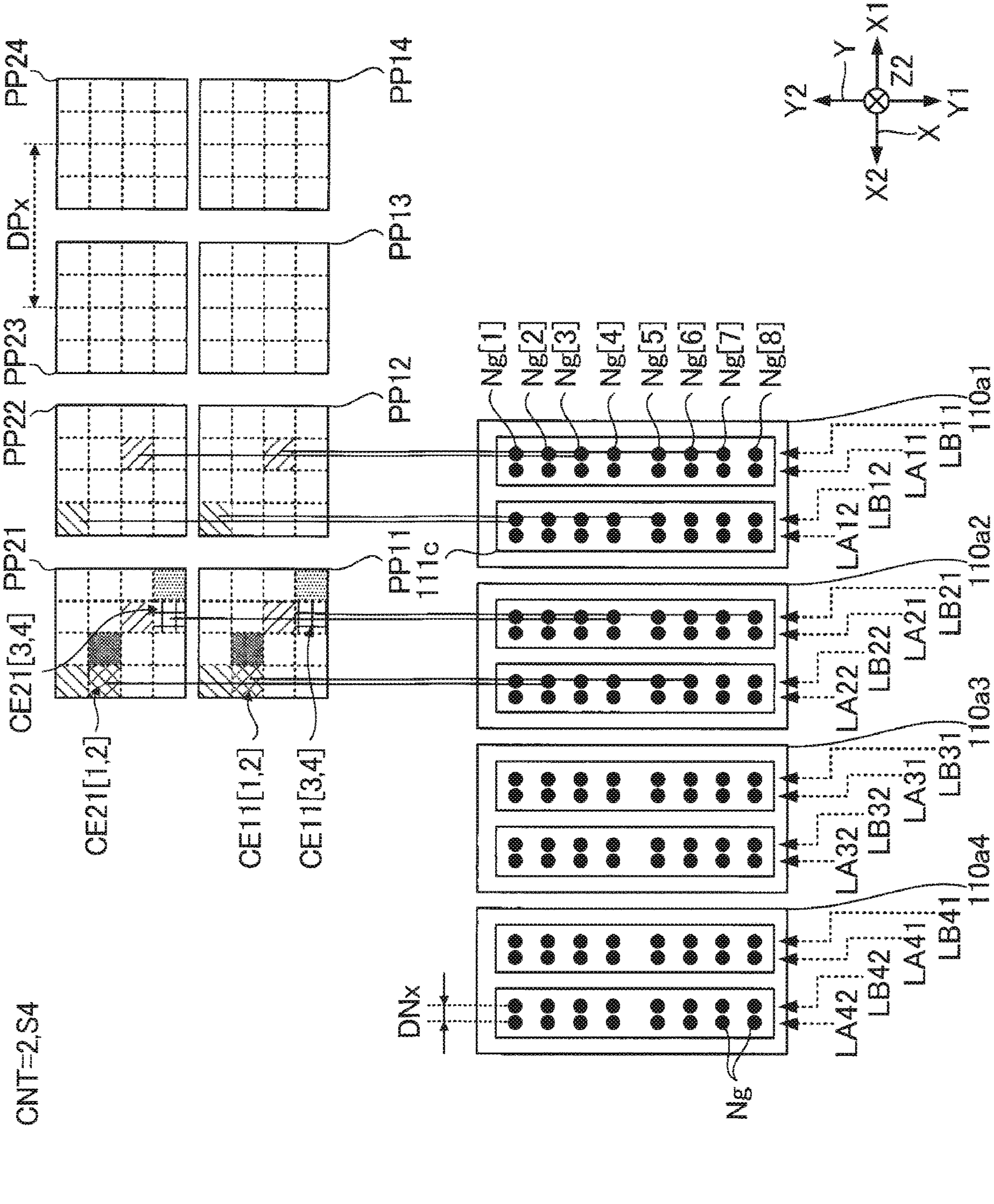
FIG. 9 is a diagram illustrating a state of the medium after step S4 is executed when the number of times is 2.

FIG. 9 is a diagram illustrating a state of the medium PP after step S4 is executed when the number of times CNT is 2. During a period from the state of FIG. 8 to the state of FIG. 9, the liquid ejecting head 110*a* moves in the X1 direction by an amount obtained by subtracting the liquid droplet column disposition interval DDx and the nozzle array disposition interval DNx from the medium disposition interval DPx. It should be noted that, regardless of the value of the number of times CNT, an amount of movement of the liquid ejecting head 110*a* from step S8 to step S4 is the amount obtained by subtracting the liquid droplet column disposition interval DDx and the nozzle array disposition interval DNx from the medium disposition interval DPx, and thus the description of the amount of movement of the liquid ejecting head 110*a* from step S8 to step S4 will be omitted.

When the number of times CNT is 2, in step S4, the liquid ejecting head 110*a*2 ejects the adhesive GL_5 from the nozzle group Ng[2] of the nozzle array LB22 to form the liquid droplet DR in the area CE21 [1, 2], and ejects the adhesive GL_5 from the nozzle group Ng[6] of the nozzle array LB22 to form the liquid droplet DR in the area CE11 [1,2]. Further, the liquid ejecting head 110*a*2 ejects the adhesive GL_6 from the nozzle group Ng[4] of the nozzle array LB21 to form the liquid droplet DR in the area CE21 [3, 4], and ejects the adhesive GL_6 from the nozzle group Ng[8] of the nozzle array LB21 to form the liquid droplet DR in the area CE11 [3,4].

It should be noted that, regardless of the value of the number of times CNT except when the nozzle array LB22 and the nozzle array LB21 do not face the medium PP, in step S4, the liquid ejecting head 110*a*2 ejects the adhesive GL_5 from the nozzle group Ng[2] and the nozzle group Ng[6] of the nozzle array LB22 to form the liquid droplet DR in each area CE [1,2] of the media PP arranged in the direction along the Y-axis, and ejects the adhesive GL_6 from the nozzle group Ng[4] and the nozzle group Ng[8] of the nozzle array LB21 to form the liquid droplet DR in each area CE [3,4] of the media PP arranged in the direction along the Y-axis. Accordingly, the description of the operations of the nozzle array LB22 and the nozzle array LB21 in step S4 will be omitted below.

Figure 10:
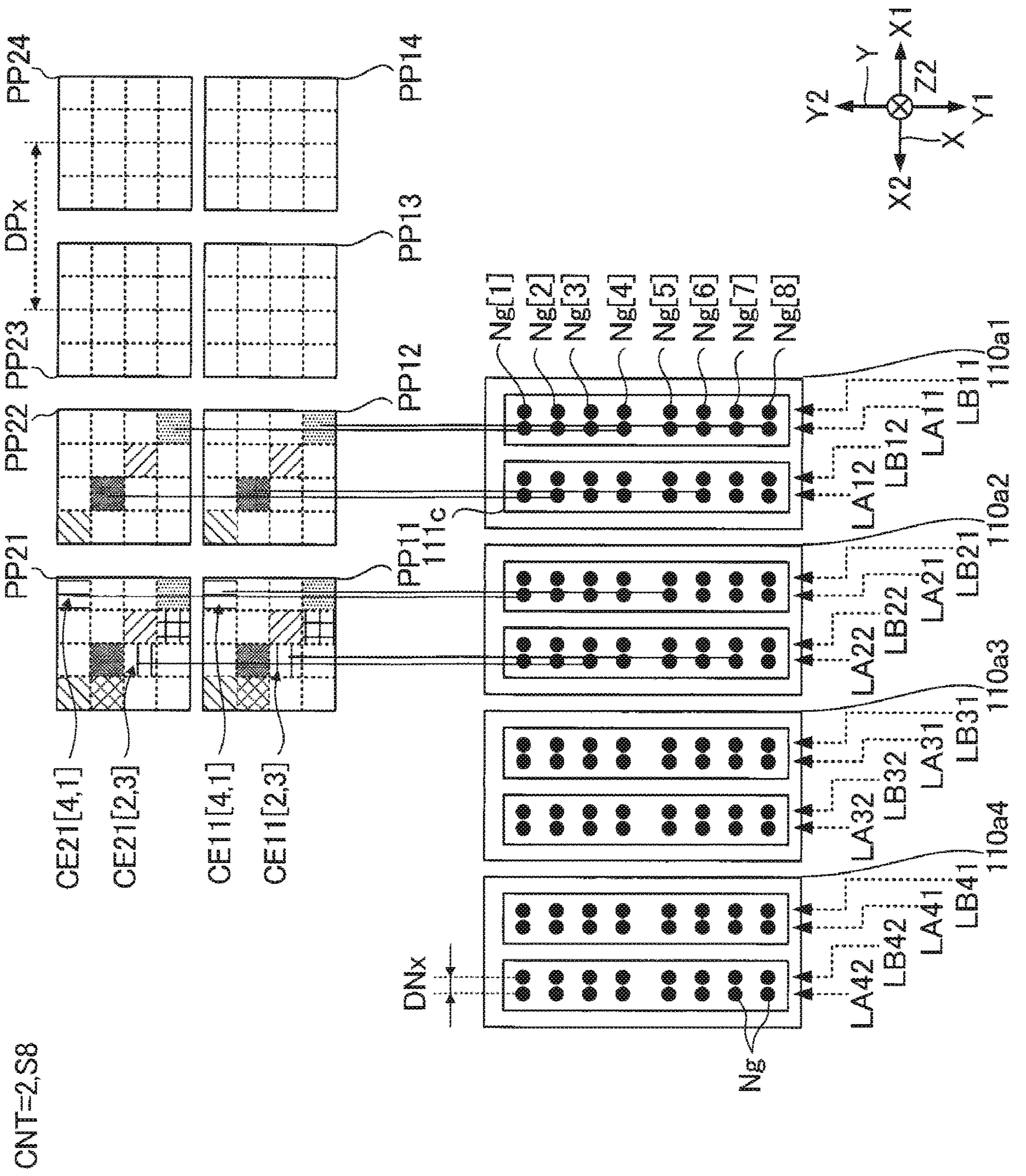
FIG. 10 is a diagram illustrating a state of the medium after step S8 is executed when the number of times is 2.

FIG. 10 is a diagram illustrating a state of the medium PP after step S8 is executed when the number of times CNT is 2. When the number of times CNT is 2, in step S8, the liquid ejecting head 110*a*2 ejects the adhesive GL_7 from the nozzle group Ng[3] of the nozzle array LA22 to form the liquid droplet DR in the area CE21 [2, 3], and ejects the adhesive GL_7 from the nozzle group Ng[7] of the nozzle array LA22 to form the liquid droplet DR in the area CE11 [2,3]. Further, the liquid ejecting head 110*a*2 ejects the adhesive GL_8 from the nozzle group Ng[1] of the nozzle array LA21 to form the liquid droplet DR in the area CE21 [4, 1], and ejects the adhesive GL_8 from the nozzle group Ng[5] of the nozzle array LA21 to form the liquid droplet DR in the area CE11 [4,1].

It should be noted that, regardless of the value of the number of times CNT except when the nozzle array LA22 and the nozzle array LA21 do not face the medium PP, in step S8, the liquid ejecting head 110*a*2 ejects the adhesive GL_7 from the nozzle group Ng[3] and the nozzle group Ng[7] of the nozzle array LA22 to form the liquid droplet DR in each area CE [2,3] of the media PP arranged in the direction along the Y-axis, and ejects the adhesive GL_8 from the nozzle group Ng[1] and the nozzle group Ng[5] of the nozzle array LA21 to form the liquid droplet DR in each area CE [4,1] of the media PP arranged in the direction along the Y-axis. Accordingly, the description of the operations of the nozzle array LA22 and the nozzle array LA21 in step S8 will be omitted below.

Figure 11:
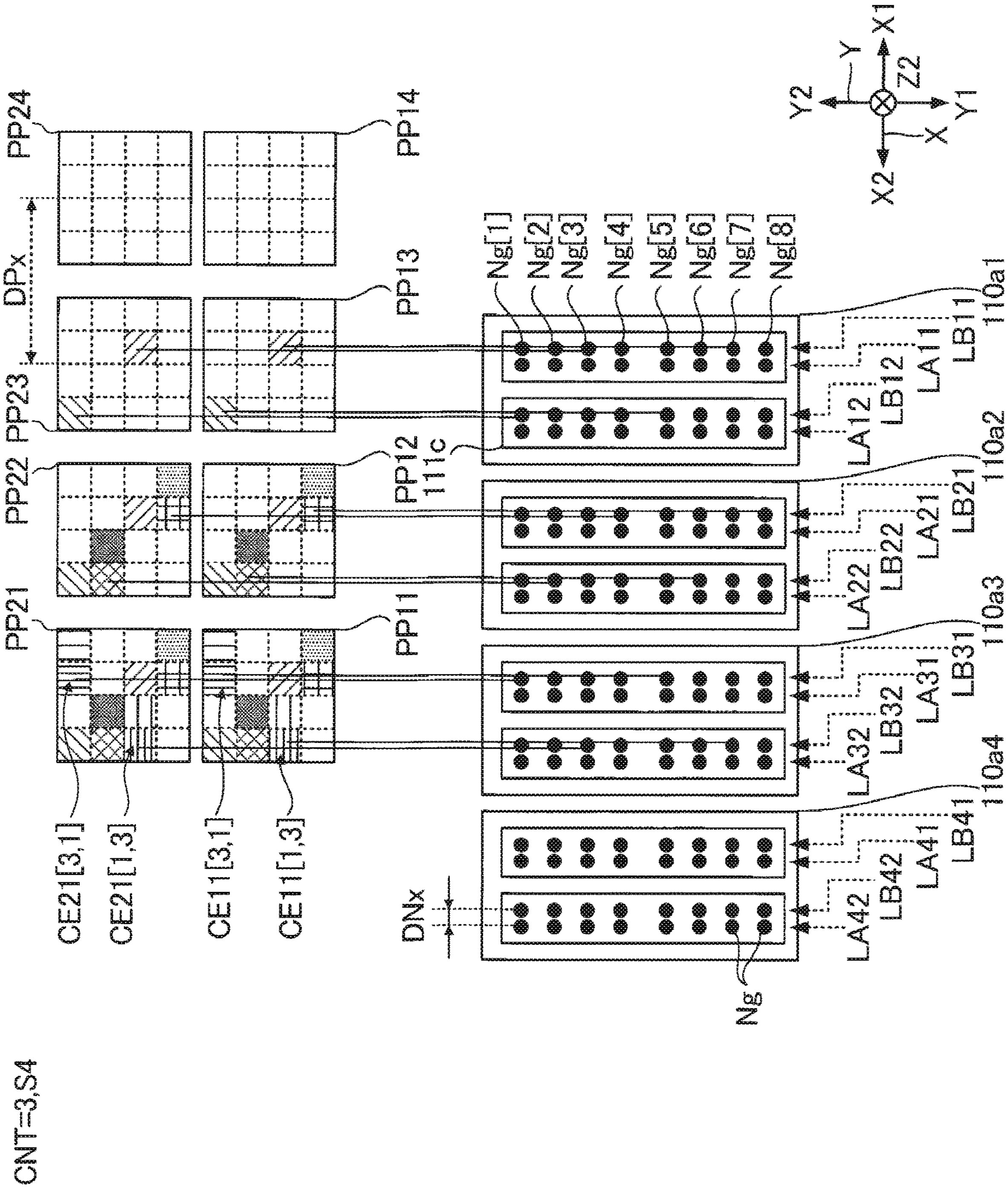
FIG. 11 is a diagram illustrating a state of the medium after step S4 is executed when the number of times is 3.

FIG. 11 is a diagram illustrating the state of the medium PP after step S4 is executed when the number of times CNT is 3. When the number of times CNT is 3, in step S4, the liquid ejecting head 110*a*3 ejects the adhesive GL_9 from the nozzle group Ng[3] of the nozzle array LB32 to form the liquid droplet DR in the area CE21 [1, 3], and ejects the adhesive GL_9 from the nozzle group Ng[7] of the nozzle array LB32 to form the liquid droplet DR in the area CE11 [1,3]. Further, the liquid ejecting head 110*a*3 ejects the adhesive GL_10 from the nozzle group Ng[1] of the nozzle array LB31 to form the liquid droplet DR in the area CE21 [3,1], and ejects the adhesive GL_10 from the nozzle group Ng[5] of the nozzle array LB31 to form the liquid droplet DR in the area CE11 [3,1].

It should be noted that, regardless of the value of the number of times CNT except when the nozzle array LB32 and the nozzle array LB31 do not face the medium PP, in step S4, the liquid ejecting head 110*a*3 ejects the adhesive GL_9 from the nozzle group Ng[3] and the nozzle group Ng[7] of the nozzle array LB32 to form the liquid droplet DR in each area CE [1, 3] of the media PP arranged in the direction along the Y-axis, and ejects the adhesive GL_10 from the nozzle group Ng[1] and the nozzle group Ng[5] of the nozzle array LB31 to form the liquid droplet DR in each area CE[3,1] of the media PP arranged in the direction along the Y-axis. Accordingly, the description of the operations of the nozzle array LB32 and the nozzle array LB31 in step S4 will be omitted below.

Figure 12:
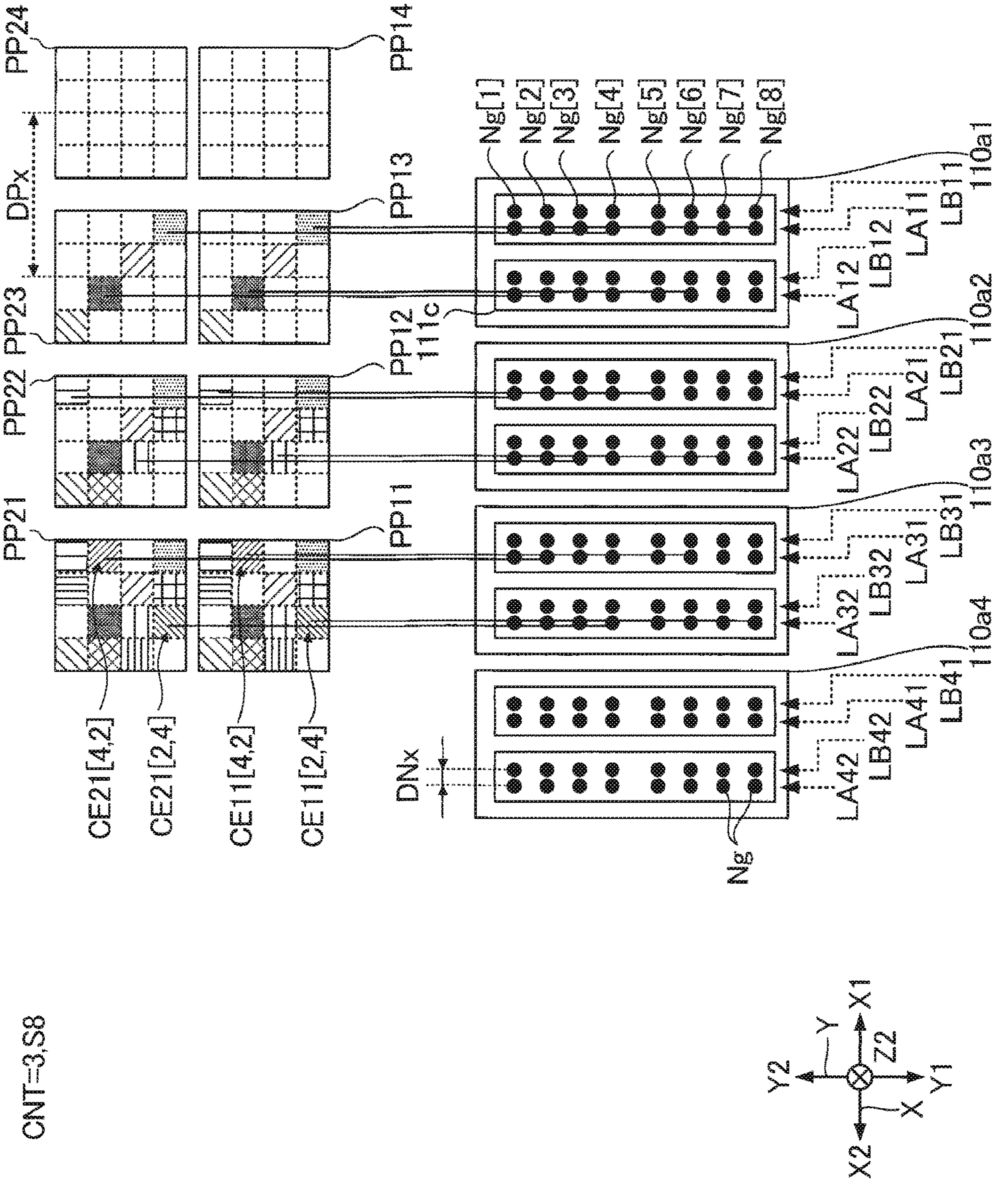
FIG. 12 is a diagram illustrating a state of the medium after step S8 is executed when the number of times is 3.

FIG. 12 is a diagram illustrating a state of the medium PP after step S8 is executed when the number of times CNT is 3. When the number of times CNT is 3, in step S8, the liquid ejecting head 110*a*3 ejects the adhesive GL_11 from the nozzle group Ng[4] of the nozzle array LA32 to form the liquid droplet DR in the area CE21 [2, 4], and ejects the adhesive GL_11 from the nozzle group Ng[8] of the nozzle array LA32 to form the liquid droplet DR in the area CE11 [2,4]. Further, the liquid ejecting head 110*a*3 ejects the adhesive GL_12 from the nozzle group Ng[2] of the nozzle array LA31 to form the liquid droplet DR in the area CE21 [4, 2], and ejects the adhesive GL_12 from the nozzle group Ng[6] of the nozzle array LA31 to form the liquid droplet DR in the area CE11 [4, 2].

It should be noted that, regardless of the value of the number of times CNT except when the nozzle array LA32 and the nozzle array LA31 do not face the medium PP, in step S8, the liquid ejecting head 110*a*3 ejects the adhesive GL_11 from the nozzle group Ng[4] and the nozzle group Ng[8] of the nozzle array LA32 to form the liquid droplet DR in each area CE [2, 4] of the media PP arranged in the direction along the Y-axis, and ejects the adhesive GL_12 from the nozzle group Ng[2] and the nozzle group Ng[6] of the nozzle array LA31 to form the liquid droplet DR in each area CE [4,2] of the media PP arranged in the direction along the Y-axis. Accordingly, the description of the operations of the nozzle array LA32 and the nozzle array LA31 in step S8 will be omitted below.

Figure 13:
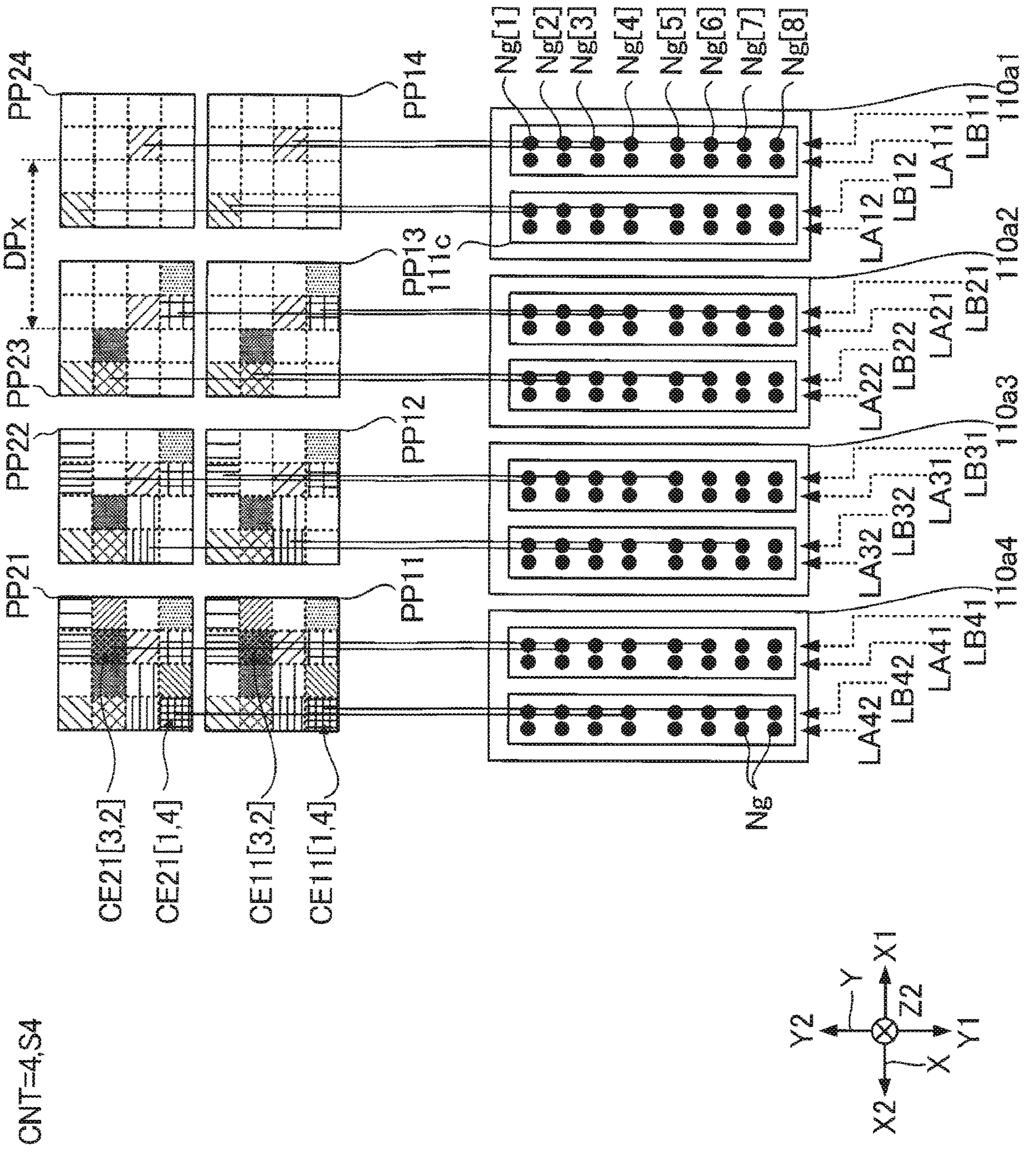
FIG. 13 is a diagram illustrating a state of the medium after step S4 is executed when the number of times is 4.

FIG. 13 is a diagram illustrating a state of the medium PP after step S4 is executed when the number of times CNT is 4. When the number of times CNT is 4, in step S4, the liquid ejecting head 110*a*4 ejects the adhesive GL_13 from the nozzle group Ng[4] of the nozzle array LB42 to form the liquid droplet DR in the area CE21 [1, 4], and ejects the adhesive GL_13 from the nozzle group Ng[8] of the nozzle array LB42 to form the liquid droplet DR in the area CE11 [1,4]. Further, the liquid ejecting head 110*a*4 ejects the adhesive GL_14 from the nozzle group Ng[2] of the nozzle array LB41 to form the liquid droplet DR in the area CE21 [3,2], and ejects the adhesive GL_14 from the nozzle group Ng[6] of the nozzle array LB41 to form the liquid droplet DR in the area CE11 [3,2].

It should be noted that, regardless of the value of the number of times CNT except when the nozzle array LB42 and the nozzle array LB41 do not face the medium PP, in step S4, the liquid ejecting head 110*a*4 ejects the adhesive GL_13 from the nozzle group Ng[4] and the nozzle group Ng[8] of the nozzle array LB42 to form the liquid droplet DR in each area CE [1, 4] of the media PP arranged in the direction along the Y-axis, and ejects the adhesive GL_14 from the nozzle group Ng[2] and the nozzle group Ng[6] of the nozzle array LB41 to form the liquid droplet DR in each area CE [3,2] of the media PP arranged in the direction along the Y-axis. Accordingly, the description of the operations of the nozzle array LB42 and the nozzle array LB41 in step S4 will be omitted below.

Figure 14:
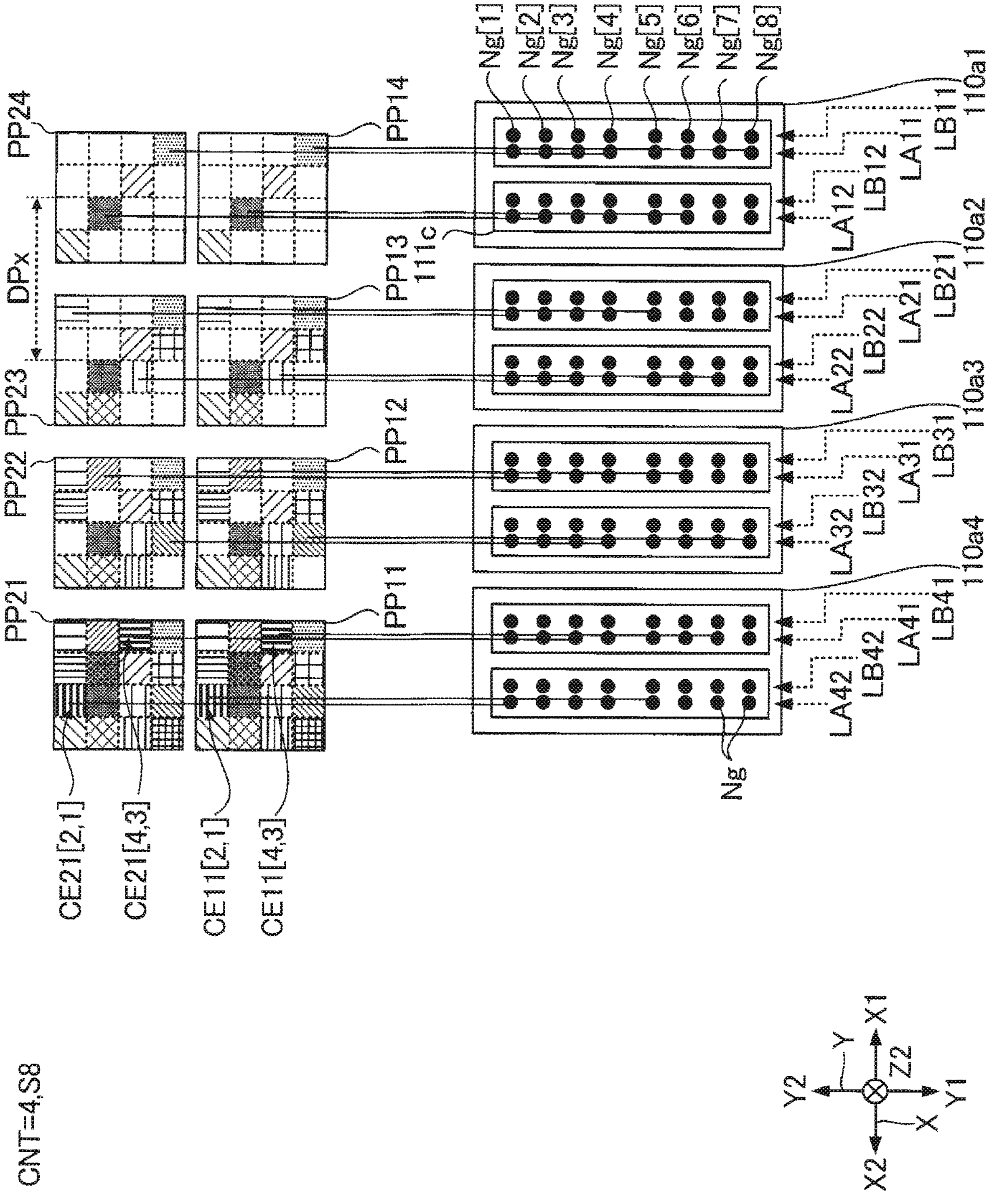
FIG. 14 is a diagram illustrating a state of the medium after step S8 is executed when the number of times is 4.

FIG. 14 is a diagram illustrating a state of the medium PP after step S8 is executed when the number of times CNT is 4. When the number of times CNT is 4, in step S8, the liquid ejecting head 110*a*4 ejects the adhesive GL_15 from the nozzle group Ng[1] of the nozzle array LA42 to form the liquid droplet DR in the area CE21 [2, 1], and ejects the adhesive GL_15 from the nozzle group Ng[5] of the nozzle array LA42 to form the liquid droplet DR in the area CE11 [2,1]. Further, the liquid ejecting head 110*a*4 ejects the adhesive GL_16 from the nozzle group Ng[3] of the nozzle array LA41 to form the liquid droplet DR in the area CE21

[4, 3], and ejects the adhesive GL_16 from the nozzle group Ng[7] of the nozzle array LA41 to form the liquid droplet DR in the area CE11 [4, 3].

It should be noted that, regardless of the value of the number of times CNT except when the nozzle array LA42 and the nozzle array LA41 do not face the medium PP, in step S8, the liquid ejecting head 110*a*4 ejects the adhesive GL_15 from the nozzle group Ng[1] and the nozzle group Ng[5] of the nozzle array LA42 to form the liquid droplet DR in each area CE [2,1] of the media PP arranged in the direction along the Y-axis, and ejects the adhesive GL_16 from the nozzle group Ng[3] and the nozzle group Ng[7] of the nozzle array LA41 to form the liquid droplet DR in each area CE [4,3] of the media PP arranged in the direction along the Y-axis. Accordingly, the description of the operations of the nozzle array LA42 and the nozzle array LA41 in step S8 will be omitted below.

At a point in time when the number of times CNT is 4 and the process of step S8 ends, the liquid droplet DR is formed in all of the 16 areas CE of the medium PP11 and the medium PP21, and thus the liquid ejecting apparatus 100 finishes the creation of the medium PP11 and the medium PP21 as the samples. Thereafter, the liquid ejecting apparatus 100 repeats the series of processes from step S2 to step S8 until the creation of the medium PP12, the medium PP22, the medium PP13, the medium PP23, the medium PP14, and the medium PP24 as the samples is finished.

1-6. Summary of First Embodiment

1-6-1. Summary of Creation of Large Number of Samples

In the following description, the summary of the creation of a large number of the samples by using the nozzle array LB12, the nozzle array LB11, and the nozzle array LA12 in the sample creation operation illustrated in FIGS. 6 to 14 will be described.

It should be noted that, in Section 1-6-1, for the sake of simplification of the description, the liquid droplet DR formed in the area CE21 [1, 1] by the adhesive GL_1 will be referred to as a liquid droplet DR_1 sometimes. Similarly, the liquid droplet DR formed in the area CE21 [3, 3] by the adhesive GL_2 will be referred to as a liquid droplet DR_2 sometimes. In addition, the liquid droplet DR formed in the area CE21 [2, 2] by the adhesive GL_3 will be referred to as a liquid droplet DR_3 sometimes. In addition, the liquid droplet DR formed in the area CE11 [1,1] by the adhesive GL_1 will be referred to as a liquid droplet DR_4 sometimes.

As described above, in the liquid ejecting method according to the first embodiment, the plurality of types of the adhesives GL are ejected from the plurality of liquid ejecting heads 110*a* each including the plurality of nozzle arrays LN. Then, the adhesive GL_1 is ejected from the nozzle array LB12 of one liquid ejecting head 110*al* among the plurality of liquid ejecting heads 110*a*, the adhesive GL_2 that is different in type from the adhesive GL_1 is ejected from the nozzle array LB11 of one liquid ejecting head 110*a*1, the plurality of liquid ejecting heads 110*a* are configured to move relative to the plurality of media PP, and in a state in which the relative movement is stopped, the one liquid ejecting head 110*al* forms the liquid droplet DR_1 formed by the adhesive GL_1 ejected from the nozzle array LB12 and the liquid droplet DR_2 formed by the adhesive GL_2 ejected from the nozzle array LB11 on one medium PP21 among the plurality of media PP in the same stop period such that the liquid droplet DR_1 and the liquid droplet DR_2 do not overlap each other.

In the liquid ejecting method according to the first embodiment, the liquid droplets DR of the different types of the adhesives GL can be formed on the medium PP from the plurality of nozzle arrays LN included in the liquid ejecting head 110*a* in the same stop period, and thus the creation time of the sample can be reduced. Further, since the adhesive GL is ejected in a state in which the relative movement is stopped, the liquid droplet DR can be stably fixed on the medium PP as compared with the aspect in which the adhesive GL is ejected while the relative movement is being performed. In addition, in the liquid ejecting method according to the first embodiment, since a plurality of types, specifically, four types of the adhesives GL can be ejected by one liquid ejecting head 110*a*, even when the types of the adhesives GL are increased, the number of the liquid ejecting heads 110*a* required to create the sample can be reduced, and the increase in size of the system for creating the sample can be suppressed, as compared with when the sample is created by a plurality of dispensers corresponding to the number of types of the adhesives GL. Accordingly, it can be said that the liquid ejecting method according to the first embodiment is suitable for creating a large number of the samples.

In the liquid ejecting method according to the first embodiment, the plurality of types of the adhesives GL are ejected from the plurality of liquid ejecting heads 110*a*, but the plurality of types of the adhesives GL may be ejected from one liquid ejecting head 110*a*. In addition, in the liquid ejecting method according to the first embodiment, the liquid droplet DR is formed on the plurality of media PP, but the liquid droplet DR may be formed on one medium PP.

In addition, in the liquid ejecting method according to the first embodiment, in a state in which the relative movement is stopped, the adhesive GL_1 is ejected a plurality of times from at least one nozzle Nz constituting the nozzle array LB12 to form the liquid droplet DR_1 on the medium PP21.

In addition, each of all of the plurality of nozzle arrays LN included in the liquid ejecting head 110*a* ejects the different types of the adhesives GL among the plurality of types of the adhesives GL onto one medium PP to two-dimensionally form the liquid droplets DR of the different types of the adhesives GL on one medium PP one by one such that the liquid droplets DR do not overlap each other.

By arranging the adhesive GL two-dimensionally on the medium PP, many types of the liquid droplet DR can be arranged in one medium PP, and the size of the sample can be reduced. As a result that the size of the sample can be reduced, in the liquid ejecting method according to the present embodiment, a plurality of samples can be created at one time as compared with the aspect in which the liquid droplets DR are arranged along a column on the medium PP.

Each of a part of the plurality of nozzle arrays LN included in the liquid ejecting head 110*a* may eject the different types of the adhesives GL among the plurality of types of the adhesives GL onto one medium PP to two-dimensionally form the liquid droplets DR of the different types of the adhesives GL on one medium PP one by one such that the liquid droplets DR do not overlap each other. That is, as described above, there may be the nozzle array LN that is not used in the sample creation operation.

In addition, the liquid ejecting head 110*a* includes the plurality of nozzle plates 111*c* each including two or more nozzle arrays LN among the plurality of nozzle arrays LN, each of the plurality of nozzle arrays LN is constituted by arranging the plurality of nozzles Nz in the direction along the Y-axis, and the plurality of nozzle plates 111*c* are arranged in direction along the X-axis orthogonal to the direction along the Y-axis. The nozzle array disposition interval DNx in the direction along the X-axis between the adjacent nozzle arrays LN among the two or more nozzle arrays LN included in each of the plurality of nozzle plates 111*c* is not an integral multiple of the liquid droplet column disposition interval DDx in the direction along the X-axis between the adjacent liquid droplet columns LD among the plurality of liquid droplet columns LD formed on one medium PP. The liquid ejecting apparatus 100 performs the relative movement after the adhesive GL_1 among the plurality of adhesives GL is ejected from the nozzle array LB12 that is one nozzle array LN of the nozzle array LB12 and the nozzle array LA12, which are adjacent to each other, onto one medium PP21 to form the liquid droplet DR_1. Then, after the relative movement, the liquid ejecting apparatus 100 ejects the adhesive GL_3 among the plurality of adhesives GL from the nozzle array LA12 that is the other nozzle array LN onto the medium PP21 to form the liquid droplet DR_3.

In the liquid ejecting method according to the present embodiment, since the relative movement is performed based on the nozzle array disposition interval DNx in one nozzle plate 111*c*, the liquid droplets DR can be two-dimensionally disposed regardless of the nozzle array disposition interval DNx.

Further, each nozzle array LN of the plurality of liquid ejecting heads 110*a* ejects the different types of the adhesives GL among the plurality of types of the adhesives GL onto one medium PP to two-dimensionally form the liquid droplets DR of the different types of the adhesives GL on one medium PP one by one such that the liquid droplets DR do not overlap each other, and Cnt/CntX=L×E, that is, the expression (6) is satisfied, in which the number of the liquid droplets formed on one medium PP is denoted by Cnt, the number of liquid droplet rows formed on one medium PP is denoted by CntX, the disposition interval between the adjacent nozzle arrays LN among the plurality of nozzle arrays LN that perform the ejection onto one medium PP in the same stop period is denoted by DLx, the disposition interval between two liquid droplet columns LD formed on one medium PP is denoted by DDx, the number of the plurality of nozzle arrays LN that perform the ejection onto one medium PP simultaneously is denoted by E, and an integer obtained by rounding off to the first decimal place of a value obtained by dividing DLx by DDx is denoted by L.

When the expression (6) is satisfied, as compared with when the expression (6) is not satisfied, the number of the nozzle arrays LN ejected from one liquid ejecting head 110*a* in the same stop period can be increased, and the period required to create the sample can be reduced.

The plurality of liquid ejecting heads 110*a* include the liquid ejecting head 110*al* and the liquid ejecting head 110*a*2 different from the liquid ejecting head 110*al*, each of the plurality of nozzle arrays LN is constituted by arranging the plurality of nozzles Nz in the direction along the Y-axis, the plurality of nozzle arrays LN included in the plurality of liquid ejecting heads 110*a* are arranged in the direction along the X-axis orthogonal to the direction along the Y-axis, the plurality of liquid ejecting heads 110*a* are arranged in the direction along the X-axis orthogonal to the direction along the Y-axis, the plurality of media PP are arranged in the direction along the X-axis orthogonal to the direction along the Y-axis, the plurality of types of the adhesives GL are ejected onto each of the plurality of media PP from the plurality of liquid ejecting heads 110*a* to form the plurality of liquid droplets DR, the liquid ejecting head 110*al* and the liquid ejecting head 110*a*2 are adjacent to each other, and the head disposition interval DHx in the direction along the X-axis between the liquid ejecting head 110*al* and the liquid ejecting head 110*a*2 is an integral multiple of the medium disposition interval DPx.

Since the head disposition interval DHx is an integral multiple of the medium disposition interval DPx, the adhesive GL can be ejected from the plurality of liquid ejecting heads 110*a* onto the plurality of media PP in the same stop period. Specifically, as illustrated in FIG. 9, the liquid ejecting head 110*al* can eject the adhesive GL onto the medium PP22 and the medium PP12 in the same stop period, and the liquid ejecting head 110*a*2 can eject the adhesive GL onto the medium PP21 and the medium PP11 in the same stop period. Since the adhesive GL can be ejected from the plurality of liquid ejecting heads 110*a* onto the plurality of media PP in the same stop period, the time required to create the plurality of samples can be reduced.

In addition, each of the plurality of nozzle arrays LN is constituted by arranging the plurality of nozzles Nz in the direction along the Y-axis, the plurality of nozzle arrays LN are arranged in the direction along the X-axis, the nozzle array LB12 and the nozzle array LB11 are the nozzle arrays LN adjacent to each other among the plurality of nozzle arrays LN that eject the adhesives GL in the same stop period, and the nozzle group Ng[1] of the nozzle array LB12 that ejects the adhesive GL_1 for forming the liquid droplet DR_1 and the nozzle group Ng[3] of the nozzle array LB11 that ejects the adhesive GL_2 for forming the liquid droplet DR_2 are separated from each other in the direction along the Y-axis by an interval larger than the disposition interval DDy that is the disposition interval between the liquid droplets DR adjacent to each other in the direction along the Y-axis among a plurality of liquid droplets DR formed on one medium PP21.

When the adhesive GL is ejected from the nozzle Nz, spray-form fine liquid droplets caused by the tailing of the adhesive GL, so-called mist, may be generated. When the mist is generated, so-called contamination occurs in which the mist of a certain adhesive GL is mixed with another adhesive GL. When the contamination occurs, the characteristics of the liquid droplet DR formed by another adhesive GL in which mist of a certain adhesive GL is mixed are changed, and there is a possibility that the result of the contact liquid inspection is inaccurate. In the liquid ejecting method according to the present embodiment, since the nozzle group Ng[1] of the nozzle array LB12 and the nozzle group Ng[3] of the nozzle array LB11 are separated from each other in the direction along the Y-axis by an interval larger than the disposition interval DDy, as compared with the aspect in which the nozzle group Ng[1] of the nozzle array LB12 and the nozzle group Ng[3] of the nozzle array LB11 are not separated from each other by an interval larger than the disposition interval DDy, the occurrence of the contamination can be suppressed, and the accurate result of the contact liquid inspection can be obtained.

In addition, the liquid ejecting head 110*a*1 includes the nozzle array LA12 that ejects the adhesive GL_3 that is different in type from the adhesive GL_1 and the adhesive GL_2, the nozzle array LB12 and the nozzle array LA12 are the nozzle arrays LN adjacent to each other, and the nozzle group Ng[1] of the nozzle array LB12 and the nozzle group Ng[2] of the nozzle array LA12 that ejects the adhesive GL_3 for forming the liquid droplet DR_3 are separated from each other in the direction along the Y-axis by an interval equal to or larger than the disposition interval DDy between the liquid droplets adjacent to each other in the direction along the Y-axis among the plurality of liquid droplets DR formed on the medium PP21.

In the liquid ejecting method according to the present embodiment, since the nozzle group Ng[1] of the nozzle array LB12 and the nozzle group Ng[2] of the nozzle array LA12 are separated from each other in the direction along the Y-axis by an interval equal to or larger than the disposition interval DDy, as compared with the aspect in which the nozzle group Ng[1] of the nozzle array LB12 and the nozzle group Ng[2] of the nozzle array LA12 are not separated from each other by an interval larger than the disposition interval DDy, the occurrence of the contamination can be suppressed to obtain the accurate result of the contact liquid inspection. In addition, it is preferable that the nozzle group Ng[1] of the nozzle array LB12 and the nozzle group Ng[2] of the nozzle array LA12 are separated in the direction along the Y-axis by an interval larger than the disposition interval DDy. The reason is that the influence of mist is smaller as the interval between the nozzle groups Ng is larger.

In addition, the adhesive GL_1 is ejected from the nozzle array LB12 constituted by arranging the plurality of nozzles Nz in the direction along the Y-axis onto each of the medium PP21 and the medium PP11, which are arranged in the direction along the Y-axis, among the plurality of media PP in the same stop period, to form one liquid droplet DR on each of the medium PP21 and the medium PP11. Specifically, the adhesive GL_1 is ejected from the nozzle group Ng[1] of the nozzle array LB12 onto the medium PP21 to form the liquid droplet DR_1 on the medium PP21, and the adhesive GL_1 is ejected from the nozzle group Ng[5] of the nozzle array LB12 onto the medium PP11 to form the liquid droplet DR_4 on the medium PP11.

In the liquid ejecting method according to the first embodiment, as compared with the aspect in which one liquid droplet DR is formed by one nozzle array LN in the same stop period, the number of the samples created by one sample creation operation can be increased.

1-6-2. Summary of Shape of Liquid Droplet DR

In the following description, the summary of the shape of the liquid droplet DR in the second aspect or the third aspect of the nozzle Nz that forms the liquid droplet DR will be described by using the nozzle array LB12. For the sake of simplification of the description, the liquid droplet DR formed in the area CE21 [1, 1] by the adhesive GL_1 will be referred to as the liquid droplet DR_1 sometimes. Similarly, the liquid droplet DR formed in the area CE11 [1,1] by the adhesive GL_1 will be referred to as the liquid droplet DR_4 sometimes.

It should be noted that, in Section 1-6-2, the nozzle array LB12 corresponds to a "nozzle array". The medium PP21 corresponds to a "first medium". The medium PP22 corresponds to a "second medium". The liquid droplet DR_1 corresponds to a "first droplet", and the liquid droplet DR_4 corresponds to a "second droplet".

In the second aspect or the third aspect of the nozzle Nz that forms the liquid droplet DR, there is the liquid ejecting method of ejecting the adhesive GL from the liquid ejecting head 110*a* including the nozzle array LB12 constituted by arranging the plurality of nozzles Nz, in which the liquid ejecting head 110*a* can move relative to the medium PP21, and in a state in which the relative movement is stopped, the adhesive GL is ejected from the nozzle group Ng[1] constituting a part of the nozzle arrays LB12 to form the liquid droplet DR_1 that is one liquid droplet DR on the medium PP21. The nozzle group Ng[1] includes the plurality of nozzles Nz.

It should be noted that, in the second aspect of the nozzle Nz that forms the liquid droplet DR, a part or all of the plurality of nozzles Nz among all of the nozzles Nz constituting the nozzle group Ng[1] correspond to a "plurality of first nozzles". In the third aspect of the nozzle Nz that forms the liquid droplet DR, the plurality of nozzles Nz included in the nozzle group GP1 among the nozzle groups Ng[1] correspond to a "plurality of first nozzles".

In the second aspect or the third aspect of the nozzle Nz that forms the liquid droplet DR, since the number of shots from one nozzle Nz can be reduced by ejecting the adhesive GL from the plurality of nozzles Nz, as compared with the aspect in which the adhesive GL is ejected only from one nozzle Nz, the period required to form the liquid droplet DR can be reduced. Further, since the adhesive GL is ejected in a state in which the relative movement is stopped, the liquid droplet DR can be stably fixed on the medium PP as compared with the aspect in which the adhesive GL is ejected while the relative movement is being performed.

In the third aspect of the nozzle Nz that forms the liquid droplet DR, the nozzle groups GP1 constituting a part of the nozzle arrays LB12 are not adjacent to each other.

In the second aspect of the nozzle Nz that forms the liquid droplet DR, as compared with the third aspect of the nozzle Nz that forms the liquid droplet DR, there is a high possibility that the liquid droplets DR come into contact with each other after the adhesives GL ejected from the adjacent nozzles Nz land on the medium PP. When the liquid droplets DR come into contact with each other, the force that pushes the liquid droplets DR to each other in the direction along the Y-axis is generated, and there is a concern that the liquid droplets DR formed on the medium PP approximates an elliptical shape when viewed in the Z2 direction. On the other hand, in the third aspect of the nozzle Nz that forms the liquid droplet DR, since the interval between the adjacent nozzles Nz among the plurality of nozzles Nz constituting the nozzle group GP1 is relatively wide, the adhesive GL ejected from the adjacent nozzles Nz among the plurality of nozzles Nz constituting the nozzle group GP1 easily enters the interval, so that the liquid droplet DR can be made to approximate the perfect circle when viewed in the Z2 direction as compared with the second aspect of the nozzle Nz that forms the liquid droplet DR.

In the third aspect of the nozzle Nz that forms the liquid droplet DR, the nozzle array LN may include the nozzle group GP1 constituted by the plurality of nozzles Nz that are not adjacent to each other, and the nozzle group GP2 that is different from the nozzle group GP1 and is constituted by the plurality of nozzles Nz that are not adjacent to each other, the adhesive GL_1 may be ejected from the plurality of nozzles Nz constituting the nozzle group GP1 to form the liquid droplet DR_1 on the medium PP21, and the adhesive GL_1 may be ejected from the plurality of nozzles Nz constituting the nozzle group GP2 to form the liquid droplet DR_4 on the medium PP22 different from the medium PP21.

It should be noted that the nozzle group GP1 corresponds to a "first nozzle group", and the nozzle group GP2 corresponds to a "second nozzle group". The plurality of nozzles Nz included in the nozzle group GP2 correspond to a "plurality of second nozzles".

An aspect in which the adhesive GL_1 is ejected from the plurality of nozzles Nz constituting the nozzle group GP1 to form the liquid droplet DR_4 on the medium PP22 can also be adopted. However, when the drive element 111*f* is repeatedly driven to eject the adhesive GL from the nozzle Nz, the drive element 111*f* is likely to deteriorate. Accordingly, it is preferable that the number of times that the plurality of drive elements 111*f* included in the liquid ejecting apparatus 100 are driven is as close as uniform. In the above liquid ejecting method, since the nozzle group GP1 that ejects the adhesive GL_1 onto the medium PP21 and the nozzle group GP2 that ejects the adhesive GL_1 onto the medium PP22 are different from each other, the life of the drive element 111*f* can be extended as compared with the aspect in which the nozzle group GP1 ejects the adhesive GL_1 onto the medium PP21 and the medium PP22.

In the third aspect of the nozzle Nz that forms the liquid droplet DR, the plurality of nozzles Nz constituting the nozzle group GP1 and the plurality of nozzles Nz constituting the nozzle group GP2 may be arranged alternately with each other.

In this liquid ejecting method, since the nozzles Nz constituting the nozzle group GP1 and the nozzles Nz constituting the nozzle group GP2 are arranged at equal intervals, the liquid droplet DR can made to approximate the perfect circle when viewed in the Z2 direction as compared with the aspect in which the plurality of nozzles Nz constituting the nozzle group GP1 and the plurality of nozzles Nz constituting the nozzle group GP2 are not arranged alternately.

In the third aspect of the nozzle Nz that forms the liquid droplet DR, the number of the plurality of nozzles Nz constituting the nozzle group GP1 is three or more, and the number of times of ejection from the nozzle Nz that is not disposed at the end among the plurality of nozzles Nz constituting the nozzle group GP1 for forming the liquid droplet DR_1 on the medium PP21 may be larger than the number of times of ejection from the nozzle Nz disposed at the end among the plurality of nozzles Nz constituting the nozzle group GP1.

As a result, the liquid droplet DR_1 can made to approximate the perfect circle when viewed in the Z2 direction.

In addition, in the third aspect of the nozzle Nz that forms the liquid droplet DR, in a state in which the relative movement is stopped, the adhesive GL_1 is ejected a plurality of times from each of the plurality of nozzles Nz constituting the nozzle group GP1 to form the liquid droplet DR_1 on the medium PP21.

2. Second Embodiment

In the first embodiment, each of the plurality of liquid ejecting heads 110*a* is disposed at substantially equal intervals, but the present disclosure is not limited to this. Hereinafter, a second embodiment will be described.

Figure 15:
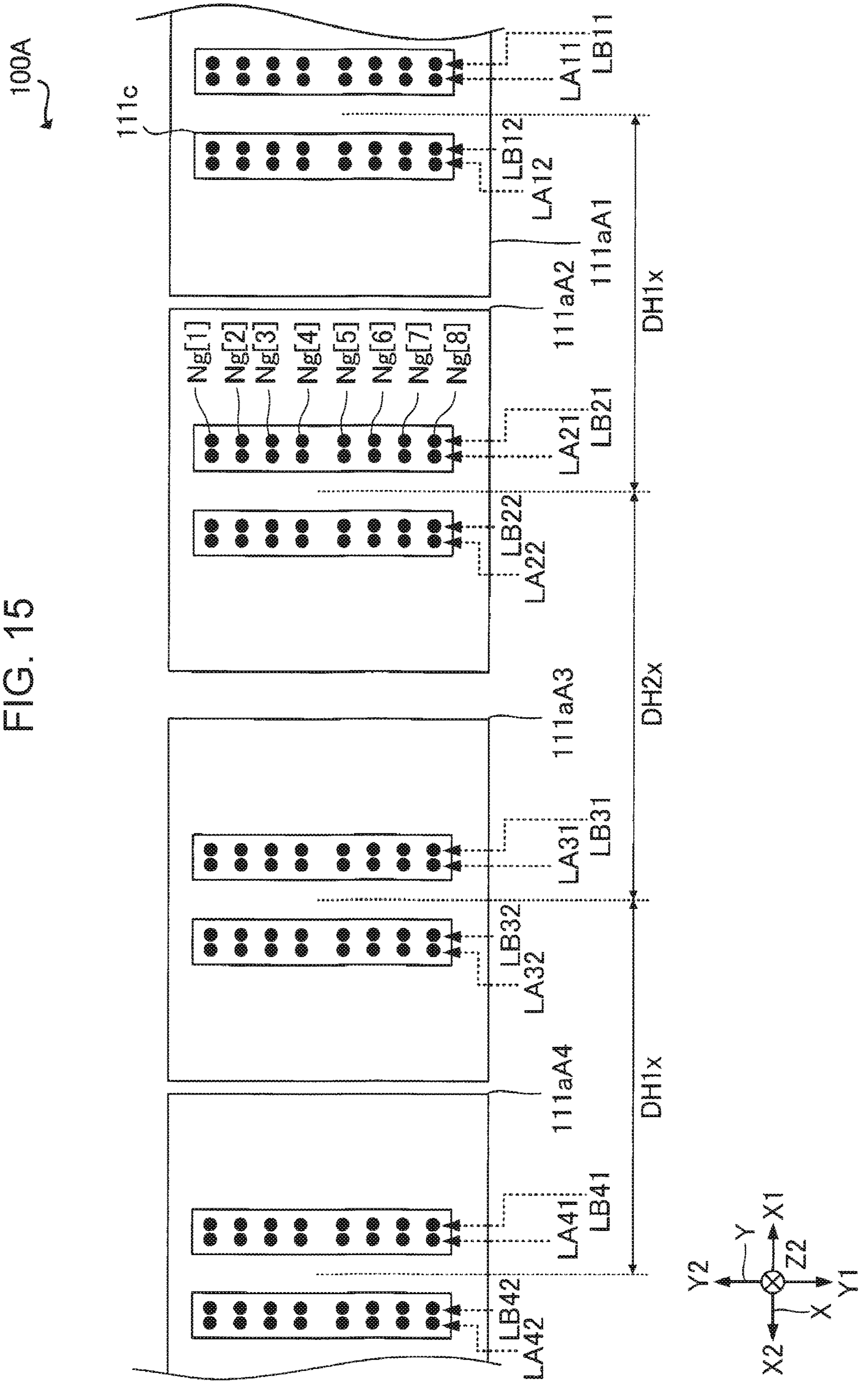
FIG. 15 is a diagram illustrating a liquid ejecting head.

2-1. Disposition Relationship of Liquid Ejecting Head 110*a*A According to Second Embodiment FIG. 15 is a diagram illustrating the liquid ejecting head 110*a*A. A liquid ejecting apparatus 100A according to the second embodiment is different from the liquid ejecting apparatus 100 in that four liquid ejecting heads 110*a*A are provided instead of the four liquid ejecting heads 110*a*. As illustrated in FIG. 15, the four liquid ejecting heads 110*a*A are a liquid ejecting head 110*a*A1, a liquid ejecting head 110*a*A2, a liquid ejecting head 110*a*A3, and a liquid ejecting head 110*a*A4. The intervals between the four liquid ejecting heads 110*a*A are different from each other. Specifically, both the disposition interval between the liquid ejecting head 110*a*A1 and the liquid ejecting head 110*a*A2 and the disposition interval between the liquid ejecting head 110*a*A3 and the liquid ejecting head 110*a*A4 are head disposition intervals DH1*x*. On the other hand, the disposition interval between the liquid ejecting head 110*a*A2 and the liquid ejecting head 110*a*A3 is a head disposition interval DH2*x*. The head disposition interval DH2*x* is longer than the head disposition interval DH1*x*.

2-2. Example of Sample According to Second Embodiment

Figure 16:
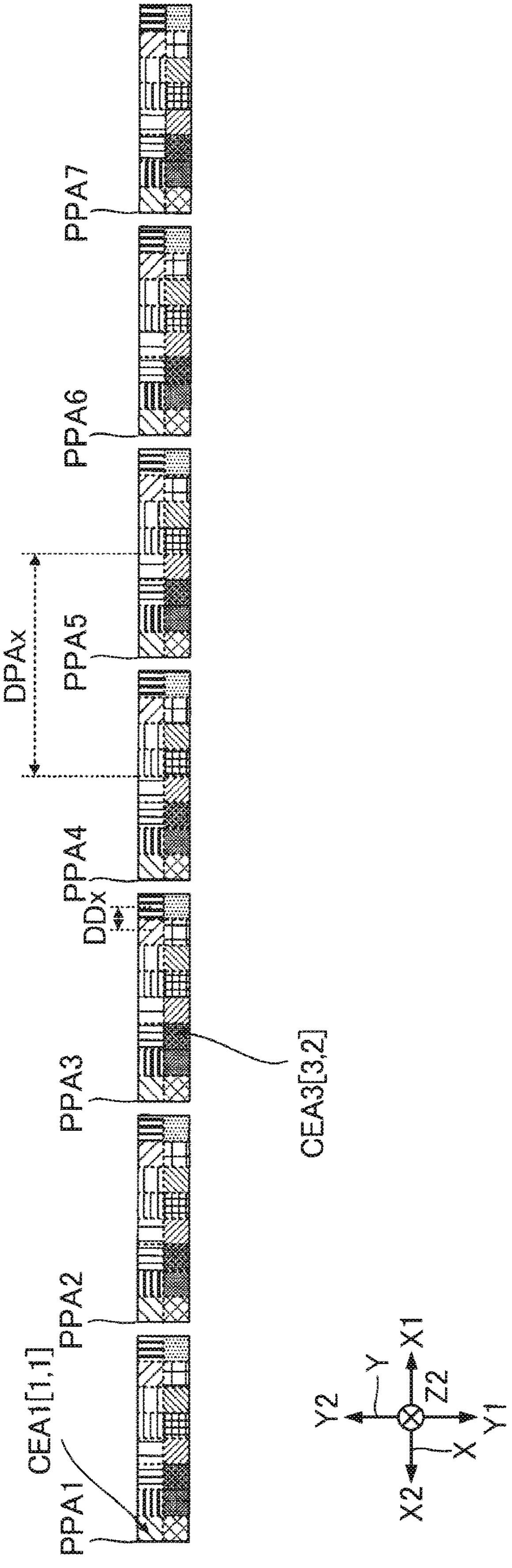
FIG. 16 is a diagram illustrating an example of a sample created by a sample creation operation according to a second embodiment.

FIG. 16 is a diagram illustrating an example of a sample created by the sample creation operation according to the second embodiment. The liquid ejecting apparatus 100A creates the sample by ejecting the adhesive GL onto a medium PPA instead of the medium PP.

FIG. 16 illustrates the sample created by dividing one medium PPA into 16 areas CEA divided into two parts in the direction along the X-axis and divided into eight parts in the direction along the Y-axis, and ejecting each of different types of the adhesives GL onto each of the areas CEA to form liquid droplets DR on the medium PPA.

In addition, FIG. 16 illustrates a medium disposition interval DPAx that is the disposition interval in the direction along the X-axis between the adjacent media PPA among a plurality of media PPA. In the second embodiment, the medium disposition interval DPAx is approximately 5 times the liquid droplet column disposition interval DDx.

In the following description, each area CEA obtained by dividing one medium PPA into 16 parts will be referred to as an area CEA [x, y] sometimes. x indicates a value of a column counted from an end in the X2 direction among columns obtained by dividing one medium PPA into eight parts in the direction along the Y-axis. y indicates a value of a column counted from an end in the Y2 direction among columns obtained by dividing one medium PPA into two parts in the direction along the Y-axis. Further, as illustrated in FIG. 16, each area CEA obtained by dividing the medium PPA1 into 16 parts will be referred to as an area CEA1 [x, y] sometimes. Similarly to the area CEA1 [x, y], the area CEA obtained by dividing the medium PPA other than the medium PPA1 into 16 parts will be expressed by adding the suffix X as the area CEAX [x, y] sometimes. The suffix X is any one of 1, 2, 3, 4, 5, 6, and 7. The example of FIG. 16 illustrates that the area CEA included in the medium PPA1, located first from the end in the X2 direction, and located first from the end in the Y2 direction is the area CEA1 [1, 1]. In addition, it is illustrated that the area CEA included in the medium PPA3, located third from the end in the X2 direction and located second from the end in the Y2 direction is the area CEA3 [3, 2].

2-3. Sample Creation Operation

The sample creation operation according to the second embodiment will be described with reference to FIGS. 17 to 30. The flowchart illustrating the sample creation operation according to the second embodiment is the same as the flowchart illustrating the sample creation operation according to the first embodiment illustrated in FIG. 6, and thus the description thereof will be omitted.

The liquid ejecting apparatus 100A also includes 16 nozzle arrays, similar to the liquid ejecting apparatus 100. In order to distinguish the 16 nozzle arrays LN, with i as an integer from 1 to 4, the nozzle array LA included in the head chip 111 disposed in the X1 direction of the liquid ejecting head 110aA*i* will be referred to as a nozzle array LAi1, and the nozzle array LB will be referred to as a nozzle array LBi1, sometimes. Similarly, the nozzle array LA included in the head chip 111 disposed in the X2 direction of the liquid ejecting head 110aA*i* will be referred to as a nozzle array LAi2, and the nozzle array LB will be referred to as a nozzle array LBi2, sometimes.

Further, in FIGS. 17 to 30, as in FIGS. 7 to 14, in order to prevent the drawings from being complicated, the formation of the liquid droplet DR in the area CE is illustrated by applying shading to the area CE. In addition, for the sake of simplification of the description, with i as an integer from 1 to 4, the adhesive GL ejected from each nozzle Nz of the nozzle array LBi2 is an adhesive GL_i×4−3, the adhesive GL ejected from each nozzle Nz of the nozzle array LBi1 is an adhesive GL_i×4−2, the adhesive GL ejected from each nozzle Nz of the nozzle array LAi2 is an adhesive GL_i×4−1, and the adhesive GL ejected from each nozzle Nz of the nozzle array LAi1 is an adhesive GL_i×4.

In the second embodiment, since the plurality of media PPA do not overlap simultaneously one nozzle array LN and only one medium PPA overlaps one nozzle array LN in plan view, the eight nozzle groups Ng included in one nozzle array LN eject the adhesive GL from one nozzle group Ng.

Figure 17:
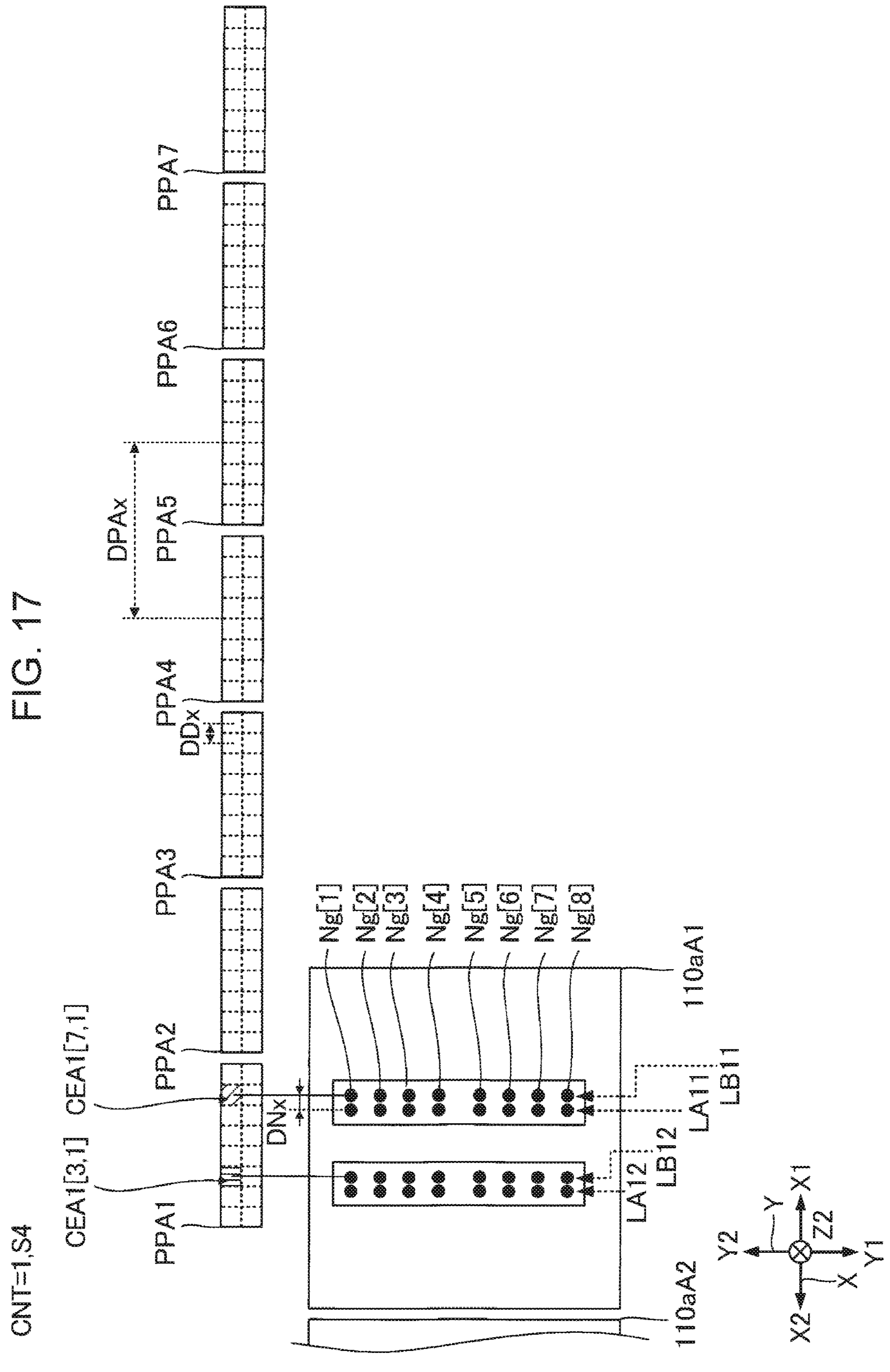
FIG. 17 is a diagram illustrating a state of a medium after step S4 is executed when the number of times is 1.

FIG. 17 is a diagram illustrating a state of the medium PPA after step S4 is executed when the number of times CNT is 1. When the number of times CNT is 1, in step S4, the liquid ejecting head 110aA1 ejects the adhesive GL_1 from the nozzle group Ng[1] of the nozzle array LB12 to form the liquid droplet DR in the area CEA1 [3, 1], and ejects the adhesive GL_2 from the nozzle group Ng[1] of the nozzle array LB11 to form the liquid droplet DR in the area CEA1 [7,1].

It should be noted that, regardless of the value of the number of times CNT except when the nozzle array LB12 and the nozzle array LB11 do not face the medium PPA, in step S4, the liquid ejecting head 110aA1 ejects the adhesive GL_1 from the nozzle group Ng[1] of the nozzle array LB12 to form the liquid droplet DR in the area CEA[3,1], and ejects the adhesive GL_2 from the nozzle group Ng[1] of the nozzle array LB11 to form the liquid droplet DR in the area CEA[7, 1].

Figure 18:
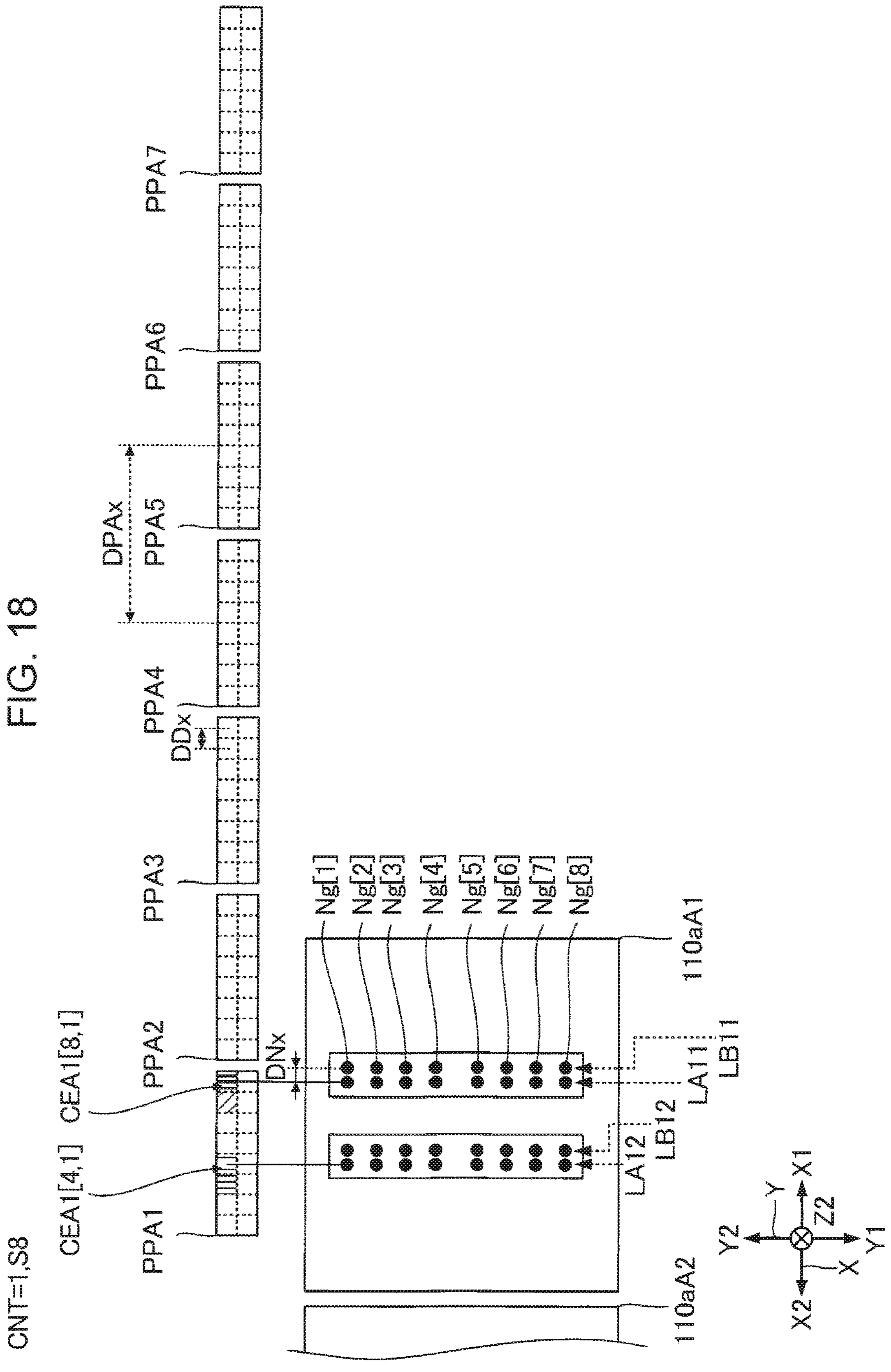
FIG. 18 is a diagram illustrating a state of the medium after step S8 is executed when the number of times is 1.

FIG. 18 is a diagram illustrating a state of the medium PPA after step S8 is executed when the number of times CNT is 1. During a period from the state of FIG. 17 to the state of FIG. 18, the liquid ejecting head 110aA moves in the X1 direction by a total amount of the liquid droplet column disposition interval DDx and the nozzle array disposition interval DNx. It should be noted that, regardless of the value of the number of times CNT, an amount of movement of the liquid ejecting head 110aA from step S4 to step S8 is the total amount of the liquid droplet column disposition interval DDx and the nozzle array disposition interval DNx, and thus the description of the amount of movement of the liquid ejecting head 110aA from step S4 to step S8 will be omitted.

When the number of times CNT is 1, in step S8, the liquid ejecting head 110aA1 ejects the adhesive GL_3 from the nozzle group Ng[1] of the nozzle array LA12 to form the liquid droplet DR in the area CEA1 [4, 1], and ejects the adhesive GL_4 from the nozzle group Ng[1] of the nozzle array LA11 to form the liquid droplet DR in the area CEA1 [8,1].

It should be noted that, regardless of the value of the number of times CNT except when the nozzle array LA12 and the nozzle array LA11 do not face the medium PPA, in step S8, the liquid ejecting head 110aA1 ejects the adhesive GL_3 from the nozzle group Ng[1] of the nozzle array LA12 to form the liquid droplet DR in the area CEA[4, 1], and ejects the adhesive GL_4 from the nozzle group Ng[1] of the nozzle array LA11 to form the liquid droplet DR in the area CEA[8,1]. Accordingly, the description of the operations of the nozzle array LB11 and the nozzle array LA11 in step S8 will be omitted below.

Figure 19:
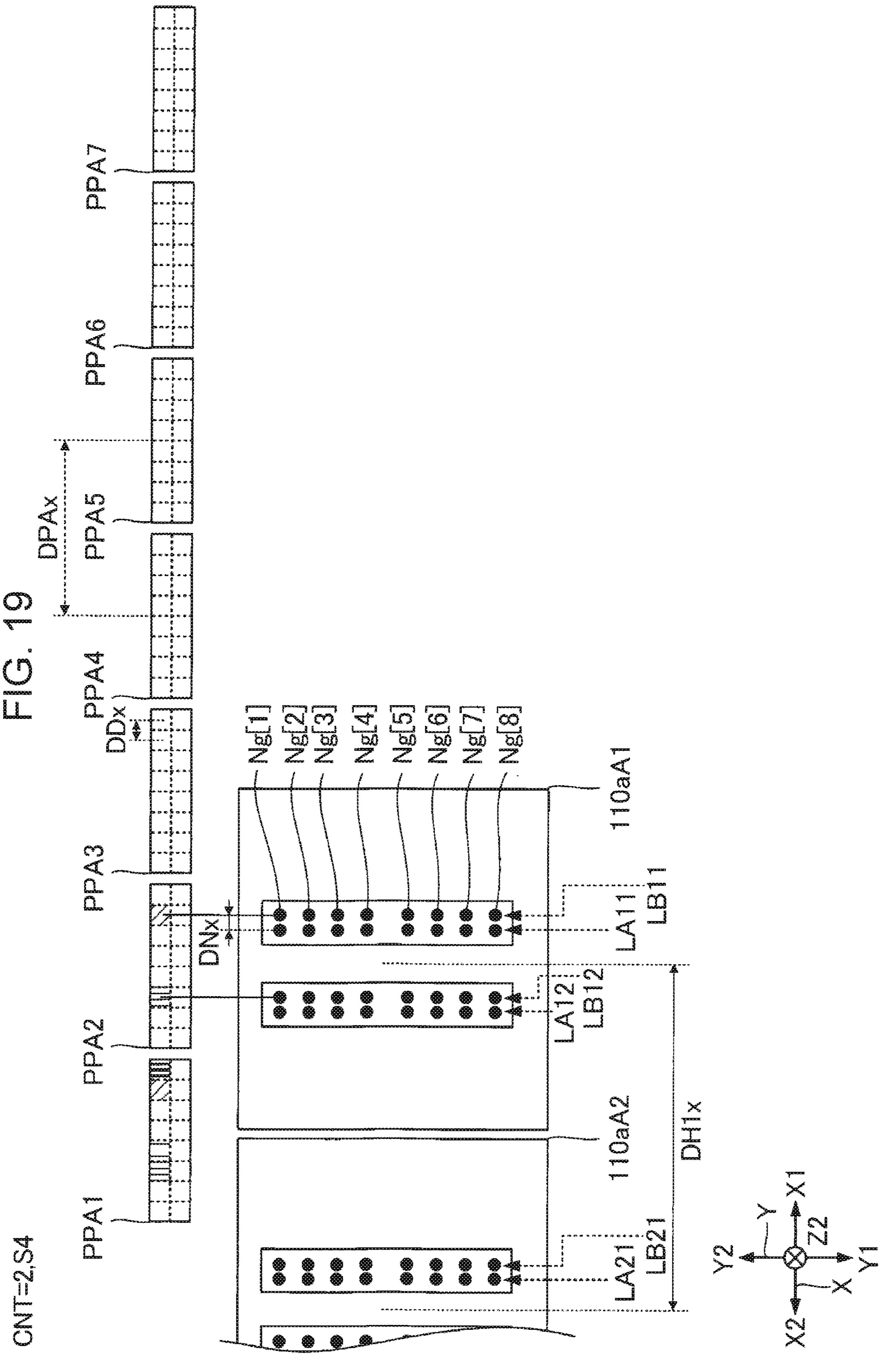
FIG. 19 is a diagram illustrating a state of the medium after step S4 is executed when the number of times is 2.

FIG. 19 is a diagram illustrating a state of the medium PPA after step S4 is executed when the number of times CNT is 2. During a period from the state of FIG. 18 to the state of FIG. 19, the liquid ejecting head 110aA moves in the X1 direction by an amount obtained by subtracting the liquid droplet column disposition interval DDx and the nozzle array disposition interval DNx from the medium disposition interval DPAx. It should be noted that, regardless of the value of the number of times CNT, an amount of movement of the liquid ejecting head 110aA from step S8 to step S4 is the amount obtained by subtracting the liquid droplet column disposition interval DDx and the nozzle array disposition interval DNx from the medium disposition interval DPAx, and thus the description of the amount of movement of the liquid ejecting head 110aA from step S8 to step S4 will be omitted.

Figure 20:
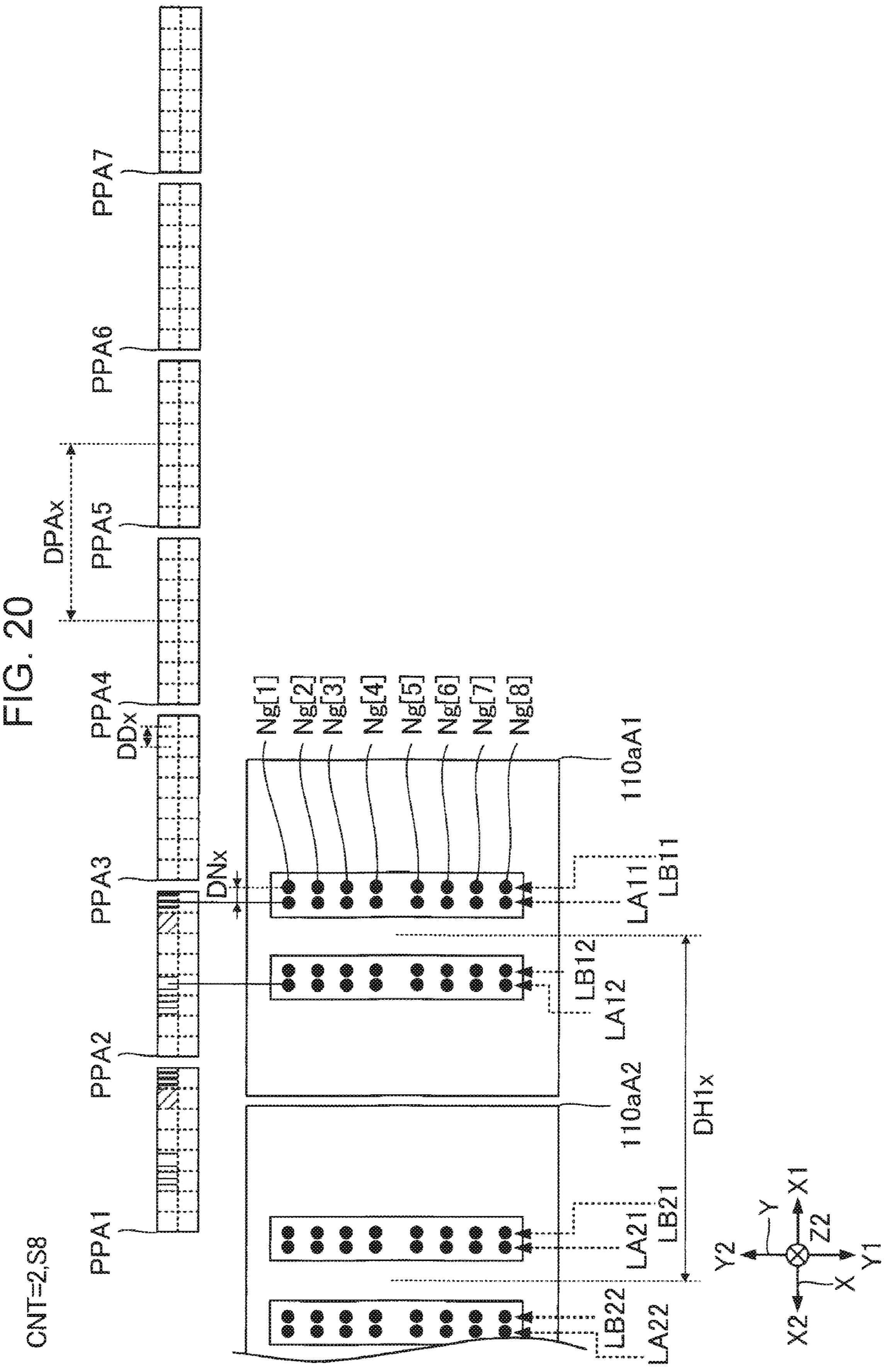
FIG. 20 is a diagram illustrating a state of the medium after Step S8 is executed when a number of times is 2.
Figure 21:
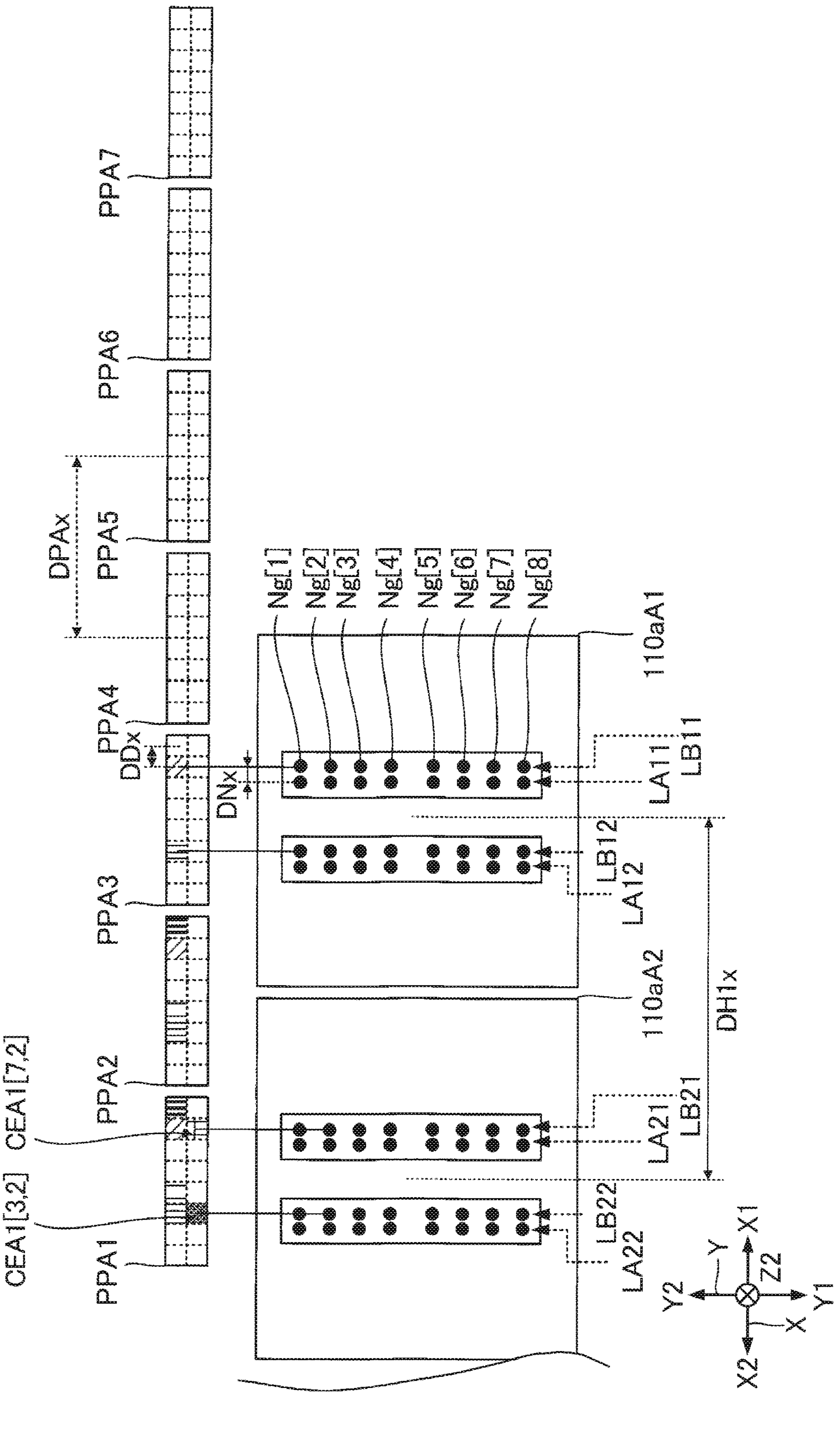
FIG. 21 is a diagram illustrating a state of the medium after step S4 is executed when the number of times is 3.

FIG. 20 is a diagram illustrating a state of the medium PPA after step S8 is executed when the number of times CNT is 2. FIG. 21 is a diagram illustrating a state of the medium PPA after step S4 is executed when the number of times CNT is 3.

When the number of times CNT is 3, in step S4, the liquid ejecting head 110aA2 ejects the adhesive GL_5 from the nozzle group Ng[2] of the nozzle array LB22 to form the liquid droplet DR in the area CEA1 [3, 2], and ejects the adhesive GL_6 from the nozzle group Ng[2] of the nozzle array LB21 to form the liquid droplet DR in the area CEA1 [7,2].

It should be noted that, regardless of the value of the number of times CNT except when the nozzle array LB22 and the nozzle array LB21 do not face the medium PPA, in step S4, the liquid ejecting head 110aA2 ejects the adhesive GL_5 from the nozzle group Ng[2] of the nozzle array LB22 to form the liquid droplet DR in the area CEA[3, 1], and ejects the adhesive GL_6 from the nozzle group Ng[2] of the nozzle array LB21 to form the liquid droplet DR in the area CEA [7,2]. Accordingly, the description of the operations of the nozzle array LB22 and the nozzle array LB21 in step S4 will be omitted below.

Figure 22:
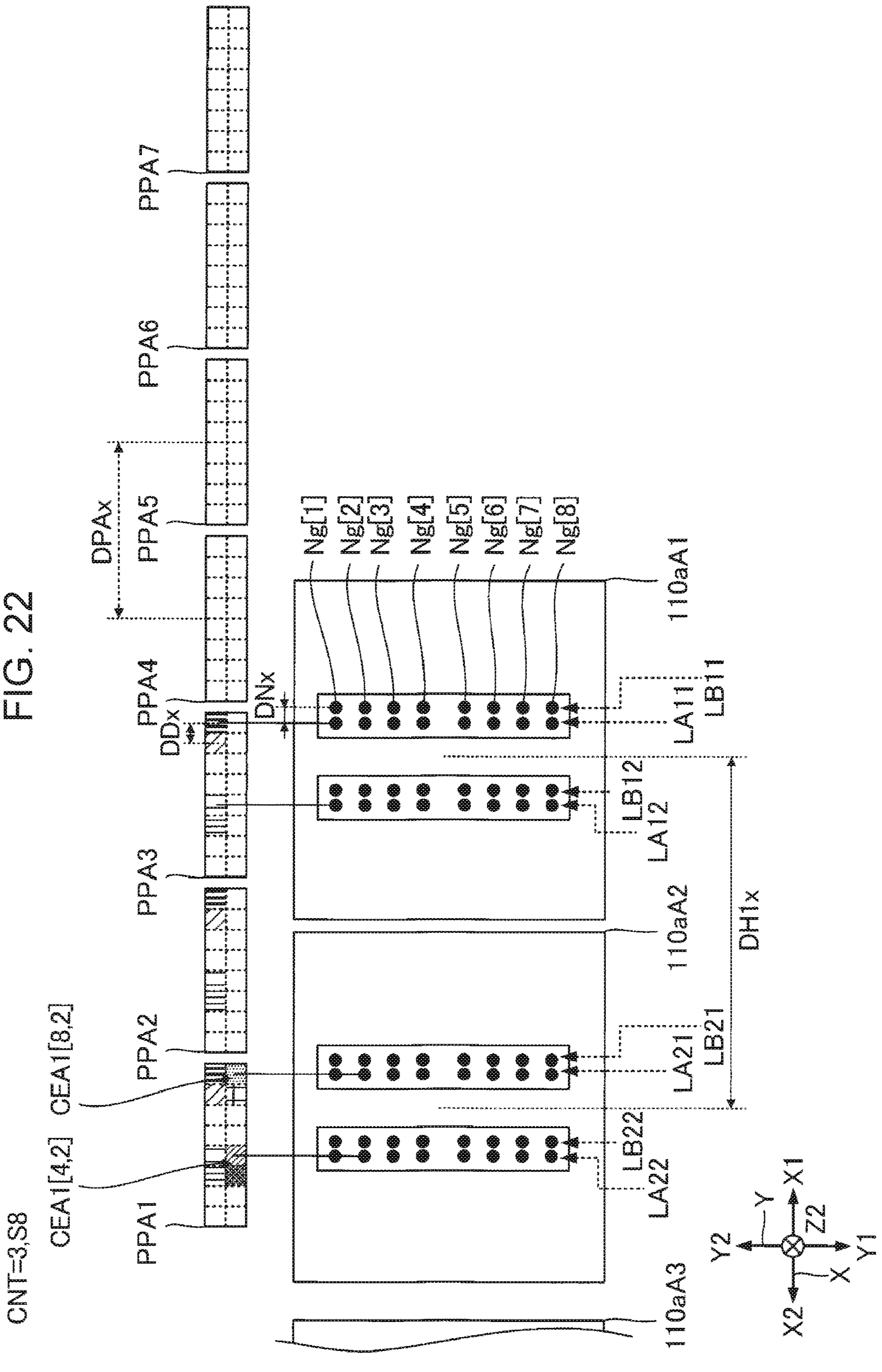
FIG. 22 is a diagram illustrating a state of the medium after step S8 is executed when the number of times is 3.

FIG. 22 is a diagram illustrating a state of the medium PPA after step S8 is executed when the number of times CNT is 3. When the number of times CNT is 3, in step S8, the liquid ejecting head 110aA2 ejects the adhesive GL_7 from the nozzle group Ng[2] of the nozzle array LA22 to form the liquid droplet DR in the area CEA1 [4, 2], and ejects the adhesive GL_8 from the nozzle group Ng[2] of the nozzle array LA21 to form the liquid droplet DR in the area CEA1 [8,2].

It should be noted that, regardless of the value of the number of times CNT except when the nozzle array LA22 and the nozzle array LA21 do not face the medium PPA, in step S8, the liquid ejecting head 110aA2 ejects the adhesive GL_7 from the nozzle group Ng[2] of the nozzle array LA22 to form the liquid droplet DR in the area CEA[4, 2], and ejects the adhesive GL_8 from the nozzle group Ng[2] of the nozzle array LA21 to form the liquid droplet DR in the area CEA[8,2]. Accordingly, the description of the operations of the nozzle array LA22 and the nozzle array LA21 in step S8 will be omitted below.

Figure 23:
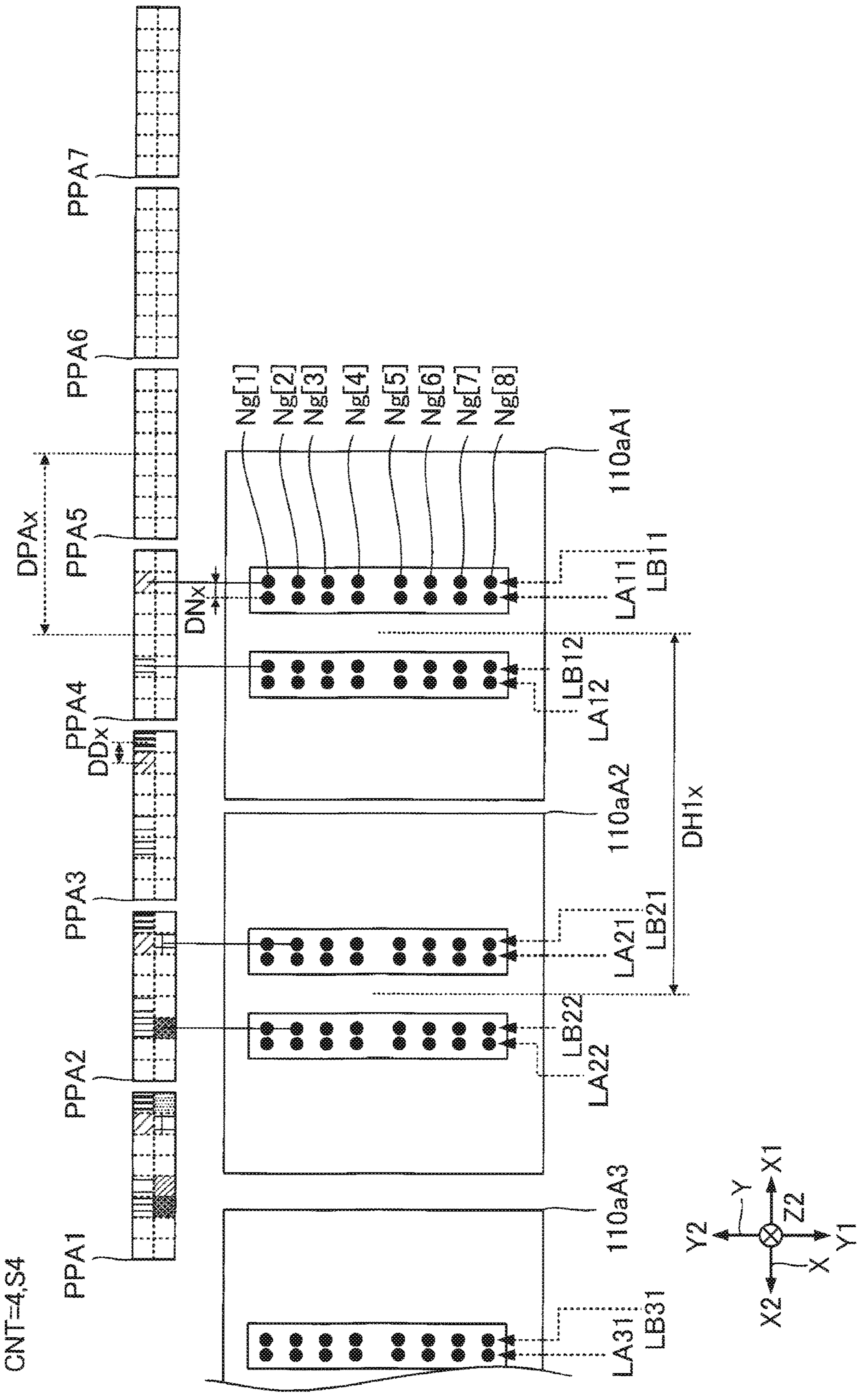
FIG. 23 is a diagram illustrating a state of the medium after step S4 is executed when the number of times is 4.
Figure 24:
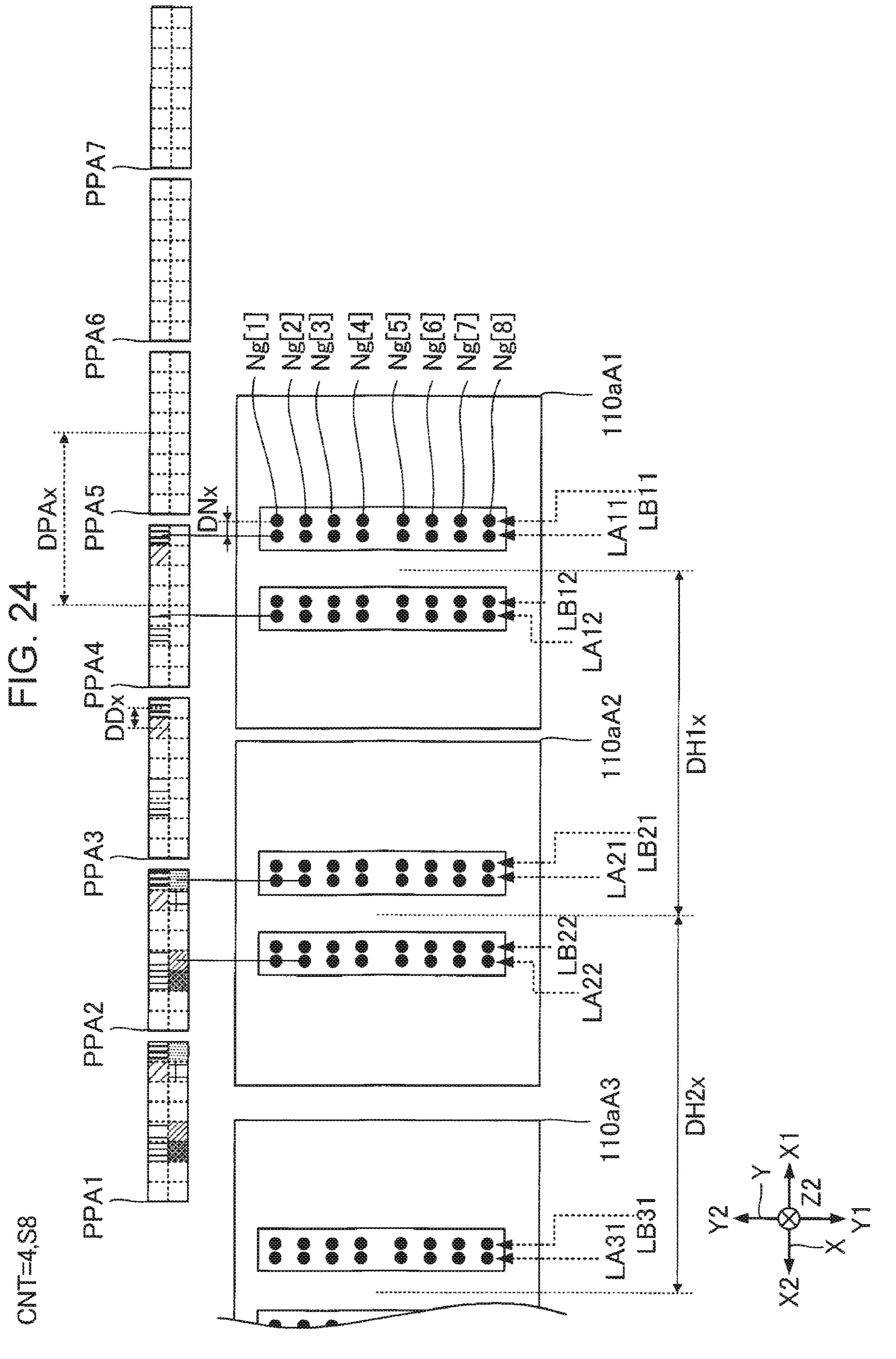
FIG. 24 is a diagram illustrating a state of the medium after step S8 is executed when the number of times is 4.

FIG. 23 is a diagram illustrating a state of the medium PPA after step S4 is executed when the number of times CNT is 4. FIG. 24 is a diagram illustrating a state of the medium PPA after step S8 is executed when the number of times CNT is 4.

Figure 25:
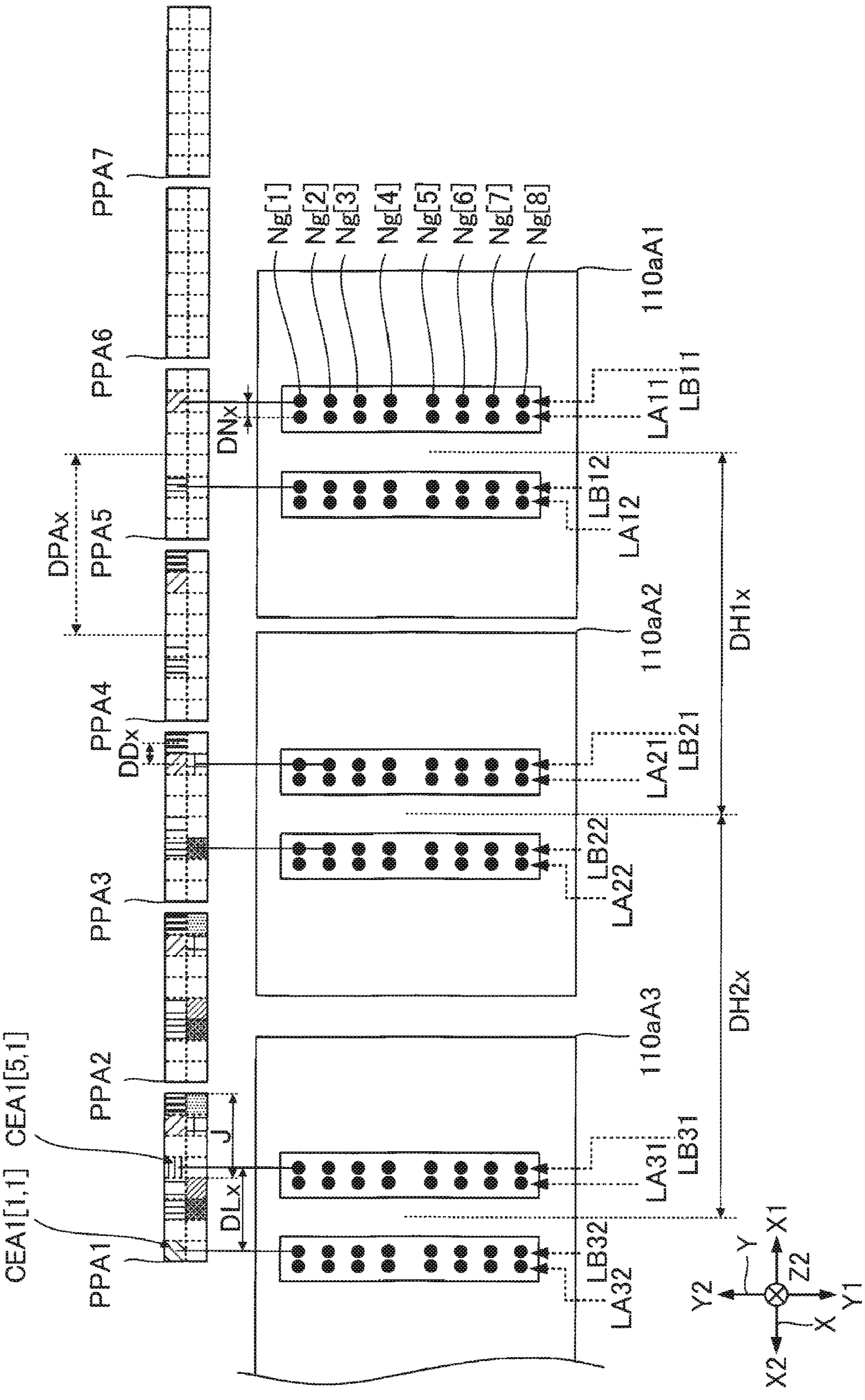
FIG. 25 is a diagram illustrating a state of the medium after step S4 is executed when the number of times is 5.

FIG. 25 is a diagram illustrating a state of the medium PPA after step S4 is executed when the number of times CNT is 5. When the number of times CNT is 5, in step S4, the liquid ejecting head 110*a*A3 ejects the adhesive GL_9 from the nozzle group Ng[1] of the nozzle array LB32 to form the liquid droplet DR in the area CEA1 [1, 1], and ejects the adhesive GL_10 from the nozzle group Ng[1] of the nozzle array LB31 to form the liquid droplet DR in the area CEA1 [5,1].

It should be noted that, regardless of the value of the number of times CNT except when the nozzle array LB32 and the nozzle array LB31 do not face the medium PPA, in step S4, the liquid ejecting head 110*a*A3 ejects the adhesive GL_9 from the nozzle group Ng[1] of the nozzle array LB32 to form the liquid droplet DR in the area CEA[1, 1], and ejects the adhesive GL_10 from the nozzle group Ng[1] of the nozzle array LB31 to form the liquid droplet DR in the area CEA[5,1]. Accordingly, the description of the operations of the nozzle array LB32 and the nozzle array LB31 in step S4 will be omitted below.

In the second embodiment as well, the expressions (1) to (7) are also satisfied. In the second embodiment, J=L=4. In addition, for example, in the second embodiment, since Cnt is 16, CntX is 2, L is 4, and E is 2, when the values are substituted into the expression (6), the expression (6) is satisfied.

$$16/2=4\times2=8$$

In addition, the head disposition interval DH1*x* is an integral multiple of the medium disposition interval DPAx as in the first embodiment. In the second embodiment, the head disposition interval DH1*x* is twice the medium disposition interval DPAx.

In addition, in order to form the liquid droplet DR in the area CEA1 [1, 1] by ejecting the adhesive GL_9 from the nozzle group Ng[1] of the nozzle array LB32, the head disposition interval DH2*x* establishes the following expression (8).

$$DN2x = 2\times DPAx + 2\times DDx \tag{8}$$

For the head disposition interval DHx including the head disposition interval DH1*x* and the head disposition interval DH2*x*, the following expression (9) is established.

$$DHx = a\times DPAx + n\times DDx \tag{9}$$

"a" is an integer of 1 or more. n is an integer from 0 to L−1. When the head disposition interval DHx is the head disposition interval DH1*x*, a is 2, and n is 0. When the head disposition interval DHx is the head disposition interval DH2*x*, a and *n* are 2.

Figure 26:
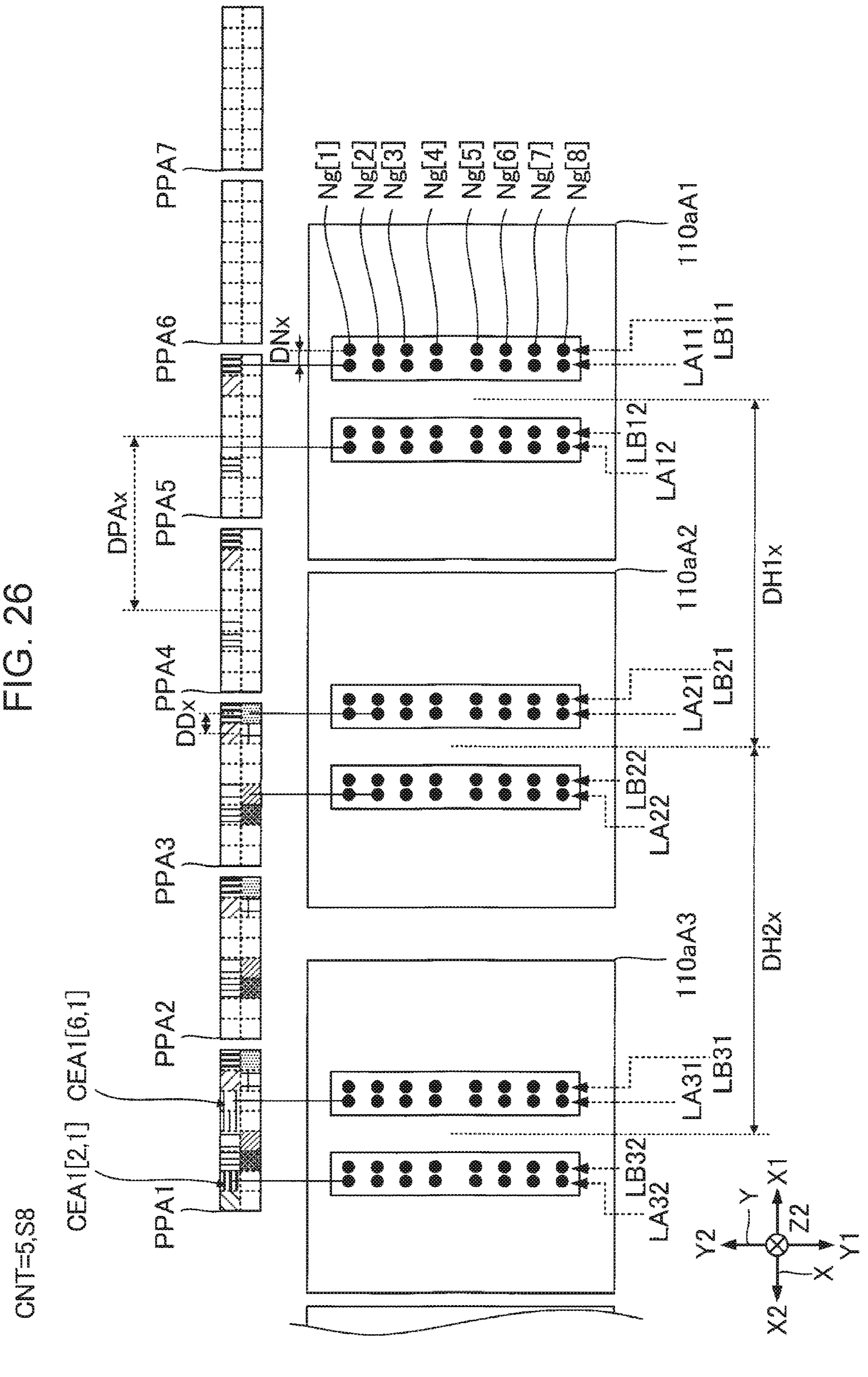
FIG. 26 is a diagram illustrating a state of the medium after step S8 is executed when the number of times is 5.

FIG. 26 is a diagram illustrating a state of the medium PPA after step S8 is executed when the number of times CNT is 5. When the number of times CNT is 5, in step S8, the liquid ejecting head 110*a*A3 ejects the adhesive GL_11 from the nozzle group Ng[1] of the nozzle array LA32 to form the liquid droplet DR in the area CEA1 [2, 1], and ejects the adhesive GL_12 from the nozzle group Ng[1] of the nozzle array LA31 to form the liquid droplet DR in the area CEA1 [6,1].

It should be noted that, regardless of the value of the number of times CNT except when the nozzle array LA32 and the nozzle array LA31 do not face the medium PPA, in step S8, the liquid ejecting head 110*a*A3 ejects the adhesive GL_11 from the nozzle group Ng[1] of the nozzle array LA32 to form the liquid droplet DR in the area CEA[2, 1], and ejects the adhesive GL_12 from the nozzle group Ng[1] of the nozzle array LA31 to form the liquid droplet DR in the area CEA[6,1]. Accordingly, the description of the operations of the nozzle array LA32 and the nozzle array LA31 in step S8 will be omitted below.

Figure 27:
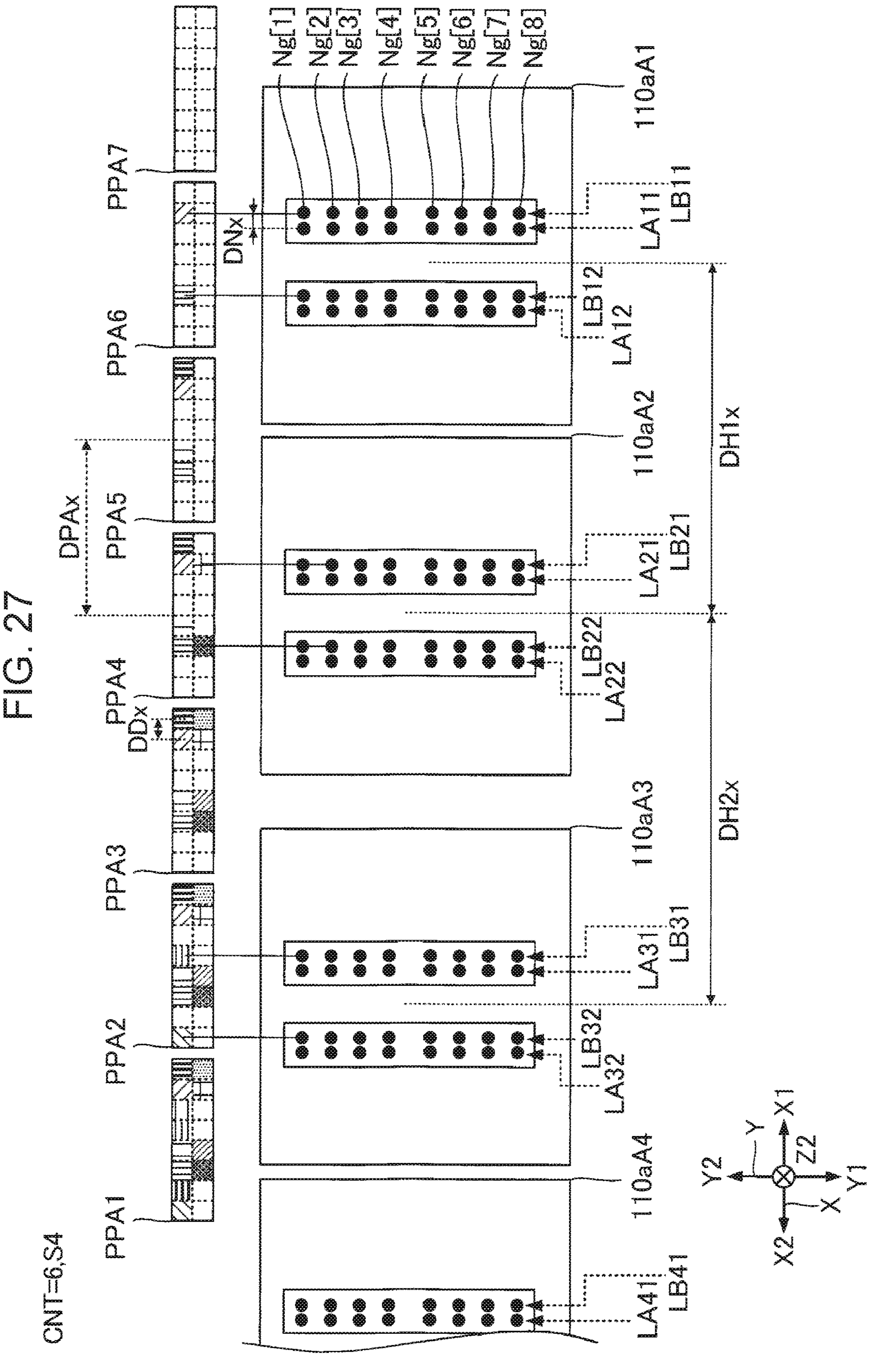
FIG. 27 is a diagram illustrating a state of the medium after step S4 is executed when the number of times is 6.
Figure 28:
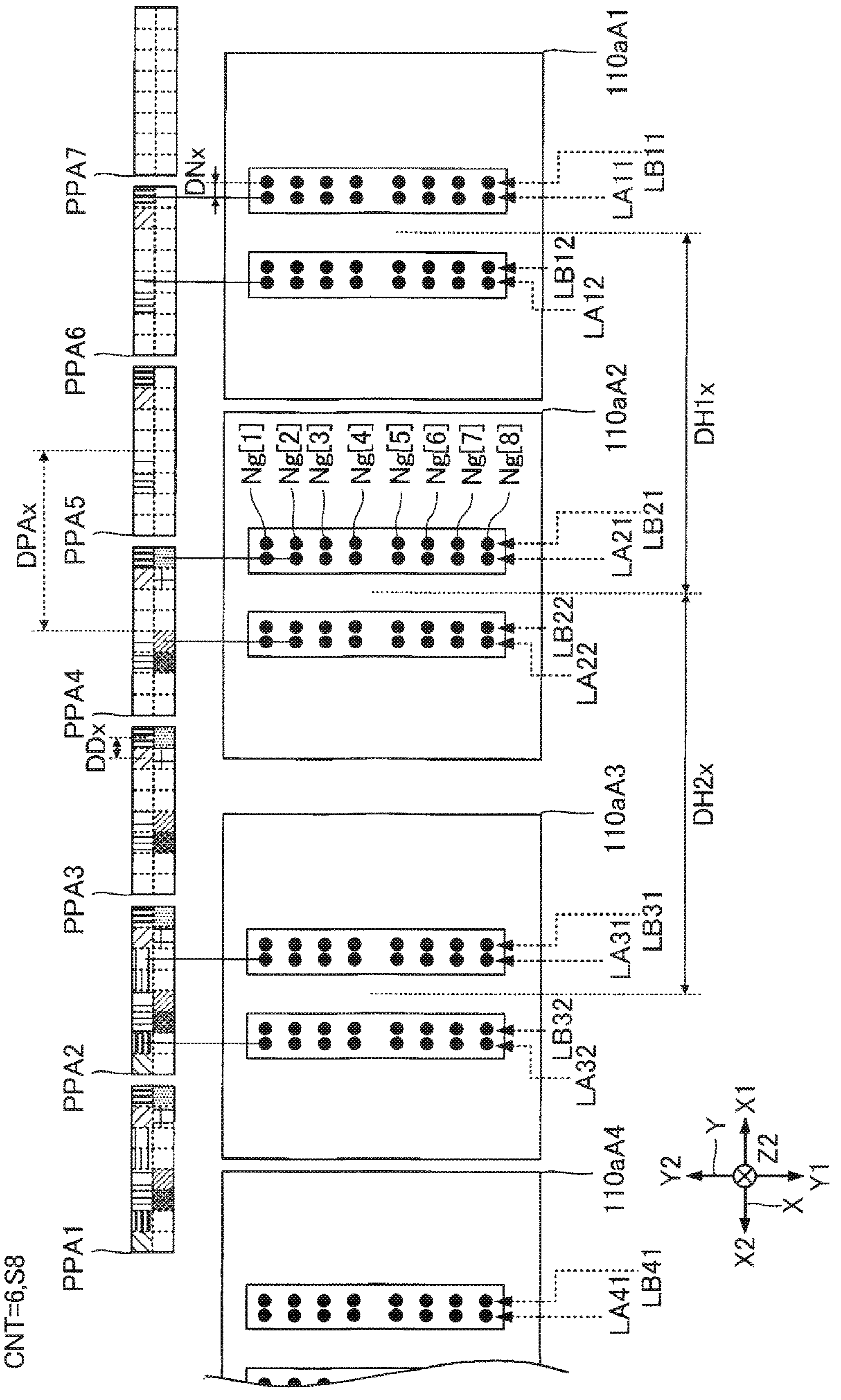
FIG. 28 is a diagram illustrating a state of the medium after step S8 is executed when the number of times is 6.

FIG. 27 is a diagram illustrating a state of the medium PPA after step S4 is executed when the number of times CNT is 6. FIG. 28 is a diagram illustrating a state of the medium PPA after step S8 is executed when the number of times CNT is 6.

Figure 29:
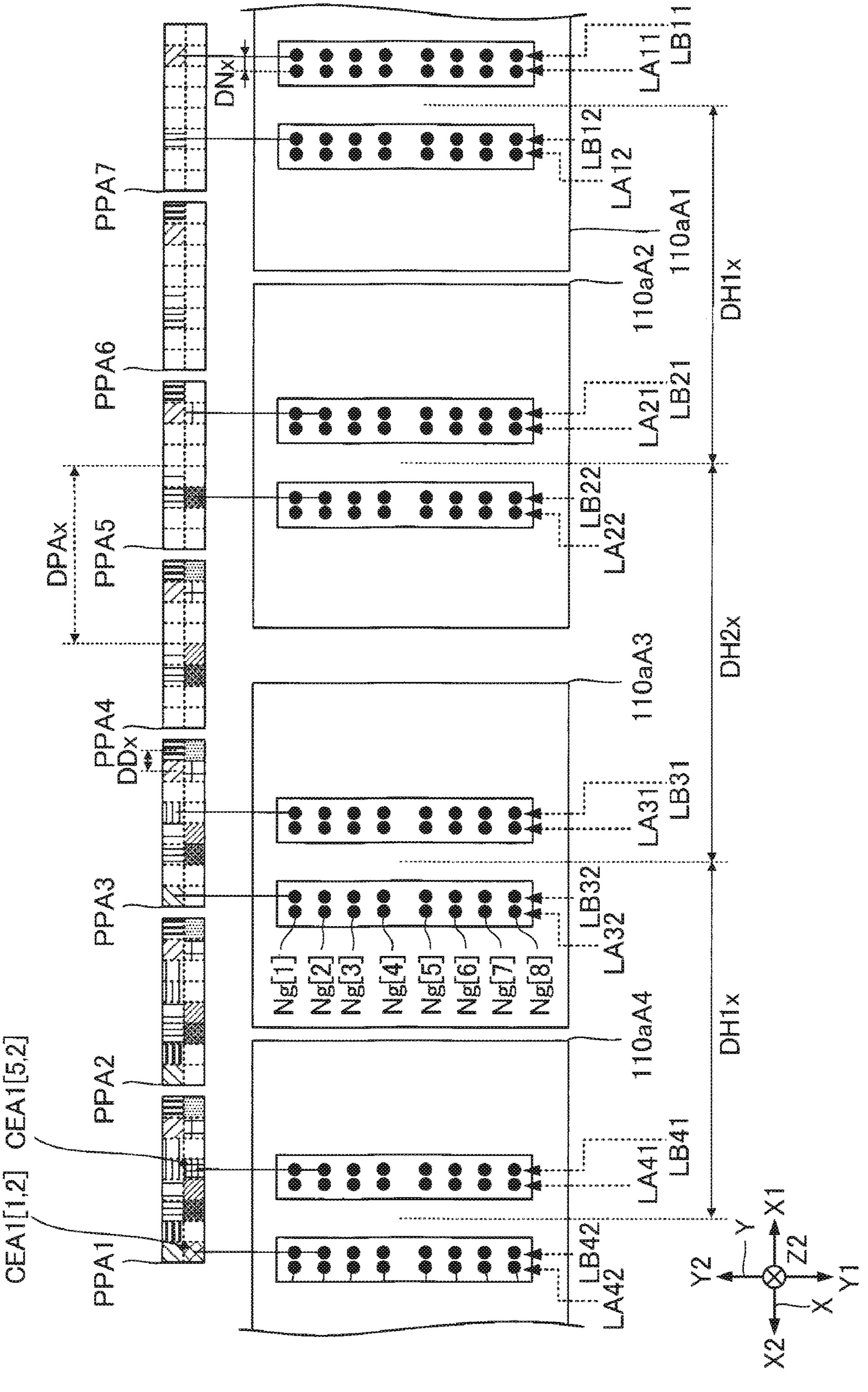
FIG. 29 is a diagram illustrating a state of the medium after step S4 is executed when the number of times is 7.

FIG. 29 is a diagram illustrating a state of the medium PPA after step S4 is executed when the number of times CNT is 7. When the number of times CNT is 7, in step S4, the liquid ejecting head 110*a*A4 ejects the adhesive GL_13 from the nozzle group Ng[2] of the nozzle array LB42 to form the liquid droplet DR in the area CEA1 [1, 2], and ejects the adhesive GL_14 from the nozzle group Ng[2] of the nozzle array LB41 to form the liquid droplet DR in the area CEA1 [5,2].

It should be noted that, regardless of the value of the number of times CNT except when the nozzle array LB42 and the nozzle array LB41 do not face the medium PPA, in step S4, the liquid ejecting head 110*a*A4 ejects the adhesive GL_13 from the nozzle group Ng[2] of the nozzle array LB42 to form the liquid droplet DR in the area CEA[1, 2], and ejects the adhesive GL_14 from the nozzle group Ng[2] of the nozzle array LB41 to form the liquid droplet DR in the area CEA [5,2]. Accordingly, the description of the operations of the nozzle array LB42 and the nozzle array LB41 in step S4 will be omitted below.

Figure 30:
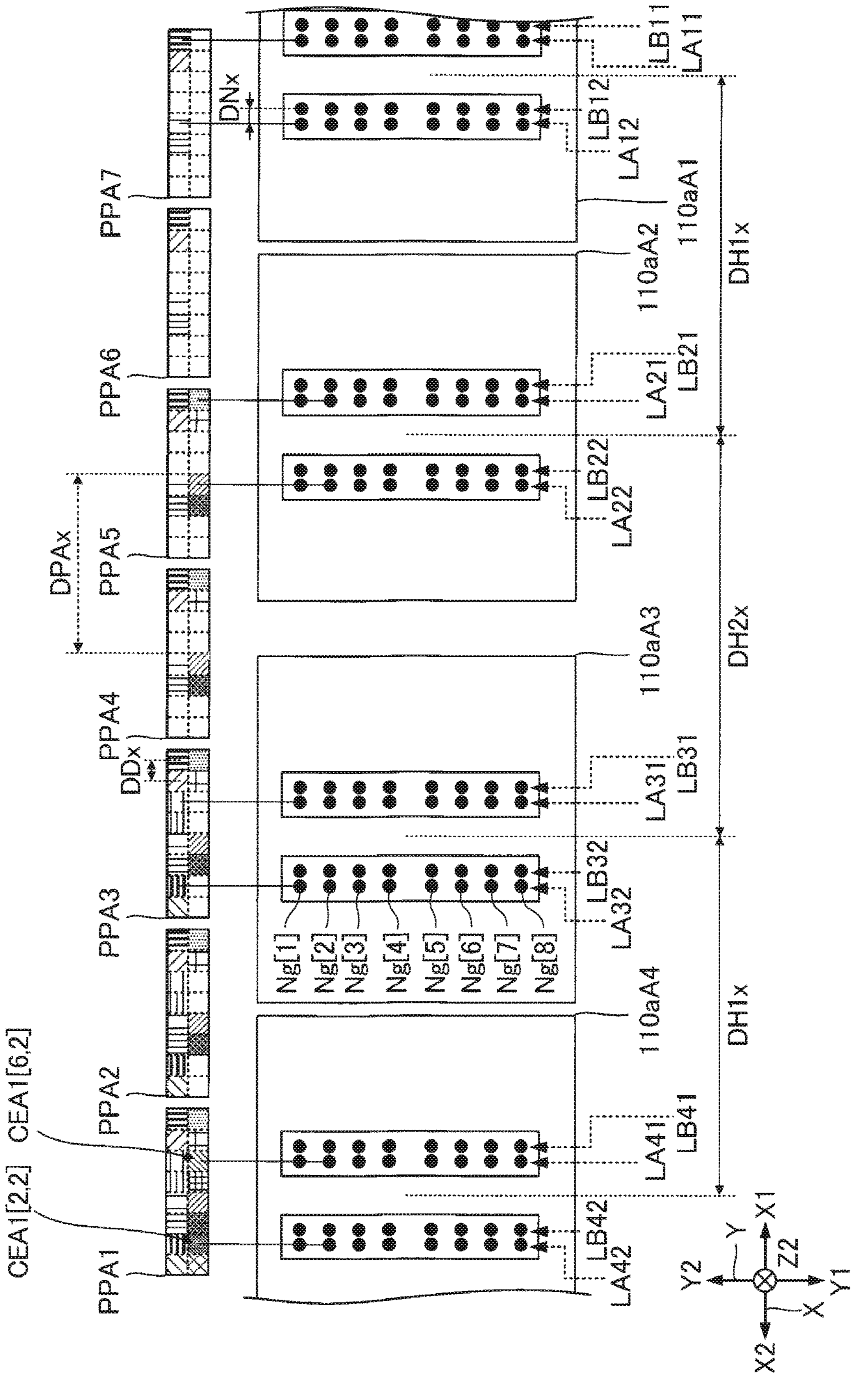
FIG. 30 is a diagram illustrating a state of the medium after step S8 is executed when the number of times is 7.

FIG. 30 is a diagram illustrating a state of the medium PPA after step S8 is executed when the number of times CNT is 7. When the number of times CNT is 7, in step S8, the liquid ejecting head 110*a*A4 ejects the adhesive GL_15 from the nozzle group Ng[2] of the nozzle array LA42 to form the liquid droplet DR in the area CEA1 [2, 2], and ejects the adhesive GL_16 from the nozzle group Ng[2] of the nozzle array LA41 to form the liquid droplet DR in the area CEA1 [6, 2].

It should be noted that, regardless of the value of the number of times CNT except when the nozzle array LA42 and the nozzle array LA41 do not face the medium PPA, in step S8, the liquid ejecting head 110*a*A4 ejects the adhesive GL_15 from the nozzle group Ng[2] of the nozzle array LA42 to form the liquid droplet DR in the area CEA [2, 2], and ejects the adhesive GL_16 from the nozzle group Ng[2] of the nozzle array LA41 to form the liquid droplet DR in the area CEA [6, 2]. Accordingly, the description of the operations of the nozzle array LA42 and the nozzle array LA41 in step S8 will be omitted below.

At a point in time when the number of times CNT is 7 and the process of step S8 ends, the liquid droplet DR is formed in all of the 16 areas CEA1 of the medium PPA1, and thus the liquid ejecting apparatus 100A finishes the creation of the medium PPA1 as the sample. Thereafter, the liquid ejecting apparatus 100 repeats the series of processes from step S2 to step S8 until the creation of the medium PP12, the medium PPA2, the medium PPA3, the medium PPA4, the medium PPA5, the medium PPA6, and the medium PPA7 as the samples is finished.

2-4. Summary of Second Embodiment

In the liquid ejecting method according to the second embodiment, the head disposition interval DHx including the head disposition interval DH1*x* and the head disposition interval DH2*x* is the expression (9), that is, the integral multiple, of the medium disposition interval DPAx in the direction along the X-axis between the adjacent media PP among the plurality of media PP, +n×the liquid droplet column disposition interval DDx, and n is any integer from 0 to L−1.

When the expression (9) is satisfied, as compared with when the expression (9) is not satisfied, the number of the nozzle arrays LN ejected from one liquid ejecting head 110*a* in the same stop period can be increased, and the period required to create the sample can be reduced. In addition, in the first embodiment, the head disposition interval DHx needs to be the integral multiple of the medium disposition interval DPx, but in the second embodiment, the head disposition interval DHx does not have to be the integral multiple of the medium disposition interval DPx. Accordingly, in the second embodiment, by adjusting the head disposition interval DHx within a range satisfying the expression (9), it is possible to improve a degree of freedom in the shape of the sample while reducing the period required to create the sample.

3. Modification Example

Each of the embodiments described above can be variously modified. A specific aspect of modification will be described below. Any two or more aspects selected from the examples described below can be combined as appropriate within a mutually consistent range.

3-1. First Modification Example

In each of the aspects described above, the nozzle array disposition interval DNx is not an integral multiple of the liquid droplet column disposition interval DDx, but may be an integral multiple.

Figure 31:
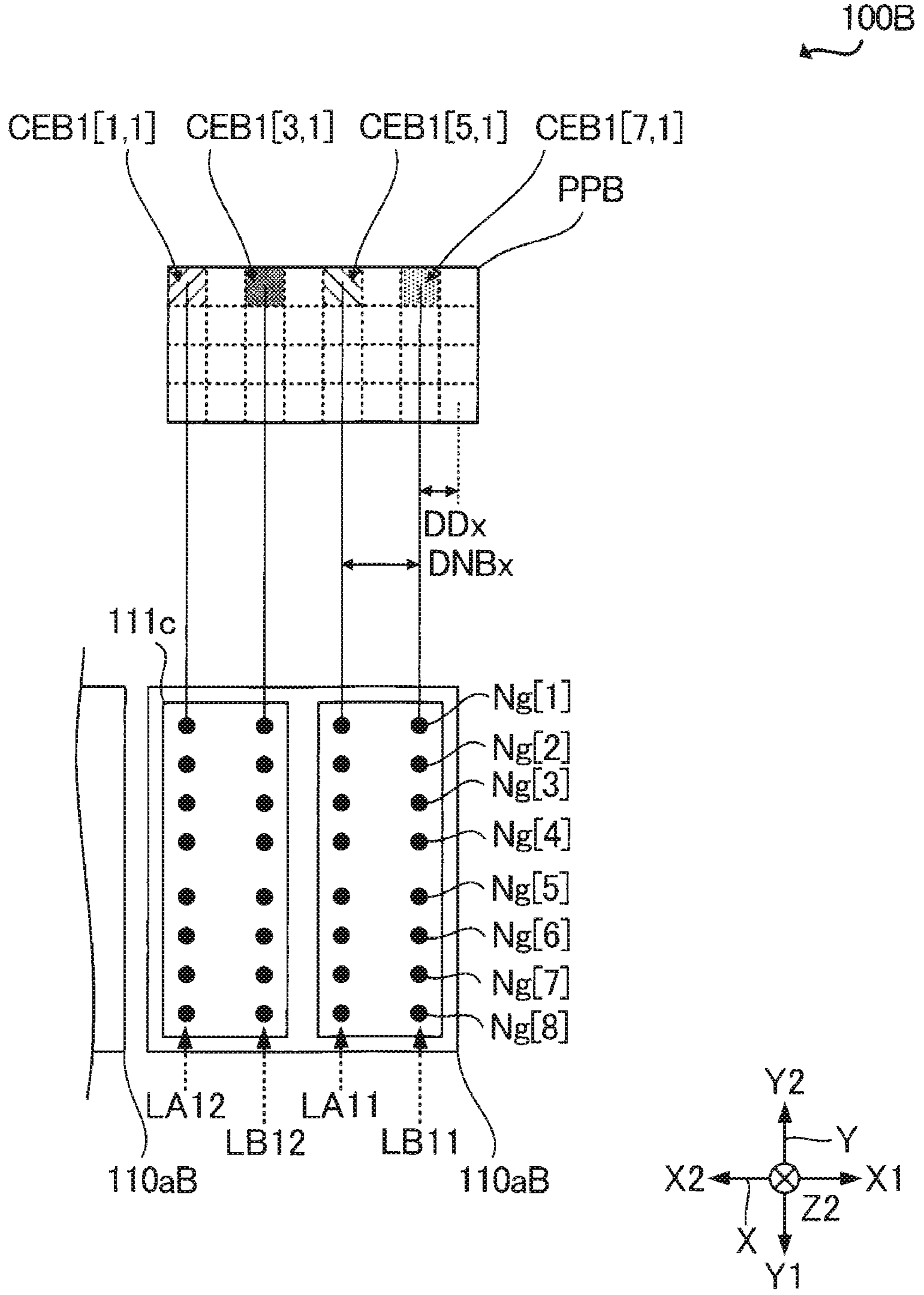
FIG. 31 is a diagram for describing a sample creation operation according to a first modification example.

FIG. 31 is a diagram for describing a sample creation operation according to the first modification example. A liquid ejecting apparatus 100B according to the first modification example is different from the liquid ejecting apparatus 100 in that a liquid ejecting head 110*a*B is provided instead of the liquid ejecting head 110*a* and a medium PPB is provided instead of the medium PP. The liquid ejecting head 110*a*B is different from the liquid ejecting head 110*a* in that a nozzle array disposition interval DNBx is twice the liquid droplet column disposition interval DDx. The medium PPB is different from the medium PP in that the medium PPB is divided into 32 areas CEB divided into four parts in the direction along the X-axis and divided into eight parts in the direction along the Y-axis, and each of different types of the adhesives GL is ejected into each of the areas CEB.

As illustrated in FIG. 31, since the nozzle array disposition interval DNBx is twice the liquid droplet column disposition interval DDx, the liquid ejecting head 110*a*B ejects the adhesive GL from the nozzle group Ng[1] of the nozzle array LA12 to the area CEB [1, 1], and ejects the adhesive GL from the nozzle group Ng[1] of the nozzle array LB12 to the area CEB [3,1]. In the example of FIG. 31, the liquid ejecting head 110*a*B further ejects the adhesive GL from the nozzle group Ng[1] of the nozzle array LA11 into the area CEB [5, 1], and ejects the adhesive GL from the nozzle group Ng[1] of the nozzle array LB11 into the area CEB [3,1].

As described above, in the liquid ejecting method according to the first modification example, the nozzle array disposition interval DNBx in the direction along the X-axis between the adjacent nozzle arrays among the two or more nozzle arrays LN included in each of the plurality of nozzle plates 111*c* is an integral multiple of the liquid droplet column disposition interval DDx in the direction along the X-axis between the adjacent liquid droplet columns LD among the plurality of liquid droplet columns LD formed on one medium PPB, and the liquid droplet DR is formed by ejecting any adhesive GL among the plurality of adhesives GL from both the adjacent nozzle arrays LN onto one medium PPB in the same stop period.

In the liquid ejecting method according to the first modification example, since the adhesive GL can be ejected from both the adjacent nozzle arrays LN in the same stop period, the period required to create the sample can be reduced.

3-2. Second Modification Example

In each of the aspects described above, the liquid ejecting head 110*a* and the medium PP move relative to each other along the X-axis, but the present disclosure is not limited to this. For example, the liquid ejecting head 110*a* and the medium PP may move relative to each other along the Y-axis. Specifically, after one scanning in the main scanning direction ends and the formation of the liquid droplet DR on the medium PP ends, before the liquid droplet DR is formed on the newly disposed medium PP, the liquid ejecting apparatus 100 may move the liquid ejecting head 110*a* along the Y-axis within a range in which the ejection can be performed onto the medium PP. After the movement along the Y-axis, the liquid ejecting apparatus 100 performs scanning in the main scanning direction again to form the liquid droplet DR on the medium PP. According to the second modification example, since the drive element 111*f* to be used is changed before and after the movement along the Y-axis, the drive elements 111*f* to be used are dispersed, and thus the life of the drive element 111*f* can be extended. Further, the pattern of the liquid droplet DR formed on the medium PP can be the same before and after the movement along the Y-axis.

3-3. Third Modification Example

In the second modification example, the description is made that the liquid ejecting head 110*a* and the medium PP move relative to each other along the Y-axis, but the present disclosure is not limited to this. For example, the liquid ejecting head 110*a* may be rotatable by 180 degrees about the Z-axis with respect to the medium PP.

Figure 32:
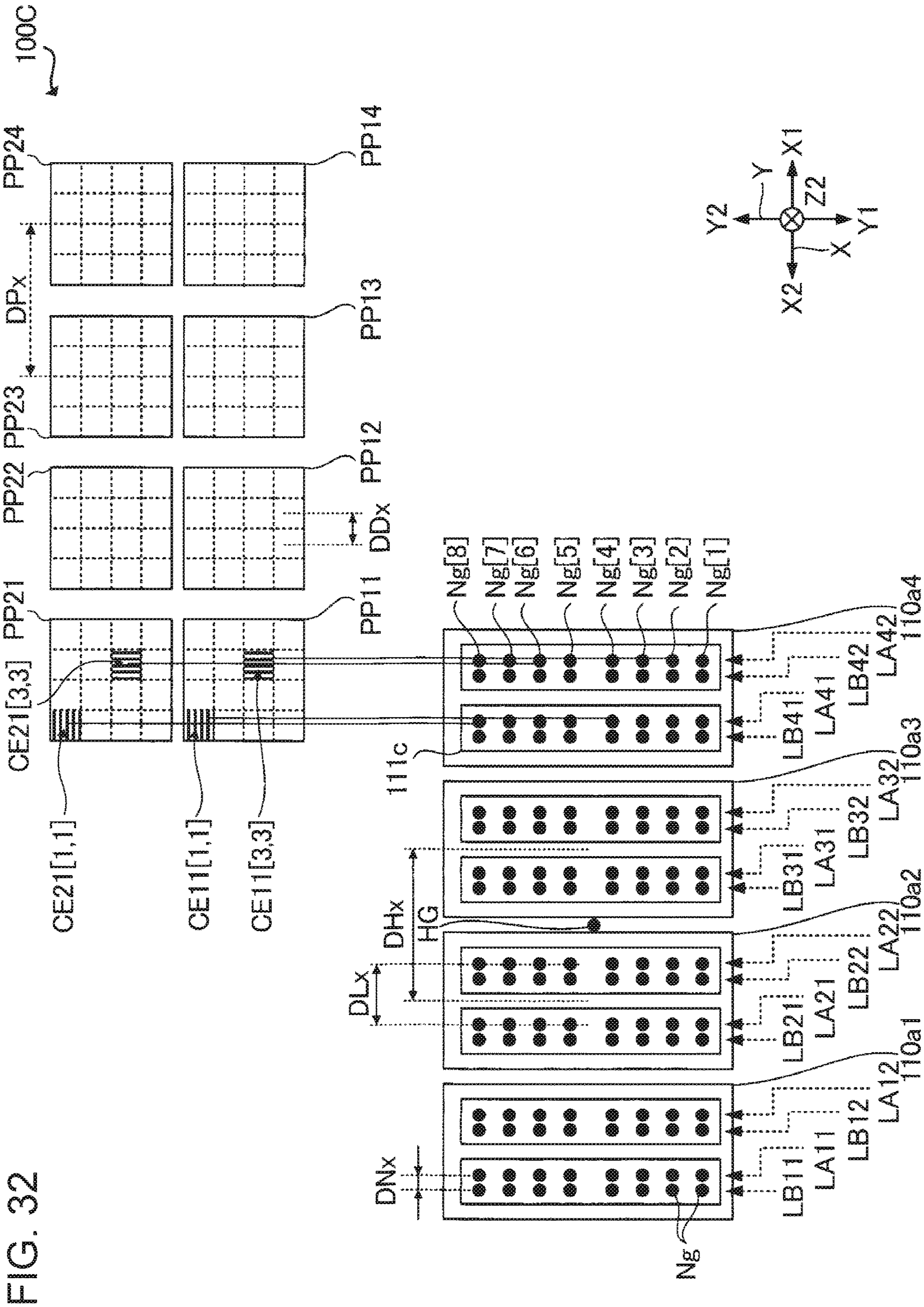
FIG. 32 is a diagram for describing a sample creation operation according to a third modification example.

FIG. 32 is a diagram for describing a sample creation operation according to a third modification example. A liquid ejecting apparatus 100C illustrated in FIG. 32 is different from the liquid ejecting apparatus 100 in that the liquid ejecting apparatus 100C passes through a center of gravity HG of the liquid ejecting head 110*a* when viewed in the Z2 direction, and is rotatable by 180 degrees along a rotation axis parallel to the Z-axis. For example, the liquid ejecting apparatus 100C includes a mechanism for rotating the carriage 131 by 180 degrees.

FIG. 32 illustrates a state in which the new medium PP is disposed and the liquid ejecting head 110*a* rotates by 180 degrees after one sample creation operation illustrated in FIGS. 6 to 14 of the first embodiment ends.

As illustrated in FIG. 32, the liquid ejecting apparatus 100C ejects the adhesive GL_16 from the nozzle group Ng[8] of the nozzle array LA41 to form the liquid droplet DR in the area CE21 [1, 1], and ejects the adhesive GL_16 from the nozzle group Ng[5] of the nozzle array LA42 to form the liquid droplet DR in the area CE11 [1, 1]. Further, the liquid ejecting apparatus 100 ejects the adhesive GL_15 from the nozzle group Ng[5] of the nozzle array LA11 to form the liquid droplet DR in the area CE21 [3, 3], and ejects the adhesive GL_15 from the nozzle group Ng[2] of the nozzle array LB11 to form the liquid droplet DR in the area CE11 [3,3].

According to the third modification example, since the drive element 111*f* to be used is changed before and after the liquid ejecting head 110*a* is rotated by 180 degrees, the drive elements 111*f* to be used are dispersed, so that the life of the drive element 111*f* can be extended.

Although not illustrated in FIG. 32, the liquid ejecting apparatus 100C can make the patterns of the liquid droplets DR formed on the medium PP the same before and after the rotation of the liquid ejecting head 110*a* by 180 degrees. For example, after rotating the liquid ejecting head 110*a* by 180 degrees, the liquid ejecting apparatus 100C need only eject the adhesive GL_16 from the nozzle group Ng[6] of the nozzle array LA41 into the area CE21 [4, 3], and need only eject the adhesive GL_15 from the nozzle group Ng[8] of the nozzle array LA42 into the area CE21 [2, 1].

3-4. Fourth Modification Example

When one scanning in the main scanning direction ends, in the second modification example, the liquid ejecting head 110*a* and the medium PP are relatively moved along the Y-axis, and in the third modification example, the liquid ejecting head 110*a* is rotated by 180 degrees, but the present disclosure is not limited to these aspects in terms of extending the life of the drive element 111*f*. For example, the liquid ejecting apparatus 100 may change the nozzle group Ng that ejects the adhesive GL each time the scanning in the main scanning direction ends. For example, after one sample creation operation illustrated in FIGS. 6 to 14 of the first embodiment ends and then the new medium PP is disposed, when the number of times CNT is 1, in step S4, the liquid ejecting head 110*a1* ejects the adhesive GL_1 from the nozzle group Ng[2] of the nozzle array LB12 into the area CE21 [1, 2] to form the liquid droplet DR. Then, when the number of times CNT is 2, in step S4, the liquid ejecting head 110*a*2 ejects the adhesive GL_5 from the nozzle group Ng[1] of the nozzle array LB22 into the area CE22 [1, 1] to form the liquid droplet DR.

3-5. Fifth Modification Example

In the first embodiment, as a countermeasure of the contamination, with i as an integer from 1 to 4, and the positions of the nozzle group Ng ejected from the nozzle array LBi2 and the nozzle group Ng ejected from the nozzle array LBi1 in the direction along the Y-axis are different from each other, but may be the same as each other. Similarly, with i as an integer from 1 to 4, and the positions of the nozzle group Ng ejected from the nozzle array LAi2 and the nozzle group Ng ejected from the nozzle array LAi1 in the direction along the Y-axis are different from each other, but may be the same as each other.

3-6. Sixth Modification Example

In each of the aspects described above, the expressions (1) to (7) are satisfied, but it is not necessary to satisfy the expressions.

3-7. Seventh Modification Example

In each of the aspects described above, the adhesive GL is ejected from two nozzle arrays LN in the same stop period to form two liquid droplets DR on the medium PP, but the adhesive may be ejected from one nozzle array LN in one stop period to form one liquid droplet DR on the medium PP.

3-8. Other Modification Examples

The liquid ejecting apparatus 100 in each of the aspects described above can also be regarded as a computer program configured to execute the liquid ejecting method in each of the aspects described above or a recording medium in which the computer program is recorded. The recording medium is, for example, a non-transitory recording medium, and may include any known recording medium, such as a semiconductor recording medium or a magnetic recording medium, in addition to an optical recording medium, such as a CD-ROM.

4. Supplementary Note

From the embodiments described above, for example, the following configurations can be grasped.

A first aspect, which is a preferred aspect, relates to a liquid ejecting method is a liquid ejecting method of ejecting a liquid from a liquid ejecting head including a nozzle array constituted by arranging a plurality of nozzles, in which the liquid ejecting head is configured to move relative to a first medium, the liquid ejecting method including ejecting, in a state in which the relative movement is stopped, a liquid from a plurality of first nozzles constituting a part of the nozzle array to form a first liquid droplet on the first medium.

According to the first aspect, since the number of times of ejection from one nozzle can be reduced by ejecting the liquid from the plurality of first nozzles, the period required to form the liquid droplet can be reduced as compared with the aspect in which the liquid is ejected from one nozzle. Further, since the liquid is ejected in a state in which the relative movement is stopped, the liquid droplet can be stably fixed on the medium as compared with the aspect in which the liquid is ejected while the relative movement is being performed.

In a second aspect, which is a specific example of the first aspect, the plurality of first nozzles constituting the part of the nozzle array are not adjacent to each other.

In the second aspect, the period required to form the liquid droplet can be reduced as compared with the aspect in which the liquid droplet is ejected from one nozzle. Further, in the aspect in which the plurality of nozzles that form the liquid droplets are adjacent to each other, as compared with the second aspect, there is a high possibility that the liquid ejected from the nozzles adjacent to each other lands on the medium and then the liquid droplets come into contact with each other. When the liquid droplets come into contact with each other, the force that pushes the liquid droplets to each other in the extending direction of the nozzle array is generated, and there is a concern that the liquid droplets formed on the medium approximates an elliptical shape when viewed in the ejection direction. As described above, in the second aspect, the period required to form the liquid droplet can be reduced as compared with the aspect in which the liquid is ejected from one nozzle, and the liquid droplet can be made to approximate the perfect circle when viewed in the ejection direction as compared with the aspect in which the plurality of nozzles that form the liquid droplets are adjacent to each other.

In a third aspect, which is a specific example of the first aspect, the nozzle array includes a first nozzle group constituted by the plurality of first nozzles that are not adjacent to each other, and a second nozzle group that is different from the first nozzle group and is constituted by a plurality of second nozzles that are not adjacent to each other, the liquid is ejected from the plurality of first nozzles constituting the first nozzle group to form the first liquid droplet on the first medium, and a liquid is ejected from the plurality of second nozzles constituting the second nozzle group to form a second liquid droplet on a second medium different from the first medium.

According to the third aspect, the life of the drive element for ejecting the liquid from the nozzle can be extended as compared with the aspect in which the first nozzle group ejects the liquid onto the first medium and the second medium. Further, since the first nozzle group and the second nozzle group include the plurality of nozzles that are not adjacent to each other, the liquid droplet can be made to approximate the perfect circle when viewed in the ejection direction as compared to the aspect in which the plurality of nozzles that form the liquid droplets are adjacent to each other.

In a fourth aspect, which is a specific example of the third aspect, the plurality of first nozzles and the plurality of second nozzles are arranged alternately.

In the fourth aspect, since the plurality of first nozzles and the plurality of second nozzles are arranged at equal intervals, the liquid droplet can be made to approximate the perfect circle when viewed in the ejection direction as compared to the aspect in which the plurality of first nozzles and the plurality of second nozzles are not arranged alternately.

In a fifth aspect, which is a specific example of the first aspect, the number of the plurality of first nozzles is three or more, and the number of times of ejection from a first nozzle that is not disposed at an end among the plurality of first nozzles for forming the first liquid droplet on the first medium is larger than the number of times of ejection from a first nozzle arranged at the end among the plurality of first nozzles.

According to the fifth aspect, as compared with the aspect in which the number of times of ejection from the first nozzle that is not disposed at the end among the plurality of first nozzles is smaller than the number of times of ejection from the first nozzle that is disposed at the end among the plurality of first nozzles, the liquid droplet can be made to approximate the perfect circle when viewed in the ejection direction.

In a sixth aspect, which is a specific example of the second aspect, the number of the plurality of first nozzles is three or more, and the number of times of ejection from the first nozzle that is not disposed at an end among the plurality of first nozzles for forming the first liquid droplet on the first medium is larger than the number of times of ejection from the first nozzle that is disposed at the end among the plurality of first nozzles.

According to the sixth aspect, the same effect as the effect of the fifth aspect can be obtained.

In a seventh aspect, which is a specific example of the first aspect, in a state in which the relative movement is stopped, the liquid is ejected a plurality of times from each of the plurality of first nozzles to form the first liquid droplet on the first medium.

What is claimed is:

1. A liquid ejecting method of ejecting a liquid from a liquid ejecting head including a nozzle array constituted by arranging nozzles, in which the liquid ejecting head is configured to move relative to a first medium, the liquid ejecting method comprising:

ejecting, in a state in which the relative movement is stopped during a single stop, a liquid from each of a first plurality of nozzles to form a first liquid droplet on the first medium during the single stop.

2. The liquid ejecting method according to claim 1, wherein the first plurality of nozzles constituting the part of the nozzle array are not adjacent to each other.

3. The liquid ejecting method according to claim 2, wherein the number of the first plurality of nozzles is three or more, and the number of times of ejection from the first nozzle that is not disposed at an end among the first plurality of nozzles for forming the first liquid droplet on the first medium is larger than the number of times of ejection from the first nozzle that is disposed at the end among the first plurality of nozzles.

4. The liquid ejecting method according to claim 1, wherein the nozzle array includes a first nozzle group constituted by the first plurality of nozzles that are not adjacent to each other, and a second nozzle group that is different from the first nozzle group and is constituted by a second plurality of nozzles that are not adjacent to each other, the liquid is ejected from the first plurality of nozzles constituting the first nozzle group to form the first liquid droplet on the first medium during the single stop, and a liquid is ejected from the second plurality of nozzles constituting the second nozzle group to form a second liquid droplet on a second medium different from the first medium during the single stop.

5. The liquid ejecting method according to claim 4, wherein the first plurality of nozzles and the second plurality of nozzles are arranged alternately.

6. The liquid ejecting method according to claim 1, wherein the number of the first plurality of nozzles is three or more, and the number of times of ejection from a first plurality of nozzle that is not disposed at an end among the first nozzles for forming the first liquid droplet on the first medium is larger than the number of times of ejection from a first nozzle that is disposed at the end among the first plurality of nozzles.

7. The liquid ejecting method according to claim 1, wherein in a state in which the relative movement is stopped, the liquid is ejected multiple times from each of the first plurality of nozzles to form the first liquid droplet on the first medium.

8. The liquid ejecting method according to claim 1, the liquid being an adhesive.

9. The liquid ejecting method accordance to claim 1, the liquid being UV ink with resin.

10. The liquid ejecting method accordance to claim 1, all the first plurality of nozzles being linearly arranged.

* * * * *